United States Patent
Labonté et al.

(10) Patent No.: US 11,406,157 B2
(45) Date of Patent: Aug. 9, 2022

(54) SKATE OR OTHER FOOTWEAR

(71) Applicant: BAUER HOCKEY LTD., Blainville (CA)

(72) Inventors: Ivan Labonté, Montreal (CA); Conrad Payeur, Prévost (CA); Candide Deschênes, St-Jérôme (CA)

(73) Assignee: BAUER HOCKEY, LLC, Exeter, NH (US)

( * ) Notice: Subject to any disclaimer, the term of this patent is extended or adjusted under 35 U.S.C. 154(b) by 733 days.

(21) Appl. No.: 16/076,986

(22) PCT Filed: Feb. 9, 2017

(86) PCT No.: PCT/CA2017/050155
§ 371 (c)(1),
(2) Date: Aug. 9, 2018

(87) PCT Pub. No.: WO2017/136942
PCT Pub. Date: Aug. 17, 2017

(65) Prior Publication Data
US 2019/0045879 A1   Feb. 14, 2019

Related U.S. Application Data

(60) Provisional application No. 62/292,998, filed on Feb. 9, 2016.

(51) Int. Cl.
*A43B 5/16* (2006.01)
*A63C 1/00* (2006.01)
(Continued)

(52) U.S. Cl.
CPC .............. *A43B 5/1666* (2013.01); *A43B 1/14* (2013.01); *A43B 3/0078* (2013.01); *A43B 5/16* (2013.01);
(Continued)

(58) Field of Classification Search
CPC ....... A43B 5/16; A43B 5/1625; A43B 5/1666; A43B 5/1616
See application file for complete search history.

(56) References Cited

U.S. PATENT DOCUMENTS

| | | |
|---|---|---|
| 37,934 A | 3/1863 | Yates |
| 1,371,609 A | 3/1921 | Drevitson |

(Continued)

FOREIGN PATENT DOCUMENTS

| | | |
|---|---|---|
| CA | 2123046 | 7/1995 |
| CA | 2174042 | 11/1996 |

(Continued)

OTHER PUBLICATIONS

Written Opinion dated May 19, 2017 in connection with International Patent Application PCT/CA2017/050155.

(Continued)

*Primary Examiner* — Brian L Swenson

(57) ABSTRACT

A skate (e.g., an ice skate) for a skater (e.g., a hockey player). The skate comprises a skate boot for receiving a foot of the skater and a skating device (e.g., a blade and a blade holder) disposed beneath the skate boot to engage a skating surface (e.g., ice). At least part of the skate boot and optionally at least part of one or more other components (e.g., the skating device) may be constructed from one or more materials (e.g., foams) molded by flowing in molding equipment during a molding process (e.g., injection molding or casting). This may allow the skate (or other footwear) to have useful performance characteristics (e.g., reduced weight, proper fit and comfort, etc.) while being more cost-effectively manufactured. Other articles of footwear are also provided.

94 Claims, 52 Drawing Sheets

(51) Int. Cl.
| | |
|---|---|
| *A63C 1/30* | (2006.01) |
| *B29D 35/08* | (2010.01) |
| *A43B 23/02* | (2006.01) |
| *A43B 3/00* | (2022.01) |
| *A63C 1/02* | (2006.01) |
| *A43B 1/14* | (2006.01) |
| *A43B 7/32* | (2006.01) |
| *A63C 1/40* | (2006.01) |
| *A63C 1/42* | (2006.01) |
| *A63C 17/00* | (2006.01) |
| *A63C 17/06* | (2006.01) |
| *B29C 45/16* | (2006.01) |
| *B29K 75/00* | (2006.01) |
| *B29K 105/04* | (2006.01) |
| *B29L 31/50* | (2006.01) |

(52) U.S. Cl.
CPC .......... *A43B 5/1616* (2013.01); *A43B 5/1625* (2013.01); *A43B 7/32* (2013.01); *A43B 23/0235* (2013.01); *A43B 23/0275* (2013.01); *A63C 1/00* (2013.01); *A63C 1/02* (2013.01); *A63C 1/30* (2013.01); *A63C 1/40* (2013.01); *A63C 1/42* (2013.01); *B29D 35/081* (2013.01); *A63C 1/303* (2013.01); *A63C 17/00* (2013.01); *A63C 17/06* (2013.01); *B29C 45/1676* (2013.01); *B29K 2075/00* (2013.01); *B29K 2105/04* (2013.01); *B29K 2995/007* (2013.01); *B29L 2031/505* (2013.01)

(56) References Cited

U.S. PATENT DOCUMENTS

| | | | |
|---|---|---|---|
| 1,666,690 A | 4/1928 | Drevitson | |
| 1,746,297 A | 2/1930 | Henry | |
| 3,975,840 A | 8/1976 | Juzenko | |
| 4,384,413 A | 5/1983 | Bourque | |
| 4,509,276 A | 4/1985 | Bourque | |
| 4,549,742 A | 10/1985 | Husak et al. | |
| 4,869,001 A | 9/1989 | Brown | |
| 5,248,156 A | 9/1993 | Cann et al. | |
| 5,484,148 A | 1/1996 | Olivieri | |
| 5,641,169 A | 6/1997 | Bekessy | |
| 5,769,434 A | 6/1998 | Wurthner | |
| 6,109,622 A | 8/2000 | Reynolds | |
| 6,164,667 A | 12/2000 | Olivieri | |
| 6,295,679 B1* | 10/2001 | Chenevert | A43B 3/26 12/142 P |
| 6,485,033 B2 | 11/2002 | Nicoletti et al. | |
| 6,761,363 B2 | 7/2004 | Fask et al. | |
| 7,287,293 B2 | 10/2007 | Cook | |
| 7,316,083 B2 | 1/2008 | Labonté | |
| 7,380,801 B2 | 6/2008 | Rudolph | |
| 7,628,405 B2 | 12/2009 | Smith, II | |
| 7,673,884 B2 | 3/2010 | Wurthner | |
| 7,758,053 B2 | 7/2010 | Wylie et al. | |
| 7,866,675 B2 | 1/2011 | Hauser | |
| 7,896,363 B2 | 3/2011 | Lovejoy | |
| 8,109,536 B2 | 2/2012 | Labonte | |
| 8,329,083 B2 | 11/2012 | Jou et al. | |
| 8,353,535 B2 | 1/2013 | Salmon et al. | |
| 8,387,286 B2* | 3/2013 | Koyess | A43B 5/1641 36/115 |
| 8,505,217 B2 | 8/2013 | Stewart | |
| 8,770,595 B2 | 7/2014 | Cruikshank et al. | |
| 9,004,502 B2 | 4/2015 | Van Horne et al. | |
| 9,295,901 B2 | 3/2016 | Cruikshank et al. | |
| 9,510,639 B2 | 12/2016 | Cruikshank et al. | |
| 9,554,615 B2 | 1/2017 | Labonte | |
| 10,195,514 B2 | 2/2019 | Davis et al. | |
| 10,532,269 B2 | 1/2020 | Davis et al. | |
| 11,130,044 B2 | 9/2021 | Davis et al. | |
| 2002/0190487 A1 | 12/2002 | Blankenburg | |
| 2005/0134010 A1 | 6/2005 | Blakenburg | |
| 2006/0082081 A1 | 4/2006 | Loveridge | |
| 2006/0108751 A1 | 5/2006 | Labonte et al. | |
| 2008/0001369 A1 | 1/2008 | Wylie et al. | |
| 2008/0100008 A1 | 5/2008 | Wan | |
| 2009/0224494 A1 | 9/2009 | Wan | |
| 2009/0289427 A1* | 11/2009 | Lovejoy | A63C 1/22 280/11.12 |
| 2010/0139126 A1 | 6/2010 | Koyess | |
| 2010/0156058 A1* | 6/2010 | Koyess | A43B 5/1616 280/11.12 |
| 2010/0176564 A1 | 7/2010 | Koyess et al. | |
| 2010/0192412 A1 | 8/2010 | Stewart | |
| 2011/0001297 A1 | 1/2011 | Labonte et al. | |
| 2011/0101665 A1 | 5/2011 | Van Horne et al. | |
| 2011/0198834 A1 | 8/2011 | Olivieri | |
| 2011/0277250 A1 | 11/2011 | Langvin et al. | |
| 2012/0187642 A1 | 7/2012 | Corbeil | |
| 2012/0317842 A1 | 12/2012 | McClelland | |
| 2013/0038031 A1 | 2/2013 | Cruikshank | |
| 2013/0074277 A1* | 3/2013 | Luezlbauer | A43B 5/0427 12/128 R |
| 2013/0119580 A1* | 5/2013 | Yang | B29D 35/04 264/279 |
| 2014/0250733 A1 | 9/2014 | Cruikshank et al. | |
| 2014/0252736 A1* | 9/2014 | Lefebvre | A43B 5/1691 280/11.12 |
| 2014/0265175 A1 | 9/2014 | Labonte | |
| 2016/0114239 A1 | 4/2016 | Davis et al. | |
| 2016/0236065 A1 | 8/2016 | Cruikshank et al. | |
| 2019/0160363 A1 | 5/2019 | Davis et al. | |
| 2020/0222785 A1 | 7/2020 | Davis | |
| 2021/0206130 A1 | 7/2021 | Labonte et al. | |
| 2021/0394038 A1 | 12/2021 | Davis et al. | |
| 2021/0401109 A1 | 12/2021 | Labonte et al. | |

FOREIGN PATENT DOCUMENTS

| | | |
|---|---|---|
| CA | 2523481 | 12/2004 |
| CA | 2638352 | 2/2009 |
| CA | 3014387 | 8/2017 |
| CA | 2935348 | 12/2017 |
| CA | 2947087 | 4/2018 |
| CA | 3028419 | 6/2019 |
| CA | 3101479 | 11/2019 |
| CA | 3118214 | 5/2020 |
| CA | 2909496 | 7/2020 |
| CN | 112469554 | 3/2021 |
| CN | 113301825 | 8/2021 |
| DE | 4010458 | 10/1990 |
| EP | 2478937 | 7/2012 |
| EP | 2777415 | 9/2014 |
| GB | 782437 | 9/1957 |
| KR | 20110007837 | 8/2011 |
| WO | 2017136942 | 8/2017 |
| WO | 2019222828 | 11/2019 |
| WO | 2020087163 | 5/2020 |
| WO | 2021237365 | 12/2021 |

OTHER PUBLICATIONS

International Search Report dated May 19, 2017 in connection with International Patent Application PCT/CA2017/050155.

International Preliminary Report on Patentability dated Aug. 14, 2018 in connection with International Patent Application PCT/CA2017/050155.

Written Opinion dated Jan. 22, 2019 in connection with Internation Patent Application PCT/CA2018/050617.

International Search Report dated Jan. 22, 2019 in connection with Internation Patent Application PCT/CA2018/050617.

Final Office Action dated Mar. 22, 2017 in connection with U.S. Appl. No. 14/920,664, 8 pages.

Final Office Action dated Mar. 1, 2016 in connection with U.S. Appl. No. 14/212,468, 20 pages.

International Search Report and Written Opinion dated Jan. 29, 2020 in connection with International Patent Application PCT/CA2019/051531, 11 pages.

(56) References Cited

OTHER PUBLICATIONS

Non-Final Office Action dated Jan. 28, 2021 in connection with U.S. Appl. No. 16/712,094, 8 pages.
Non-Final Office Action dated Mar. 7, 2018, in connection with U.S. Appl. No. 14/920,664, 7 pages.
Non-Final Office Action dated May 22, 2019 in connection with U.S. Appl. No. 16/225,095, 20 pages.
Non-Final Office Action dated Sep. 10, 2015 in connection with U.S. Appl. No. 14/212,468, 15 pages.
Non-Final Office Action dated Sep. 14, 2016 in connection with U.S. Appl. No. 14/920,664, 7 pages.
Non-Final Office Action dated Sep. 26, 2017 in connection with U.S. Appl. No. 14/920,664, 7 pages.
Notice of Allowance dated Sep. 19, 2018 in connection with U.S. Appl. No. 14/920,664, 7 pages.
Notice of Allowance dated Sep. 9, 2019 in connection with U.S. Appl. No. 16/225,095, 7 pages.
Communication pursuant to Article 94(3) dated May 8, 2015 in connection with European Patent Application No. 14160032.0, 3 pages.
Restriction Requirement dated May 15, 2015 in connection with U.S. Appl. No. 14/212,468, 3 pages.
Restriction Requirement dated Mar. 14, 2016 in connection with U.S. Appl. No. 14/920,664, 8 pages.
Notice of Allowance dated May 26, 2021 in connection with U.S. Appl. No. 16/712,094, 25 pages.
Examiner's Report dated Nov. 19, 2021 in connection with Canadian Patent Application No. 3,101,479, 3 pages.
International Search Report and Written Opinion dated Sep. 3, 2021 in connection with International Patent Application PCT/CA2021/050727, 15 pages.
Extended European Search Report dated Dec. 14, 2021 in connection with European patent application No. 18919912.8, 11 pages.

\* cited by examiner

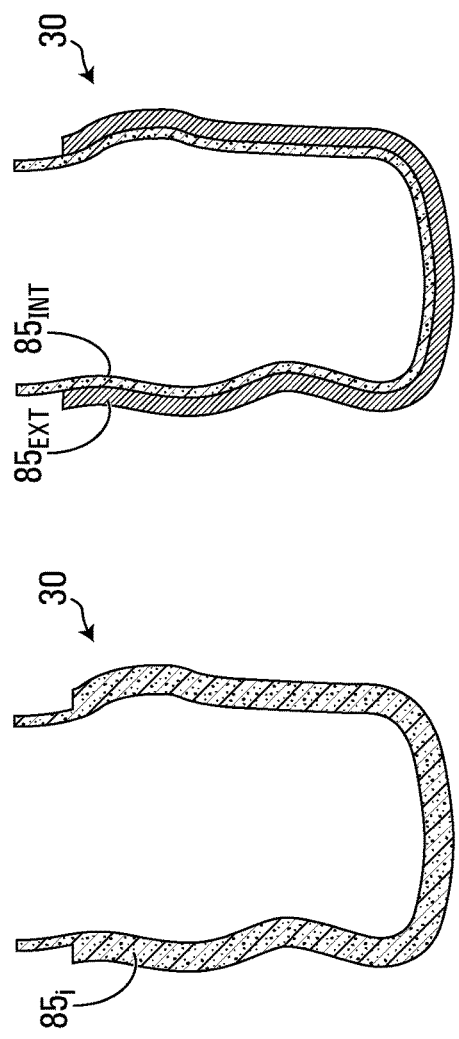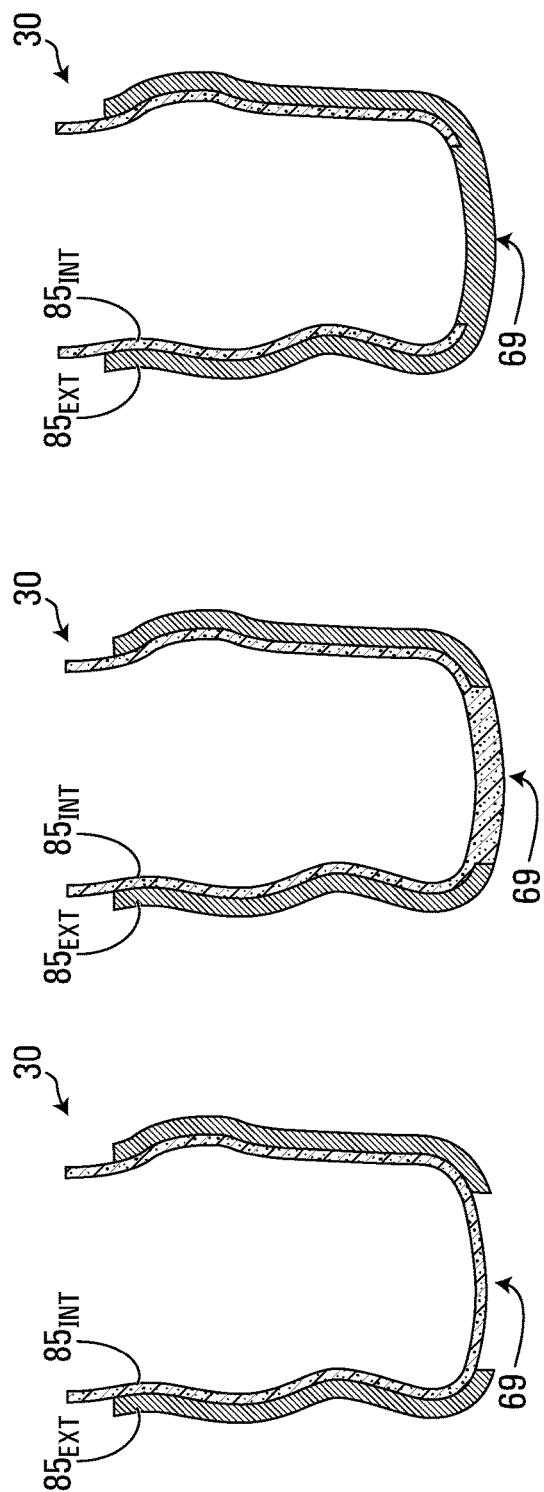

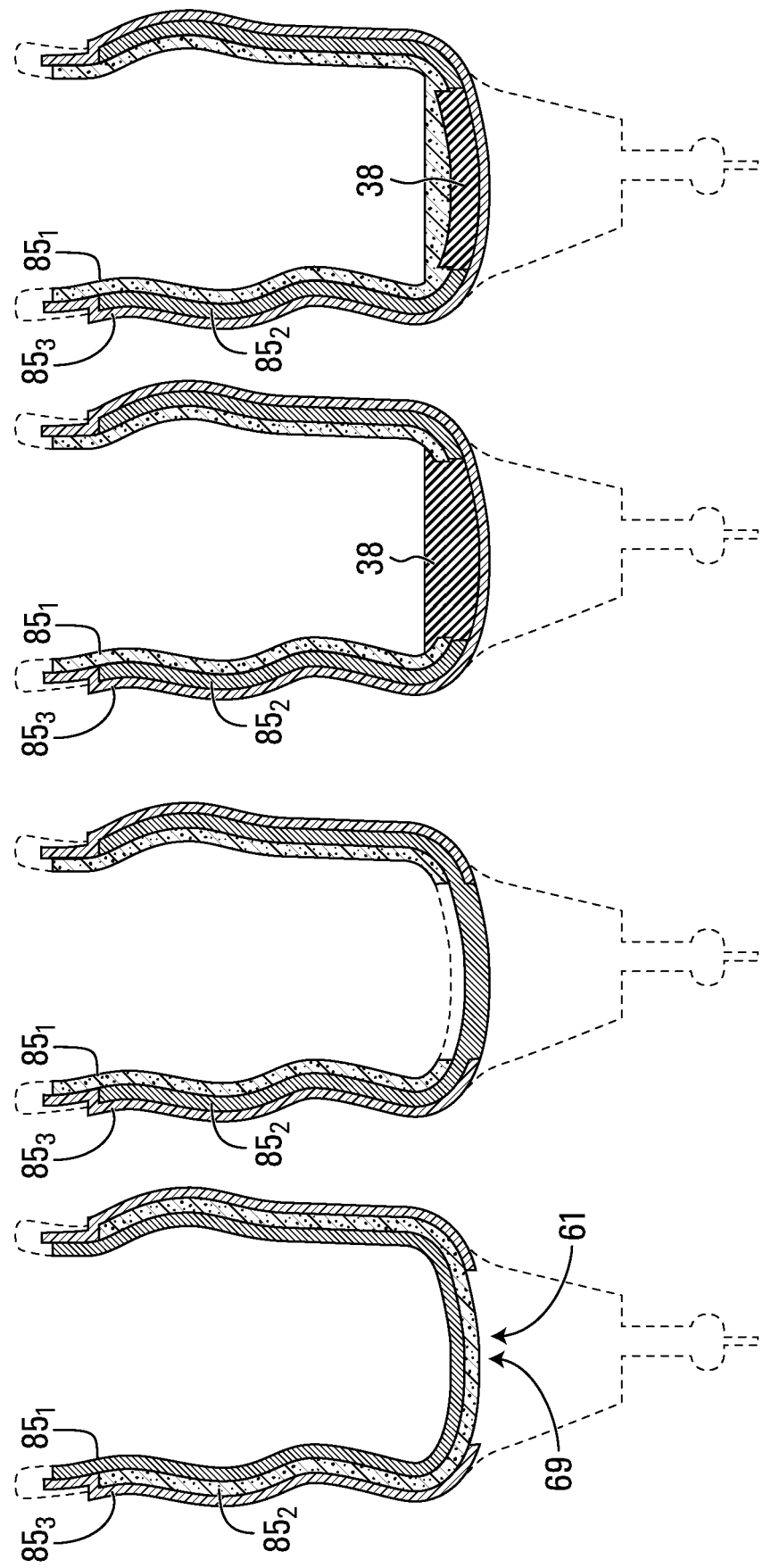

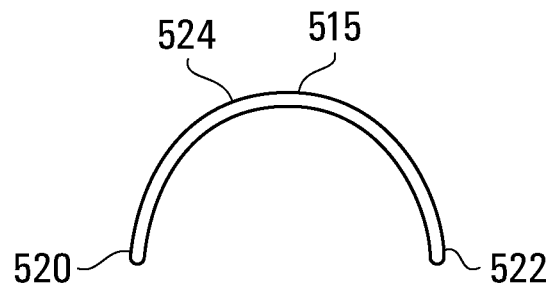
FIG. 85
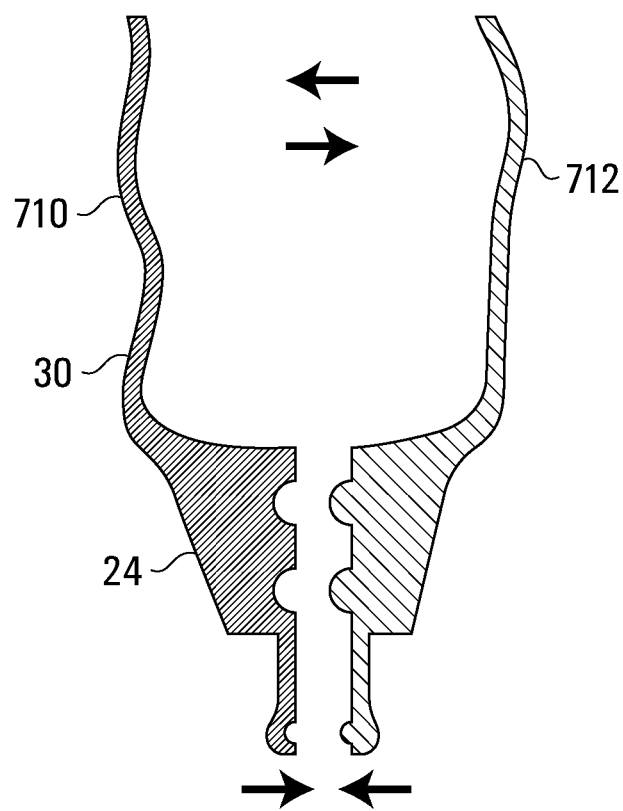 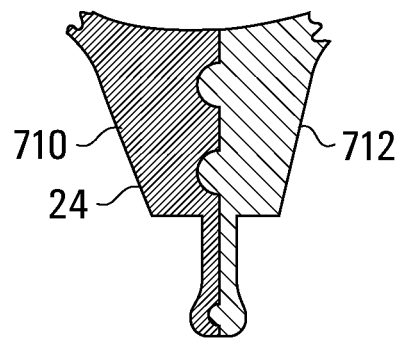
FIG. 86A  FIG. 86B

SKATE OR OTHER FOOTWEAR

CROSS-REFERENCE TO RELATED APPLICATION

This application claims priority from U.S. Provisional Patent Application 62/292,998 filed on Feb. 9, 2016 and incorporated by reference herein.

FIELD

The invention generally relates to footwear, including skates (e.g., ice skates) such as for playing hockey and/or for other activities.

BACKGROUND

Skates are used by skaters in various sports such as ice hockey, roller hockey, etc. A skate comprises a skate boot that typically comprises a number of components that are assembled together to form the skate boot. This can include a shell, a toe cap, a tongue, a tendon guard, etc.

For example, an approach to manufacturing a shell of a skate boot of conventional skates consists of thermoforming different layers of synthetic material and then assembling these layers to form the shell. However, such conventional skates may sometimes be overly heavy, uncomfortable, lacking in protection in certain areas, and/or a bad fit on a skater's foot. Moreover, such conventional skates can be expensive to manufacture.

Similar considerations may arise for other types of footwear (e.g., ski boots, motorcycle boots, work boots, etc.). For these and/or other reasons, there is a need for improvements directed to skates and other footwear.

SUMMARY

In accordance with various aspects of the invention, there is provided a skate (e.g., an ice skate) for a skater. The skate comprises a skate boot for receiving a foot of the skater and a skating device (e.g., a blade and a blade holder) disposed beneath the skate boot to engage a skating surface. At least part of the skate boot and optionally at least part of one or more other components (e.g., the skating device) of the skate is constructed from one or more materials (e.g., foams) molded by flowing in molding equipment during a molding process (e.g., injection molding or casting). This may allow the skate to have useful performance characteristics (e.g., reduced weight, proper fit and comfort, etc.) while being more cost-effectively manufactured. Other articles of footwear are also provided.

In accordance with an aspect of the invention, there is provided a skate boot for a skate, the skate comprising a skating device disposed beneath the skate boot to engage a skating surface, the skate boot defining a cavity to receive a foot of a user, the skate boot comprising a body that comprises a medial side portion to face a medial side of the user's foot, a lateral side portion to face a lateral side of the user's foot, a heel portion to receive a heel of the user's foot, and an ankle portion to receive an ankle of the user, wherein: the medial side portion, the lateral side portion, the heel portion, and the ankle portion of the body are molded together and integral with one another; and the body comprises a plurality of layers comprising a plurality of materials that are different and molded by flowing.

In accordance with another aspect of the invention, there is provided a method of making a skate boot for a skate, the skate comprising a skating device disposed beneath the skate boot to engage a skating surface, the skate boot defining a cavity to receive a foot of a user, the method comprising: providing a molding apparatus; and molding a body of the skate boot using the molding apparatus, the body comprising a medial side portion to face a medial side of the user's foot, a lateral side portion to face a lateral side of the user's foot, a heel portion to receive a heel of the user's foot, and an ankle portion to receive an ankle of the user, wherein: the medial side portion, the lateral side portion, the heel portion, and the ankle portion of the body are molded together and integral with one another; and the molding comprises causing flow of a plurality of materials that are different in the molding apparatus to form a plurality of layers of the body.

In accordance with another aspect of the invention, there is provided an article of footwear for receiving a foot of a user, the article of footwear comprising a body that comprises a medial side portion to face a medial side of the user's foot, a lateral side portion to face a lateral side of the user's foot, a heel portion to receive a heel of the user's foot, and an ankle portion to receive an ankle of the user, wherein: the medial side portion, the lateral side portion, the heel portion, and the ankle portion of the body are molded together and integral with one another; and the body comprises a plurality of layers comprising a plurality of materials that are different and molded by flowing.

In accordance with another aspect of the invention, there is provided a skate boot for a skate, the skate comprising a skating device disposed beneath the skate boot to engage a skating surface, the skate boot defining a cavity to receive a foot of a user, the skate boot comprising a body that comprises a medial side portion to face a medial side of the user's foot, a lateral side portion to face a lateral side of the user's foot, a heel portion to receive a heel of the user's foot, and an ankle portion to receive an ankle of the user, wherein: the medial side portion, the lateral side portion, the heel portion, and the ankle portion of the body are molded together and integral with one another; and the body comprises a plurality of injection-molded layers comprising a plurality of materials that are different.

In accordance with another aspect of the invention, there is provided a method of making a skate boot for a skate, the skate comprising a skating device disposed beneath the skate boot to engage a skating surface, the skate boot defining a cavity to receive a foot of a user, the method comprising: providing an injection molding apparatus; and injection molding a body of the skate boot using the injection molding apparatus, the body comprising a medial side portion to face a medial side of the user's foot, a lateral side portion to face a lateral side of the user's foot, a heel portion to receive a heel of the user's foot, and an ankle portion to receive an ankle of the user, wherein: the medial side portion, the lateral side portion, the heel portion, and the ankle portion of the body are molded together and integral with one another; and the body comprises a plurality of injection-molded layers comprising a plurality of materials that are different.

In accordance with another aspect of the invention, there is provided a skate boot for a skate, the skate comprising a skating device disposed beneath the skate boot to engage a skating surface, the skate boot defining a cavity to receive a foot of a user, the skate boot comprising: a body comprising a medial side portion to face a medial side of the user's foot, a lateral side portion to face a lateral side of the user's foot, a heel portion to receive a heel of the user's foot, and an ankle portion to receive an ankle of the user; a tendon guard projecting upwardly from the body; and a slash guard comprising a cut-resistant material, extending above the body, and movable relative to the tendon guard.

These and other aspects of the invention will now become apparent to those of ordinary skill in the art upon review of the following description of embodiments of the invention in conjunction with the accompanying drawings.

BRIEF DESCRIPTION OF DRAWINGS

A detailed description of embodiments of the invention is provided below, by way of example only, with reference to drawings annexed hereto, in which:

FIG. 39 is a cross-sectional view of the shell of the skate boot in an embodiment in which the shell is a unitary shell (i.e., has no subshells);

FIG. 40 is a cross-sectional view of the shell of the skate boot in an embodiment in which the shell comprises subshells;

FIGS. 41A, 41B and 41C are cross-sectional views of the shell in embodiments in which at least one of the subshells comprise an opening in a sole region of the shell;

FIGS. 44A and 44B are cross-sectional views of the shell in embodiments in which the external subshell of the shell and/or the internal subshell of the shell comprises an opening at the sole region of the shell;

FIG. 45 is a cross-sectional view of the shell in an embodiment in which the footbed of the skate boot is formed integrally with the shell and is in contact with the external subshell of the shell;

FIG. 46 is a cross-sectional view of the shell in an embodiment in which the footbed of the skate boot is an insert that is disposed between given ones of the subshells of the shell;

FIG. 85 shows a top view of a portion of the slash guard of FIG. 83;

FIGS. 86A to 86D show examples of a variant in which the shell and/or blade holder and/or other components made integrally with the shell are molded as separate pieces which are then assembled together;

Figure 1:
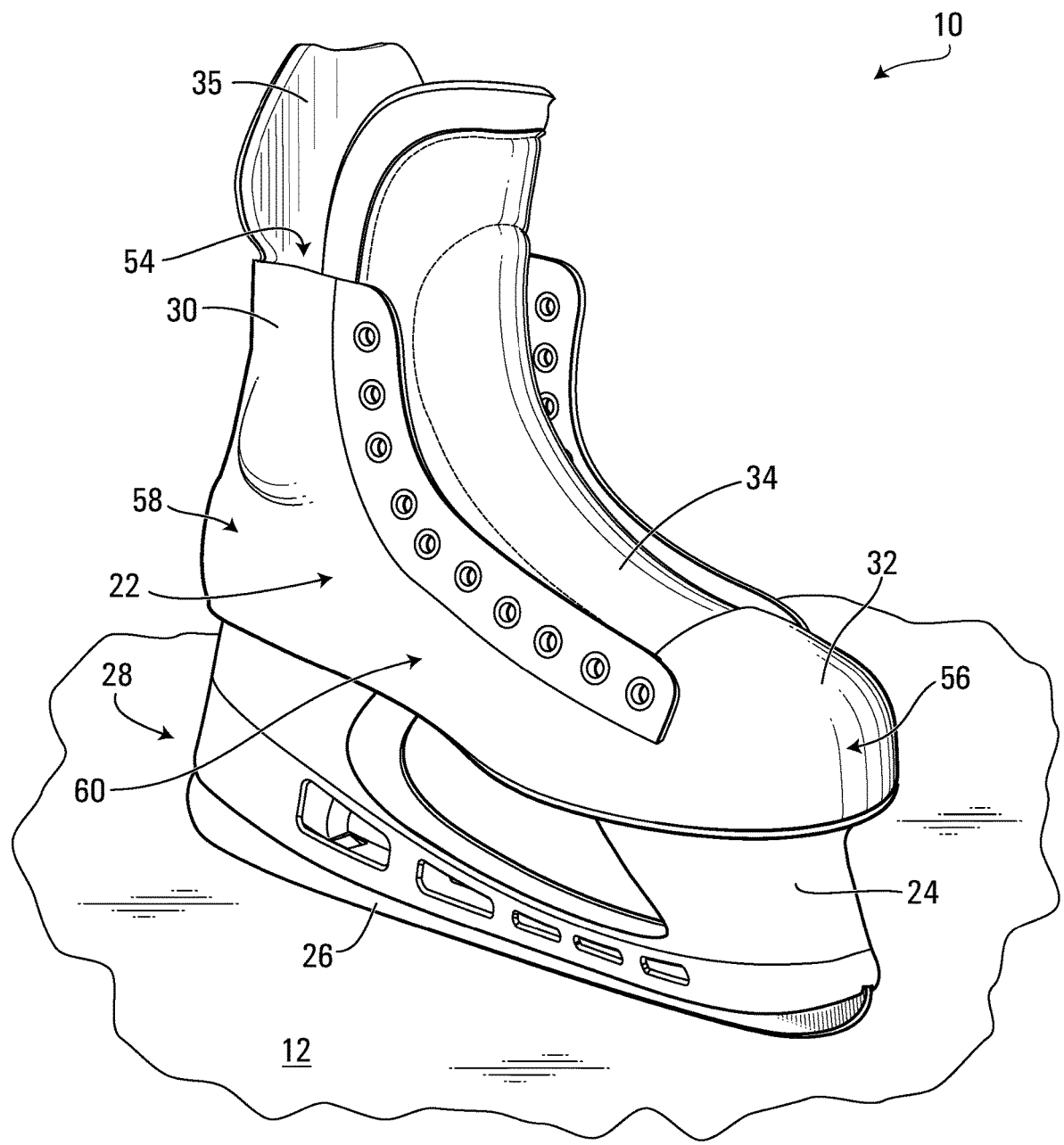
FIG. 1 is an example of a skate for a skater, in accordance with an embodiment of the invention.
Figure 2:
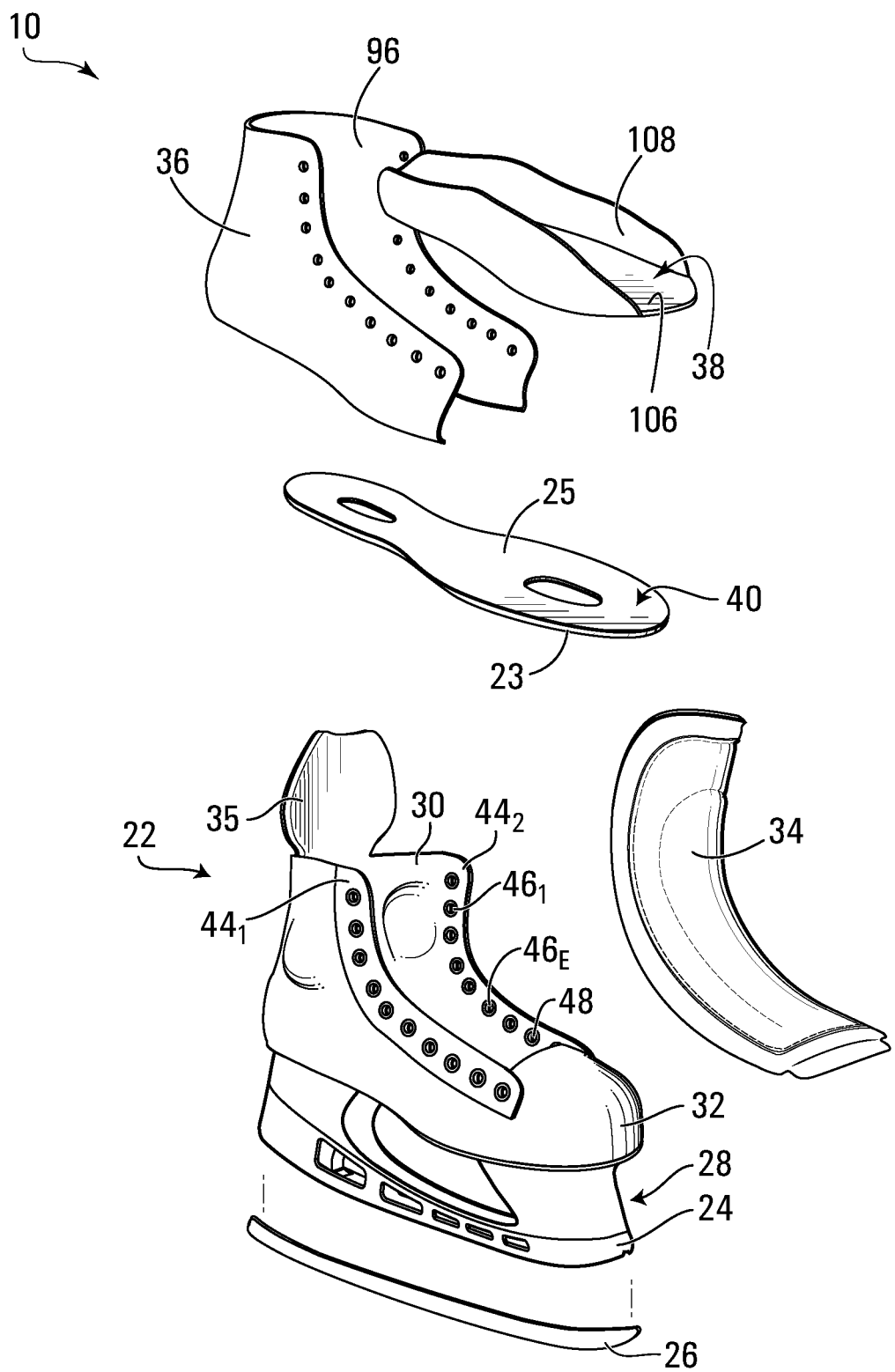
FIG. 2 is an exploded view of the skate.

In the drawings, embodiments of the invention are illustrated by way of example. It is to be expressly understood that the description and drawings are only for purposes of illustration and as an aid to understanding, and are not intended to be a definition of the limits of the invention.

DETAILED DESCRIPTION OF EMBODIMENTS

FIG. 1 shows an example of footwear 10 for a wearer in accordance with an embodiment of the invention. In this example, the footwear 10 is a skate for a skater to skate on a skating surface 12. In this embodiment, the skate 10 is a hockey skate for the skater who is a hockey player playing hockey. In this example, the skate 10 is an ice skate, a type of hockey played is ice hockey, and the skating surface 12 is ice.

The skate 10 comprises a skate boot 22 for receiving a foot 11 of the player and a skating device 28 disposed beneath the skate boot 22 to engage the skating surface 12. In this embodiment, the skating device 28 comprises a blade 26 for contacting the ice 12 and a blade holder 24 between the skate boot 22 and the blade 26. The skate 10 has a longitudinal direction, a widthwise direction, and a heightwise direction.

In this embodiment, as further discussed below, the skate 10, including at least part of the skate boot 22 and possibly at least part of one or more other components (e.g., the blade holder 24), is constructed from one or more materials (e.g., foams) molded by flowing in molding equipment during a molding process (e.g., injection molding or casting). This may allow the skate 10 to have useful performance characteristics (e.g., reduced weight, proper fit and comfort, etc.) while being more cost-effectively manufactured.

Figure 94:
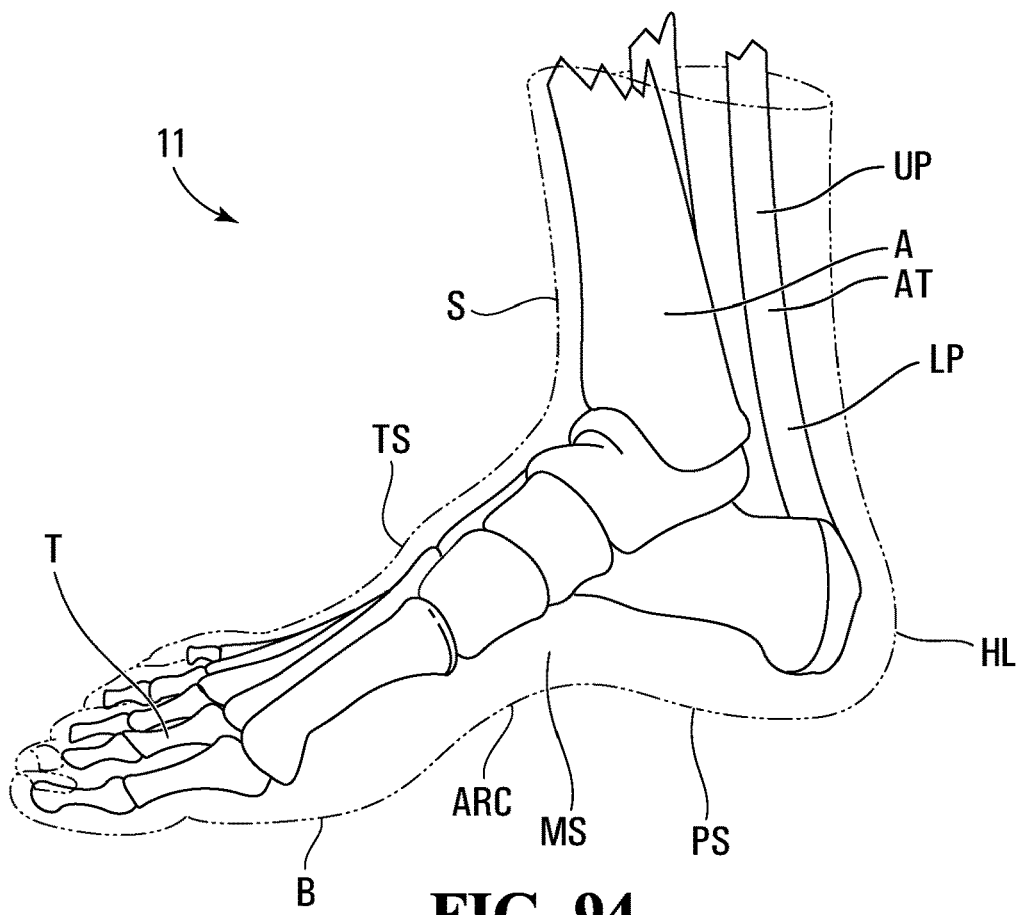
FIGS. 94 and 95 are side and front views of a right foot of the skater with an integument of the foot shown in dotted lines and bones shown in solid lines.
Figure 95:
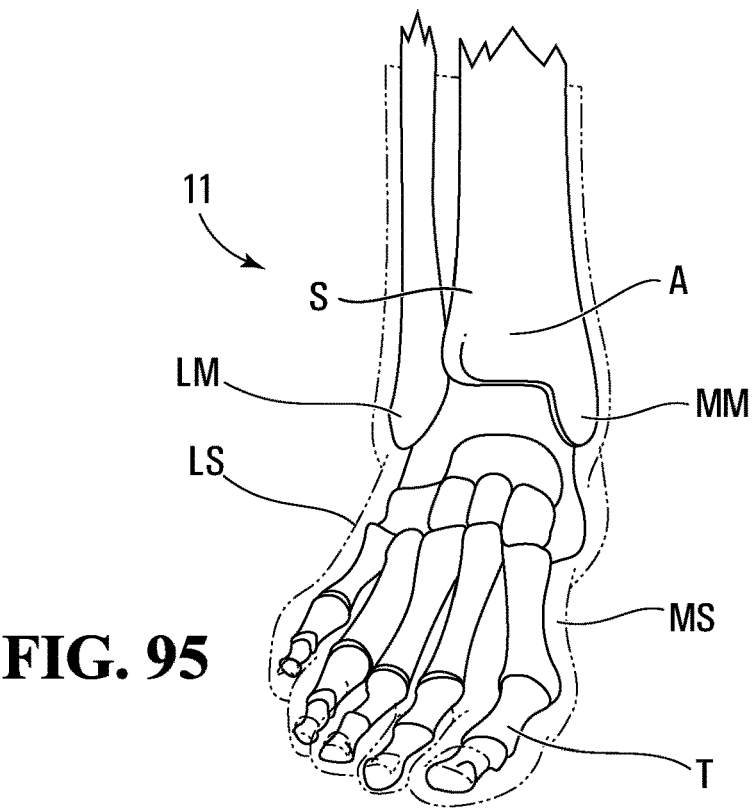

The skate boot 22 defines a cavity 54 for receiving the player's foot 11. With additional reference to FIGS. 94 and 95, the player's foot 11 includes toes T, a ball B, an arch ARC, a plantar surface PS, a top surface TS, a medial side MS, and a lateral side LS. The top surface TS of the player's foot 11 is continuous with a lower portion of a shin S of the player. In addition, the player has a heel HL, an Achilles tendon AT, and an ankle A having a medial malleolus MM and a lateral malleolus LM that is at a lower position than the medial malleolus MM. The Achilles tendon AT has an upper part UP and a lower part LP projecting outwardly with relation to the upper part UP and merging with the heel HL. A forefoot of the player includes the toes T and the ball B, a hindfoot of the player includes the heel HL, and a midfoot of the player is between the forefoot and the hindfoot.

The skate boot 22 comprises a front portion 56 for receiving the toes T of the player, a rear portion 58 for receiving the heel HL and at least part of the Achilles tendon AT and the ankle A of the player, and an intermediate portion 60 between the front portion 56 and the rear portion 58.

More particularly, in this embodiment, the skate boot 22 comprises a shell 30, a toe cap 32, a tongue 34, a tendon guard 35, a liner 36, a footbed 38, and an insole 40. The skate boot 22 also comprises lace members $44_1$, $44_2$ and eyelets $46_1$-$46_E$ extending through (e.g., punched into) the lace members $44_1$, $44_2$, the shell 30 and the liner 36 vis-à-vis apertures 48 in order to receive laces for tying on the skate 10. In some embodiments, the skate boot 22 may not comprise any lace members and the eyelets $46_1$-$46_E$ may extend directly through the shell 30 and the liner 36 via the apertures 48.

Figure 3:
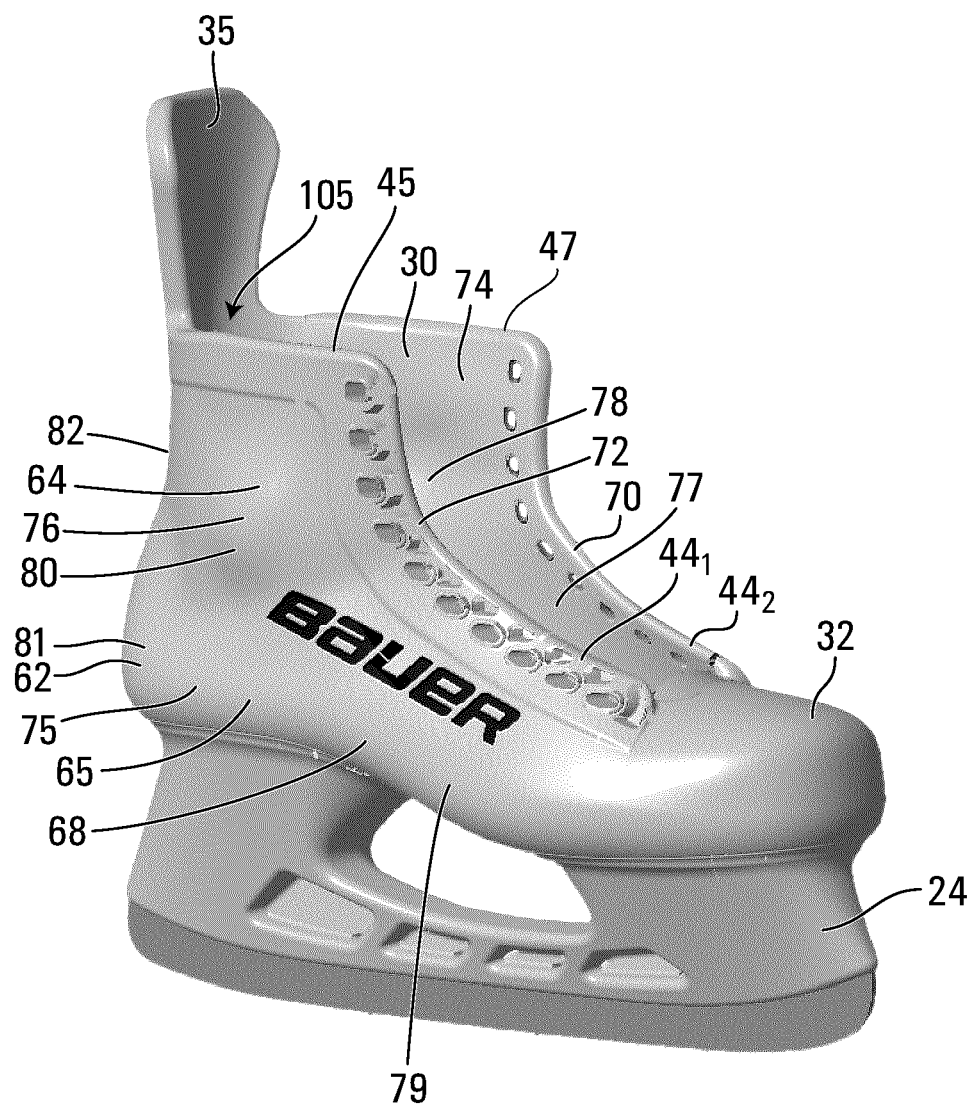
FIG. 3 is a perspective view of a shell of a skate boot of the skate.

The shell 30 is a body of the skate boot 22 that imparts strength and structural integrity to the skate 10 to support the player's foot 11. More particularly, in this embodiment, as shown in FIG. 3, the shell 30 comprises a heel portion 62 for receiving the heel HL of the player, an ankle portion 64 for receiving the ankle A of the player, medial and lateral side portions 66, 68 for respectively facing the medial and lateral sides MS, LS of the player's foot 11, and a sole portion 69 for facing the plantar surface PS of the player's foot 11. The shell 30 thus includes a quarter 75 which comprises a medial quarter part 77, a lateral quarter part 79, and a heel counter 81. The medial and lateral side portions 66, 68 include upper edges 70, 72 which, in this embodiment, constitute upper edges of the lace members $44_1$, $44_2$ (i.e., the lace members $44_1$, $44_2$ are made integrally with the shell as will be described later). The heel portion 62 may be formed such that it is substantially cup-shaped for following the contour of the heel HL of the player. The ankle portion 64 comprises medial and lateral ankle sides 74, 76. The medial ankle side 74 has a medial depression 78 for receiving the medial malleolus MM of the player and the lateral ankle side 76 has a lateral depression 80 for receiving the lateral malleolus LM of the player. The lateral depression 80 is located slightly lower than the medial depression 78 for conforming to the morphology of the player's foot 11. The ankle portion 64 further comprises a rear portion 82 facing the lower part LP of the Achilles tendon AT of the player.

Figure 11:
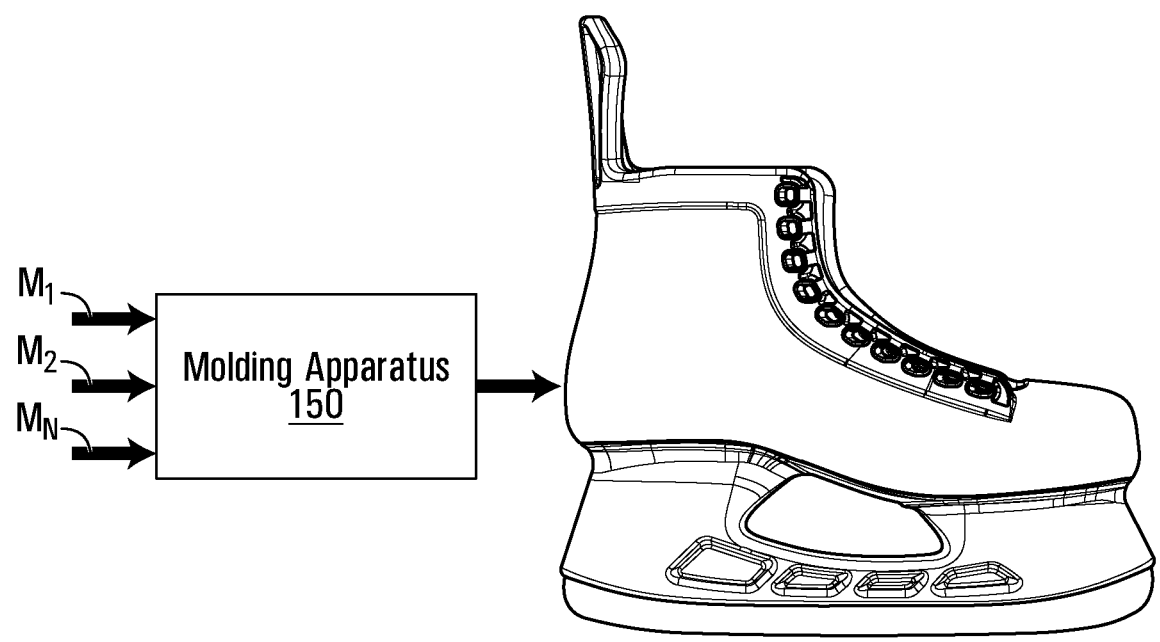
FIG. 11 is a block diagram showing a molding process implementing a molding apparatus to form the shell of the skate boot.

In this embodiment, with additional reference to FIG. 11, the shell 30 comprises one or more materials molded into a shape of the shell 30 by flowing in a molding apparatus 150 during a molding process (e.g., injection molding or casting). More particularly, in this embodiment, the shell 30 comprises a plurality of materials $M_1$-$M_N$ that are molded into the shape of the shell 30 by flowing in the molding apparatus 150 during the molding process. The materials $M_1$-$M_N$ are different from one another, such as by having different chemistries and/or exhibiting substantially different values of one or more material properties (e.g., density, modulus of elasticity, hardness, etc.). In this example, the materials $M_1$-$M_N$ are arranged such that the shell 30 comprises a plurality of layers $85_1$-$85_L$ which are made of respective ones of the materials $M_1$-$M_N$. In that sense, in this case, the shell 30 may be referred to as a "multilayer" shell and the layers $85_1$-$85_L$ of the shell 30 may be referred to as "subshells". This may allow the skate 10 to have useful performance characteristics (e.g., reduced weight, proper fit and comfort, etc.) while being more cost-effectively manufactured.

The materials $M_1$-$M_N$ may be implemented in any suitable way. In this embodiment, each of the materials $M_1$-$M_N$ is a polymeric material. For example, in this embodiment, each of the polymeric materials $M_1$-$M_N$ is polyurethane (PU). Any other suitable polymer may be used in other embodiments (e.g., polypropylene, ethylene-vinyl acetate (EVA), nylon, polyester, vinyl, polyvinyl chloride, polycarbonate, polyethylene, an ionomer resin (e.g., Surlyn®), styrene-butadiene copolymer (e.g., K-Resin®) etc.), self-reinforced polypropylene composite (e.g., Curv®), or any other thermoplastic or thermosetting polymer).

In this example of implementation, each of the polymeric materials $M_1$-$M_N$ is a foam. In this case, each of the polymeric materials $M_1$-$M_N$ is a PU foam. This foamed aspect may allow the shell 30 to be relatively light while providing strength. For instance, in some embodiments, a density of each of the polymeric materials $M_1$-$M_N$ may be no more than 40 kg/m$^3$, in some cases no more than 30 kg/m$^3$, in some cases no more than 20 kg/m$^3$, in some cases no more than 15 kg/m$^3$, in some cases no more 10 kg/m$^3$ and in some cases even less. One or more of the polymeric materials $M_1$-$M_N$ may not be foam in other examples of implementation.

In this embodiment, the materials $M_1$-$M_N$ of the subshells $85_1$-$85_L$ of the shell 30 constitute at least part of the heel portion 62, the ankle portion 64, the medial and lateral side portions 66, 68, and the sole portion 69 of the shell 30. More particularly, in this embodiment, the materials $M_1$-$M_N$ constitute at least a majority (i.e., a majority or an entirety) of the heel portion 62, the ankle portion 64, the medial and lateral side portions 66, 68, and the sole portion 69 of the shell 30. In this example, the materials $M_1$-$M_N$ constitute the entirety of the heel portion 62, the ankle portion 64, the medial and lateral side portions 66, 68, and the sole portion 69 of the shell 30.

The subshells $85_1$-$85_L$ constituted by the polymeric materials $M_1$-$M_N$ may have different properties for different purposes.

For instance, in some cases, a polymeric material $M_x$ may be stiffer than a polymeric material $M_y$ such that a subshell comprising the polymeric material $M_x$ is stiffer than a subshell comprising the polymeric material $M_y$. For example, a ratio of a stiffness of the subshell comprising the polymeric material $M_x$ over a stiffness of the subshell comprising the polymeric material $M_y$ may be at least 1.5, in some cases at least 2, in some cases at least 2.5, in some cases 3, in some cases 4 and in some cases even more.

In some cases, a given one of the subshells $85_1$-$85_L$ may be configured to be harder than another one of the subshells $85_1$-$85_L$. For instance, to provide a given subshell with more hardness than another subshell, the hardness of the polymeric materials $M_1$-$M_N$ may vary. For example, a hardness of the polymeric material $M_x$ may be greater than a hardness of the polymeric material $M_y$. For example, in some cases, a ratio of the hardness of the polymeric material $M_x$ over the hardness of the polymeric material $M_y$ may be at least 1.5, in some cases at least 2, in some cases at least 2.5, in some cases at least 3, in some cases at least 4, in some cases at least 5 and in some cases even more.

Figure 72:
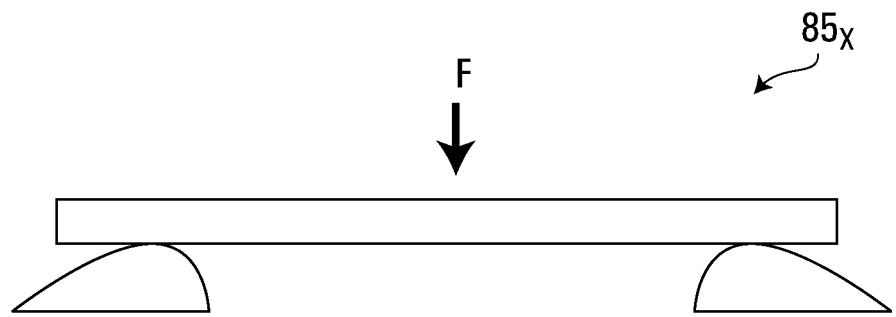
FIG. 72 shows an example of a test for determining the stiffness of a part of a subshell.

To observe the stiffness of a subshell $85_x$, as shown in FIG. 72, a part of the subshell $85_x$ can be isolated from the remainder of the subshell $85_x$ (e.g., by cutting, or otherwise removing the part from the subshell $85_x$, or by producing the part without the remainder of the subshell $85_x$) and a three-point bending test can be performed on the part to subject it to loading tending to bend the part in specified ways (along a defined direction of the part if the part is anisotropic) to observe the rigidity of the part and measure parameters indicative of the rigidity of the part. For instance in some embodiments, the three-point bending test may be based on conditions defined in a standard test (e.g., ISO 178(2010)).

For example, to observe the rigidity of the subshell $85_x$, the three-point bending test may be performed to subject the subshell $85_x$ to loading tending to bend the subshell $85_x$ until a predetermined deflection of the subshell $85_x$ is reached and measure a bending load at that predetermined deflection of the subshell $85_x$. The predetermined deflection of the subshell $85_x$ may be selected such as to correspond to a predetermined strain of the subshell $85_x$ at a specified point of the subshell $85_x$ (e.g., a point of an inner surface of the subshell $85_x$). For instance, in some embodiments, the predetermined strain of the subshell $85_x$ may be between 3% and 5%. The bending load at the predetermined deflection of the subshell $85_x$ may be used to calculate a bending stress at the specified point of the subshell $85_x$. The bending stress at the specified point of the subshell $85_x$ may be calculated as $\sigma = My/I$, where M is the moment about a neutral axis of the subshell $85_x$ caused by the bending load, y is the perpendicular distance from the specified point of the subshell $85_x$ to the neutral axis of the subshell $85_x$, and l is the second moment of area about the neutral axis of the subshell $85_x$. The rigidity of the subshell $85_x$ can be taken as the bending stress at the predetermined strain (i.e., at the predetermined deflection) of the subshell $85_x$. Alternatively, the rigidity of the subshell $85_x$ may be taken as the bending load at the predetermined deflection of the subshell $85_x$.

A stiffness of the subshells $85_1$-$85_L$ may be related to a modulus of elasticity (i.e., Young's modulus) of the polymeric materials $M_1$-$M_N$ associated therewith. For example, to provide a given subshell with more stiffness than another subshell, the modulus of elasticity of the polymeric materials $M_1$-$M_N$ may vary. For instance, in some embodiments, the modulus of elasticity of the polymeric material $M_x$ may be greater than the modulus of elasticity of the polymeric material $M_y$. For example, in some cases, a ratio of the modulus of elasticity of the polymeric material $M_x$ over the modulus of elasticity of the polymeric material $M_y$ may be at least 1.5, in some cases at least 2, in some cases at least 2.5, in some cases at least 3, in some cases at least 4, in some cases at least 5 and in some cases even more. This ratio may have any other suitable value in other embodiments.

Figure 12:
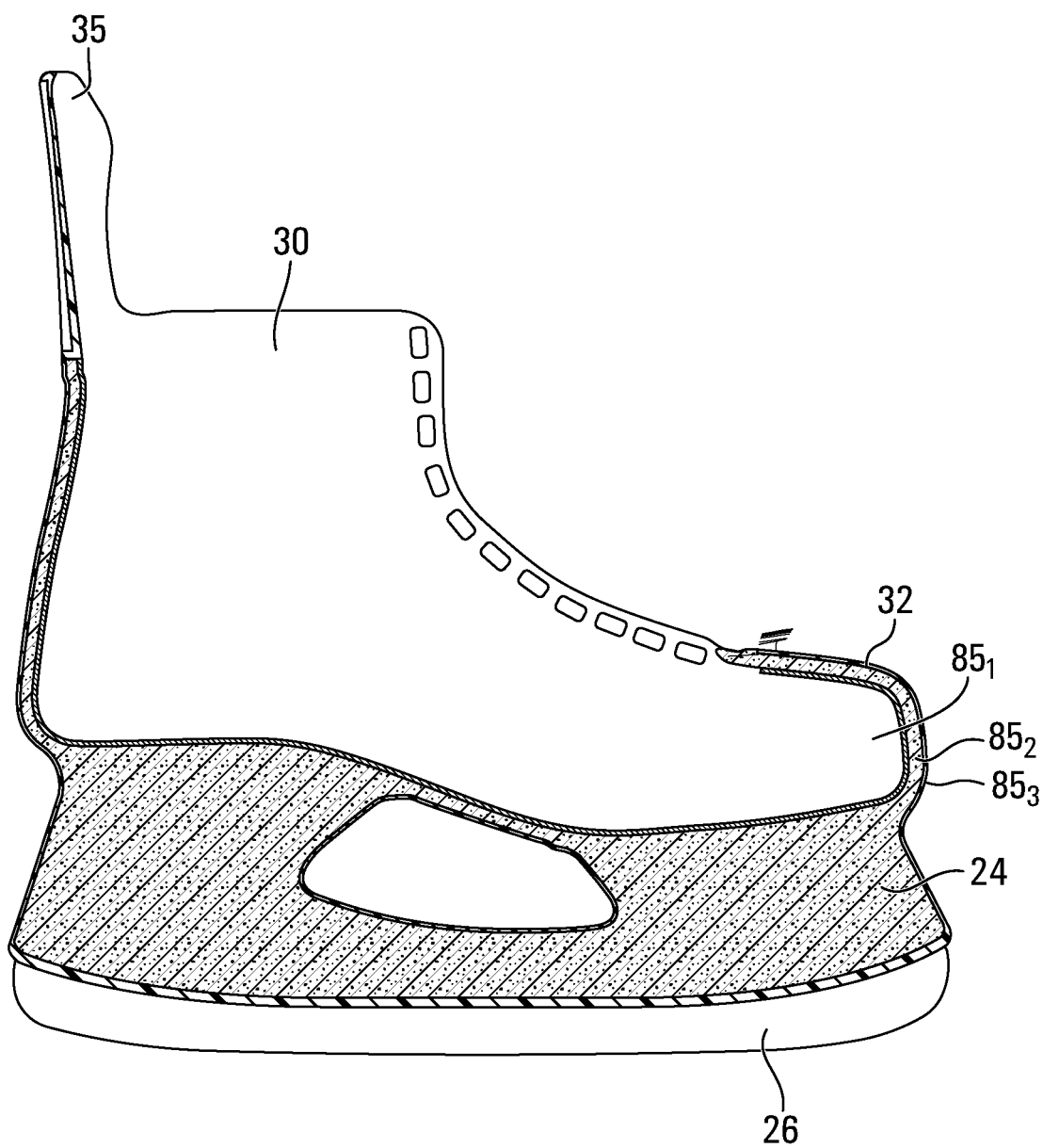
FIG. 12 is a cross-sectional view of the shell showing a plurality of subshells of the shell, including an internal, an intermediate and an external subshell of the shell.

In some cases, a given one of the subshells $85_1$-$85_L$ may be configured to be denser than another one of the subshells $85_1$-$85_L$. For instance, to provide a given subshell with more density than another subshell, the density of the polymeric materials $M_1$-$M_N$ may vary. For instance, in some embodiments, the polymeric material $M_x$ may have a density that is greater than a density of the polymeric material $M_y$. For example, in some cases, a ratio of the density of the material $M_x$ over the density of the material $M_y$ may be at least 1.1, in some cases at least 1.5, in some cases at least 2, in some cases at least 2.5, in some cases at least 3 and in some cases even more. a certain value In this embodiment, as shown in FIG. 12, the subshells $85_1$-$85_L$ comprise an internal subshell $85_1$, an intermediate subshell $85_2$ and an external subshell $85_3$. The internal subshell $85_1$ is "internal" in that it is an innermost one of the subshells $85_1$-$85_L$. That is, the internal subshell $85_1$ is closest to the player's foot 11 when the player dons the skate 10. In a similar manner, the external subshell $85_3$ is "external" in that is an outermost one of the subshells $85_1$-$85_L$. That is, the external subshell $85_3$ is furthest from the player's foot 11 when the player dons the skate 10. The intermediate subshell $85_2$ is disposed between the internal and external subshells $85_1$, $85_3$.

The internal, intermediate and external subshells $85_1$, $85_2$, $85_3$ comprise respective polymeric materials $M_1$, $M_2$, $M_3$. In this embodiment, the polymeric materials $M_1$, $M_2$, $M_3$ have different material properties that impart different characteristics to the internal, intermediate and external subshells $85_1$, $85_2$, $85_3$. As a result, in certain cases, a given one of the subshells $85_1$, $85_2$, $85_3$ may be more resistant to impact than another one of the subshells $85_1$, $85_2$, $85_3$, a given one of the subshells $85_1$, $85_2$, $85_3$ may be more resistant to wear than another one of the subshells $85_1$, $85_2$, $85_3$, and/or a given one of the subshells $85_1$, $85_2$, $85_3$ may be denser than another one of the subshells $85_1$, $85_2$, $85_3$.

For instance, a density of each of the internal, intermediate and external subshells $85_1$, $85_2$, $85_3$ may vary. For example, in this embodiment, the densities of the internal, intermediate and external subshells $85_1$, $85_2$, $85_3$ increase inwardly such that the density of the internal subshell $85_1$ is greater than the density of the intermediate subshell $85_2$ which in turn is greater than the density of the external subshell $85_3$. For example, the density of the internal subshell $85_1$ may be approximately 30 kg/m$^3$, while the density of the intermediate subshell $85_2$ may be approximately 20 kg/m$^3$, and the density of the external subshell $85_3$ may be approximately 10 kg/m$^3$. The densities of the internal, intermediate and external subshells $85_1$, $85_2$, $85_3$ may have any other suitable values in other embodiments. In other embodiments, the densities of the internal, intermediate and external subshells $85_1$, $85_2$, $85_3$ may increase outwardly such that the external subshell 853 is the densest of the subshells $85_1$-$85_L$. In yet other embodiments, the densities of the internal, intermediate and external subshells $85_1$, $85_2$, $85_3$ may not be arranged in order of ascending or descending density.

Moreover, in this embodiment, a stiffness of the internal, intermediate and external subshells $85_1$, $85_2$, $85_3$ may vary. For example, in this embodiment, the stiffness of the internal subshell $85_1$ is greater than the respective stiffness of each of the intermediate subshell $85_2$ and the external subshell $85_3$.

In addition, in this embodiment, a thickness of the internal, intermediate and external subshells $85_1$, $85_2$, $85_3$ may vary. For example, in this embodiment, the intermediate subshell $85_2$ has a thickness that is greater than a respective thickness of each of the internal and external subshells $85_1$, $85_3$. For example, in some cases, the thickness of each of the internal, intermediate and external subshells $85_1$, $85_2$, $85_3$ may be between 0.1 mm to 25 mm, and in some cases between 0.5 mm to 10 mm. For instance, the thickness of each of the internal, intermediate and external subshells $85_1$, $85_2$, $85_3$ may be no more than 30 mm, in some cases no more than 25 mm, in some cases no more than 15 mm, in some cases no more than 10 mm, in some cases no more than 5 mm, in some cases no more than 1 mm, in some cases no more than 0.5 mm, in some cases no more than 0.1 mm and in some cases even less.

In order to provide the internal, intermediate and external subshells $85_1$, $85_2$, $85_3$ with their different characteristics, the polymeric materials $M_1$, $M_2$, $M_3$ of the internal, intermediate and external subshells $85_1$, $85_2$, $85_3$ may comprise different types of polymeric materials. For instance, in this example, the polymeric material $M_1$ comprises a generally soft and dense foam, the polymeric material $M_2$ comprises a structural foam that is more rigid than the foam of the polymeric material $M_1$ and less dense than the polymeric material $M_1$, and the polymeric material $M_3$ is a material other than foam. For example, the polymeric material $M_3$ of the external subshell $85_3$ may consist of a clear polymeric coating.

The subshells $85_1$-$85_L$ may be configured in various other ways in other embodiments. For instance, in other embodiments, the shell 30 may comprise a different number of subshells or no subshells. For example, in some embodiments, as shown in FIG. 39, the shell 30 may be a single shell and therefore does not comprise any subshells. In other embodiments, as shown in FIG. 40, the shell 30 may comprise two subshells $85_1$-$85_L$.

Figure 42:
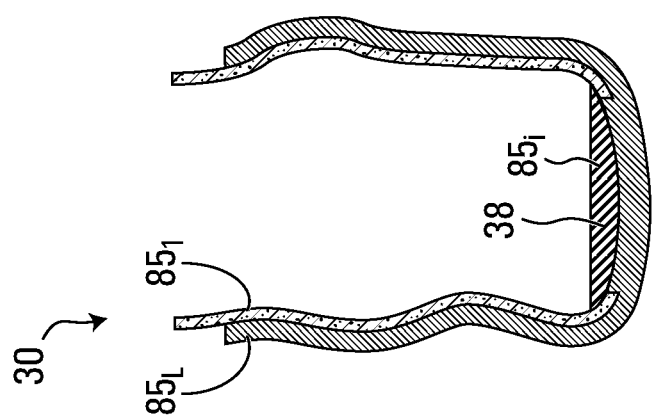

Moreover, as shown in FIGS. 41A to 41C, when the shell 30 comprises two subshells, notably interior and exterior subshells $85_{INT}$, $85_{EXT}$, if the exterior subshell $85_{EXT}$ has a density that is greater than a density of the interior subshell $85_{INT}$, a given one of the subshells $85_{INT}$, $85_{EXT}$ may have an opening, which can be referred to as a gap, along at least part of the sole portion 69 of the shell 30 (e.g., along a majority of the sole portion 69 of the shell 30). For example, as shown in FIG. 41A, in some embodiments, the exterior subshell $85_{EXT}$ may comprise a gap G at the sole portion 69 of the shell 30 such that the interior and exterior subshells $85_{INT}$, $85_{EXT}$ do not overlie one another at the sole portion 69 of the shell 30 (i.e., the interior subshell $85_{INT}$ may be the only subshell present at the sole portion 69 of the shell 30). As shown in FIG. 41B, in an embodiment in which the exterior subshell $85_{EXT}$ has a gap at the sole portion 69 of the shell 30, the interior subshell $85_{INT}$ may project outwardly toward the exterior subshell $85_{EXT}$ at the sole portion 69 of the shell 30 and fill in the gap of the exterior subshell $85_{EXT}$ such that a thickness of the interior subshell $85_{INT}$ is greater at the sole portion 69 of the shell 30. As another example, as shown in FIG. 41C, in an embodiment in which the interior subshell $85_{INT}$ has a gap at the sole portion 69 of the shell 30, the exterior subshell $85_{EXT}$ may project inwardly toward the interior subshell $85_{INT}$ at the sole portion 69 of the shell 30 and fill in the gap of the interior subshell $85_{INT}$ such that a thickness of the exterior subshell $85_{EXT}$ is greater at the sole portion 69 of the shell 30. As shown in FIG. 42, the footbed 38 may be formed integrally with the shell 30 such as to cover at least partially an inner surface of the innermost subshell (in this case, the interior subshell $85_{INT}$) and overlie the sole portion 69 of the shell 30. In other cases, the footbed 38 may be inserted separately after the molding process of the shell 30 has been completed.

In some embodiments, as shown in FIGS. 44A and 44B, when the shell 30 comprises three subshells, notably the internal, intermediate and external subshells $85_1$, $85_2$, $85_3$, and the external subshell $85_3$ has a density that is greater than a density of the intermediate subshell $85_2$, the external subshell $85_3$ may comprise a gap 61 at the sole portion 69 of the shell 30 and the intermediate subshell $85_2$ may project into the external subshell $85_3$ at the sole portion 69 of the shell 30 such as to fill in the gap 61 of the external subshell $85_3$. In such embodiments, the intermediate subshell $85_2$ may have a greater thickness at the sole portion 69 of the shell 30.

Figure 50:
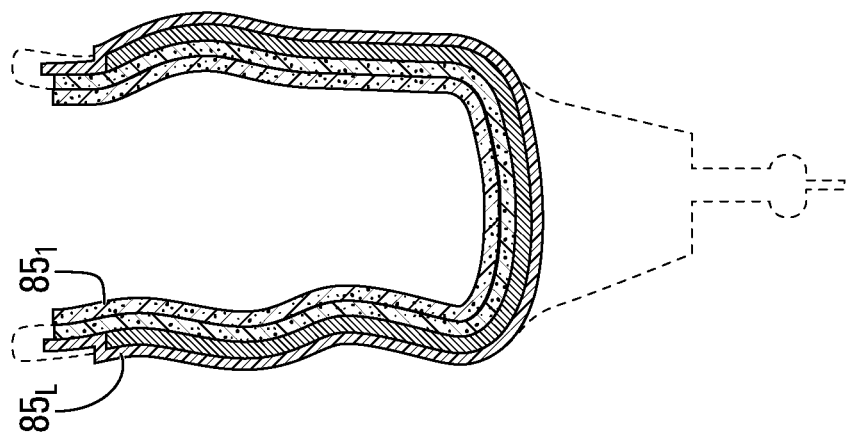
FIG. 50 is a cross-sectional view of the shell in an embodiment in which the shell comprises four subshells.

In some embodiments, as shown in FIG. 50, the subshells $85_1$-$85_L$ of the shell 30 may include four subshells $85_1$, $85_2$, $85_3$, $85_4$.

In this embodiment, the subshells $85_1$-$85_L$ constituted by the polymeric materials $M_1$-$M_N$ are integral with one another such that they constitute a monolithic one-piece structure. That is, the subshells $85_1$-$85_L$ constituted by the polymeric materials $M_1$-$M_N$ are integrally connected to one another such that the shell 30 is a one-piece shell. In this example of implementation, this is achieved by the subshells $85_1$-$85_L$ bonding to one another in the molding apparatus 150 during the molding process by virtue of chemical bonding of the polymeric materials $M_1$-$M_N$.

The subshells $85_1$-$85_L$ constituted by the polymeric materials $M_1$-$M_N$ are molded into the shape of the shell 30 by flowing into the molding apparatus 150 during the molding process. In this embodiment, the molding process comprises causing the polymeric materials $M_1$-$M_N$ to flow (i.e., in liquid or other fluid form) in the molding apparatus 150 so as to form the subshells $85_1$-$85_L$ and thus the shell 30 within the molding apparatus 150 and recovering the shell 30 from the molding apparatus 150 once its molding is completed.

Figure 13:
FIG. 13 is an example of a last of the molding apparatus used to form the shell.

In this embodiment, the molding process of the shell 30 is injection molding and the molding apparatus 150 comprises a male mold 152 (also commonly referred to as a "last") with which all the polymeric materials $M_1$-$M_N$ are molded into shape, as shown in FIG. 13. That is, in this example, the last 152 is a single last with which all of the subshells $85_1$-$85_L$ of the shell 30 are formed. The molding apparatus 150 also comprises a plurality of female molds $154_1$-$154_N$, each female mold $154_i$ being configured to contain the last 152 at different stages of the molding process. In this embodiment, each female mold $154_i$ comprises first and second portions 155, 157 that are secured together to contain the last 152.

An example of a method for molding the shell 30 comprising the internal, intermediate and external subshells $85_1$, $85_2$, $85_3$ will be described in more detail below with reference to FIGS. 14 to 16.

Figure 14:
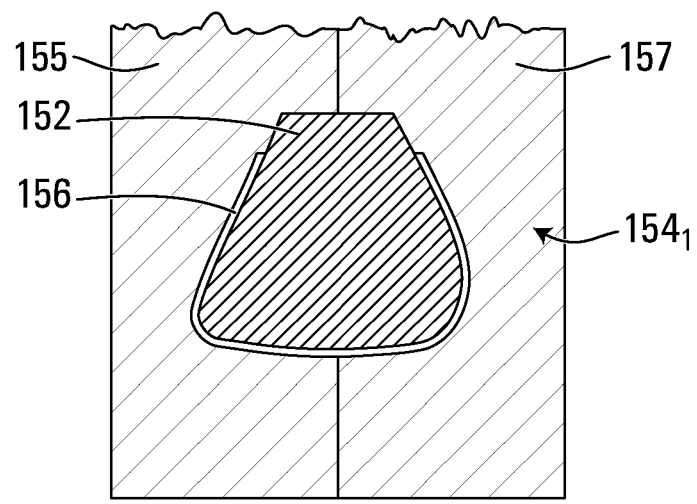
FIG. 14 is a cross-sectional view of the last and a first female mold used to produce the internal subshell of the shell.

With additional reference to FIG. 14, in order to mold the internal subshell $85_1$, the last 152 is secured within a first female mold $154_1$ to form a mold cavity 156 between the last 152 and the first female mold $154_1$. The mold cavity 156 has a shape of the desired internal subshell $85_1$. The mold cavity 156 is then filled with a desired polymeric material $M_1$ via a sprue, runner and gate system (not shown) of the first female mold $154_1$ and left to cure. Once the polymeric material $M_1$ has cured for a sufficient amount of time to form the internal subshell $85_1$, the first female mold $154_1$ is opened (i.e., its first and second portions 155, 157 are separated from one another) and removed from the molding apparatus 150 while the last 152 remains on the molding apparatus 150 with the internal subshell $85_1$ still on it.

Figure 15:
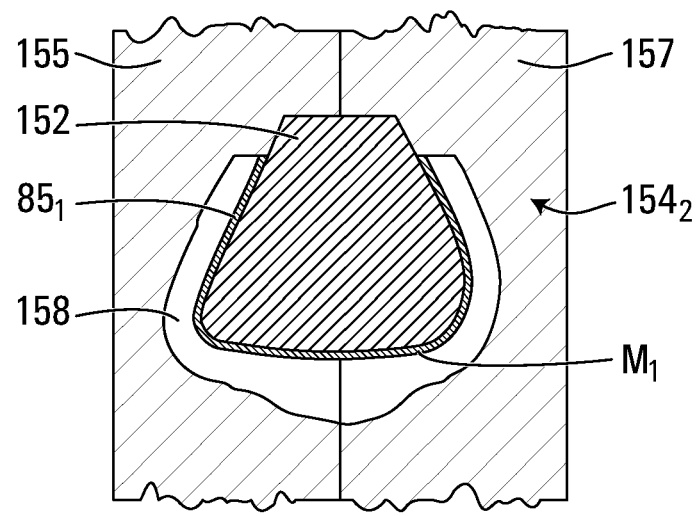
FIG. 15 is a cross-sectional view of the last and a second female mold used to produce the intermediate subshell of the shell.

At this stage, with additional reference to FIG. 15, in order to form the intermediate subshell $85_2$, a second female mold $154_2$ is installed on the molding apparatus 150. The last 152 is secured within the second female mold $154_2$ to form a mold cavity 158 between the internal subshell $85_1$ (and in some cases at least part of the last 152) and the second female mold $154_2$. The mold cavity 158 has a shape of the desired intermediate subshell $85_2$. The mold cavity 158 is then filled with a desired polymeric material $M_2$ via a sprue, runner and gate system (not shown) of the second female mold $154_2$ and left to cure. Once the polymeric material $M_2$ has cured for a sufficient amount of time to form the intermediate subshell $85_2$, the second female mold $154_2$ is opened (i.e., its first and second portions 155, 157 are separated from one another) and removed from the molding apparatus 150 while the last 152 remains on the molding apparatus 150 with the internal subshell $85_1$ and the intermediate subshell $85_2$ still on it.

Figure 16:
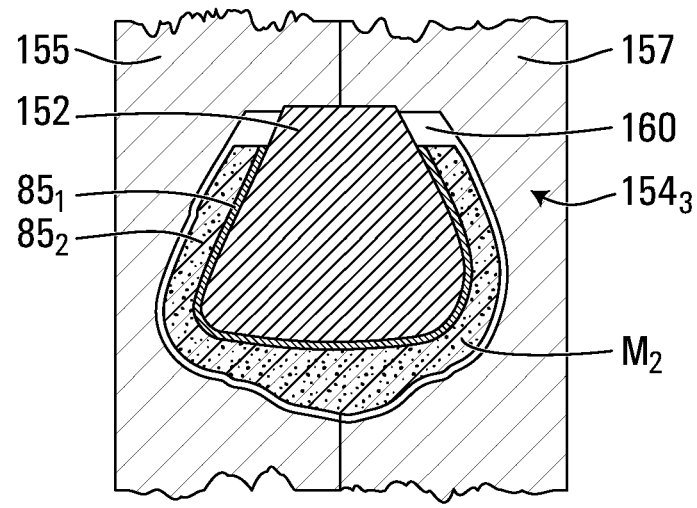
FIG. 16 is a cross-sectional view of the last and a third female mold used to produce the external subshell of the shell.

With additional reference to FIG. 16, in order to form the external subshell $85_3$, a third female mold $154_3$ is installed on the molding apparatus 150. The last 152 is secured within the third female mold $154_3$ to form a mold cavity 160 between the intermediate subshell $85_2$ (and in some cases at least part of the last 152, and in some cases at least part of the internal subshell $85_1$) and the third female mold $154_3$. The mold cavity 160 has a shape of the desired external subshell $85_3$. The mold cavity 160 is then filled with a desired polymeric material $M_3$ via a sprue, runner and gate system (not shown) of the third female mold $154_3$ and left to cure.

Once the polymeric material $M_3$ has cured for a sufficient amount of time to form the external subshell $85_3$, the shell 30, including its now formed internal, intermediate and external subshells $85_1$, $85_2$, $85_3$, is demolded from (i.e., removed from) the last 152. This may be achieved in various ways. For instance, in some cases, the polymeric materials $M_1$, $M_2$, $M_3$ which constitute the internal, intermediate and external subshells $85_1$, $85_2$, $85_3$ may have sufficient elasticity to allow an operator of the molding apparatus 150 to remove the shell 30 from the last 152 by flexing the internal, intermediate and external subshells $85_1$, $85_2$, $85_3$ of the shell 30. In other cases, the shell 30 may be removed from the last 152 while at least a given one of the internal, intermediate and external subshells $85_1$, $85_2$, $85_3$ has not fully cured such that the shell 30 has some flexibility that it would not have if the at least one given one of the internal, intermediate and external subshells $85_1$, $85_2$, $85_3$ had fully cured. Moreover, in some cases, the last 152 may be an inflatable last that can be expanded and retracted by controlling a fluid pressure within the last 152. For instance, the inflatable last 152 may be filled with air (or any other fluid) to expand the inflatable last 152 to a "molding" size at which the molding process is carried out, and then emptied of air to contract the inflatable last 152 to a "demolding" size that is less than the molding size and at which the demolding of the shell 30 from the last 152 can be carried out. In some cases, the last 152 may comprise a plurality of pieces that may be disassembled to facilitate removal of the shell 30 from the last 152.

While the molding process has been described as being performed on a single molding apparatus 150, in some embodiments, the molding process may utilize various molding apparatuses (e.g., molding stations), each apparatus comprising a different female mold $154_i$. In such embodiments, the last 152, still mounted with at least one subshell $85_i$, can be moved from one molding station to the next without requiring removal of the female molds installed on the various molding apparatuses.

Figure 19:
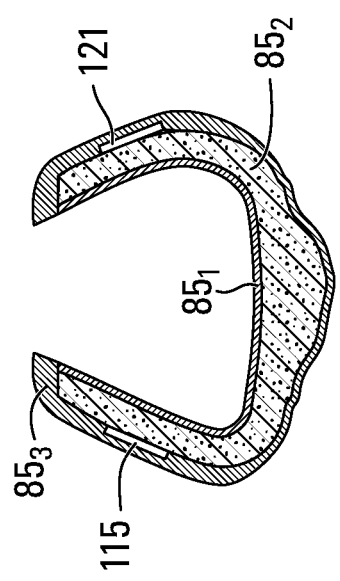
FIG. 19 is a cross-sectional view of the shell in an embodiment in which the shell comprises a reinforcement and a design element disposed between the intermediate subshell and the external subshell.
Figure 18:
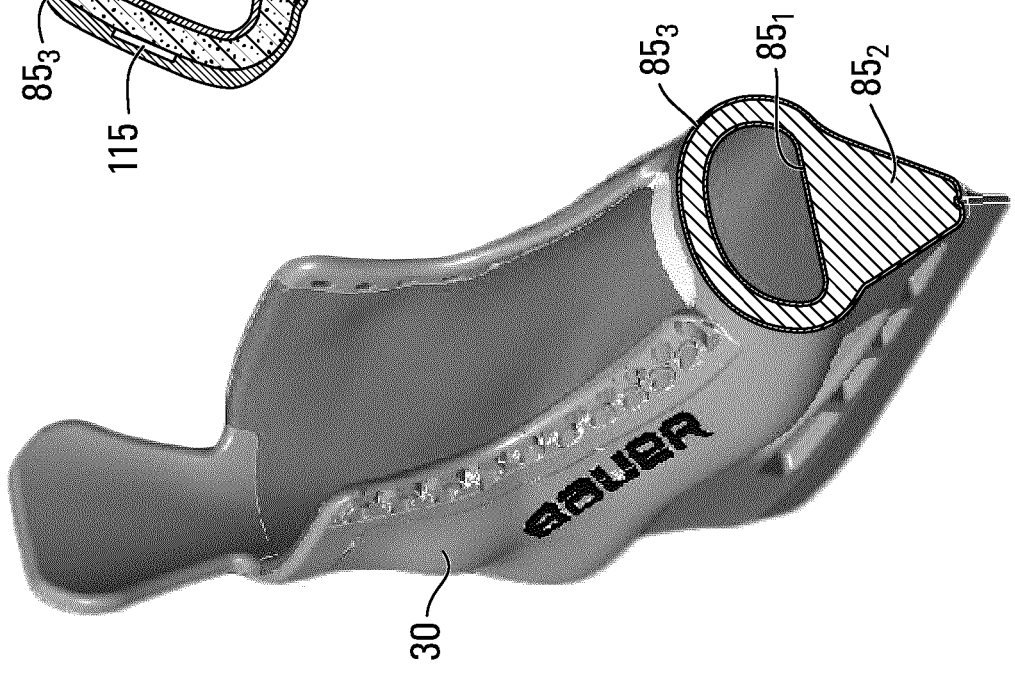
FIGS. 17 and 18 are perspective cross-sectional views of the shell of FIG. 3 taken along different points of a length of the shell.
Figure 17:
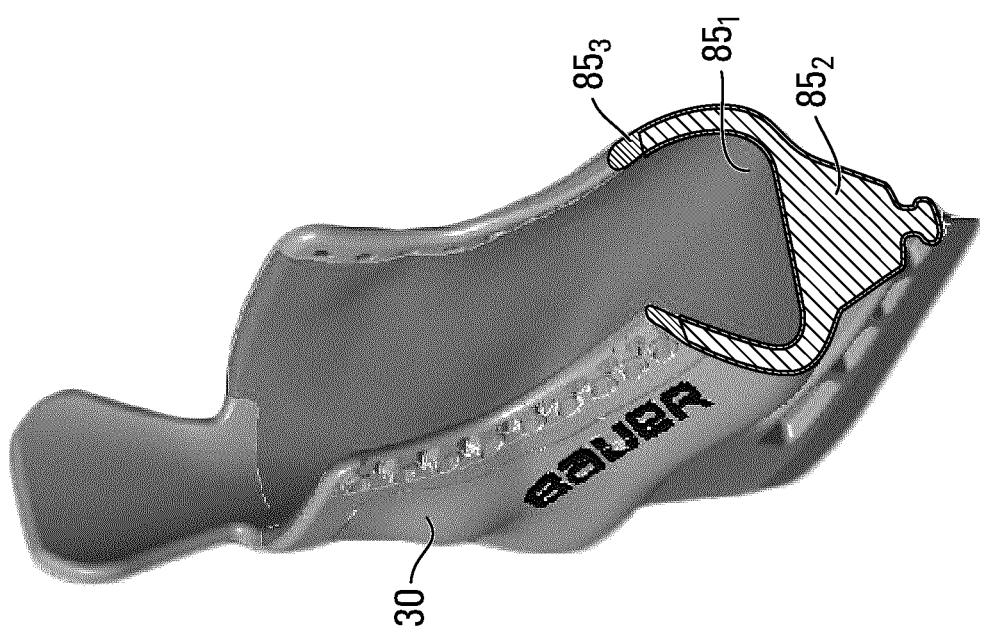

With additional reference to FIGS. 19 and 20, in some embodiments, the shell 30 may comprise a reinforcement 115 disposed between certain ones of the subshells $85_1$-$85_L$ of the shell 30 such as, for example, between the intermediate and external subshells $85_2$, $85_3$. The reinforcement 115 is produced separately from the shell 30 and is configured to reinforce selected areas of the shell 30 (e.g., the medial and/or lateral side portions 66, 68 of the shell 30) such as, for example, to make it stronger or stiffer (e.g., increase resistance to deflection or impacts). In order to include the reinforcement 115 between the intermediate and external subshells $85_2$, $85_3$, the reinforcement 115 is affixed to an exterior surface of the intermediate subshell $85_2$ after forming the intermediate subshell $85_2$ and prior to forming the external subshell $85_3$. For instance, the reinforcement 115 may be mechanically affixed (e.g., stapled, stitched, etc.), glued (e.g., via an adhesive), ultrasonically bonded, or affixed in any other suitable way to the exterior surface of the intermediate subshell $85_2$.

Figure 20A:
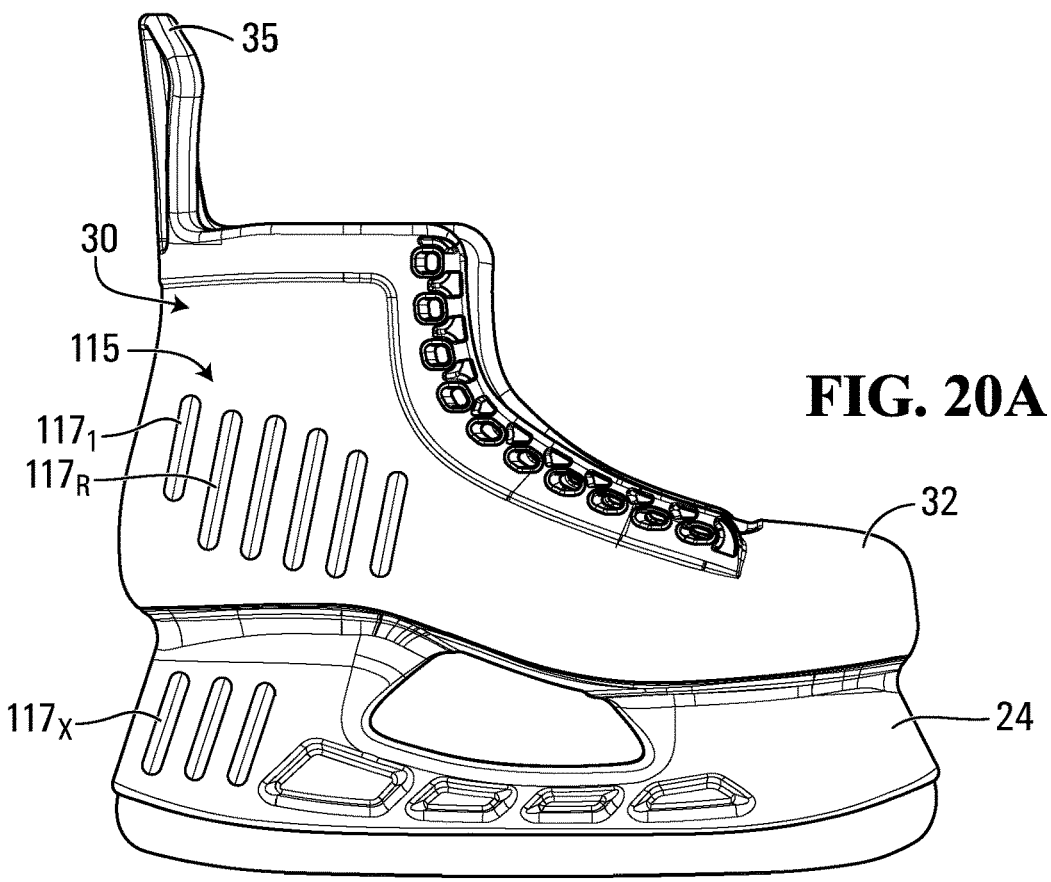
FIGS. 20A and 20B are side views of the shell in embodiments in which the reinforcement comprises a rib.
Figure 20B:
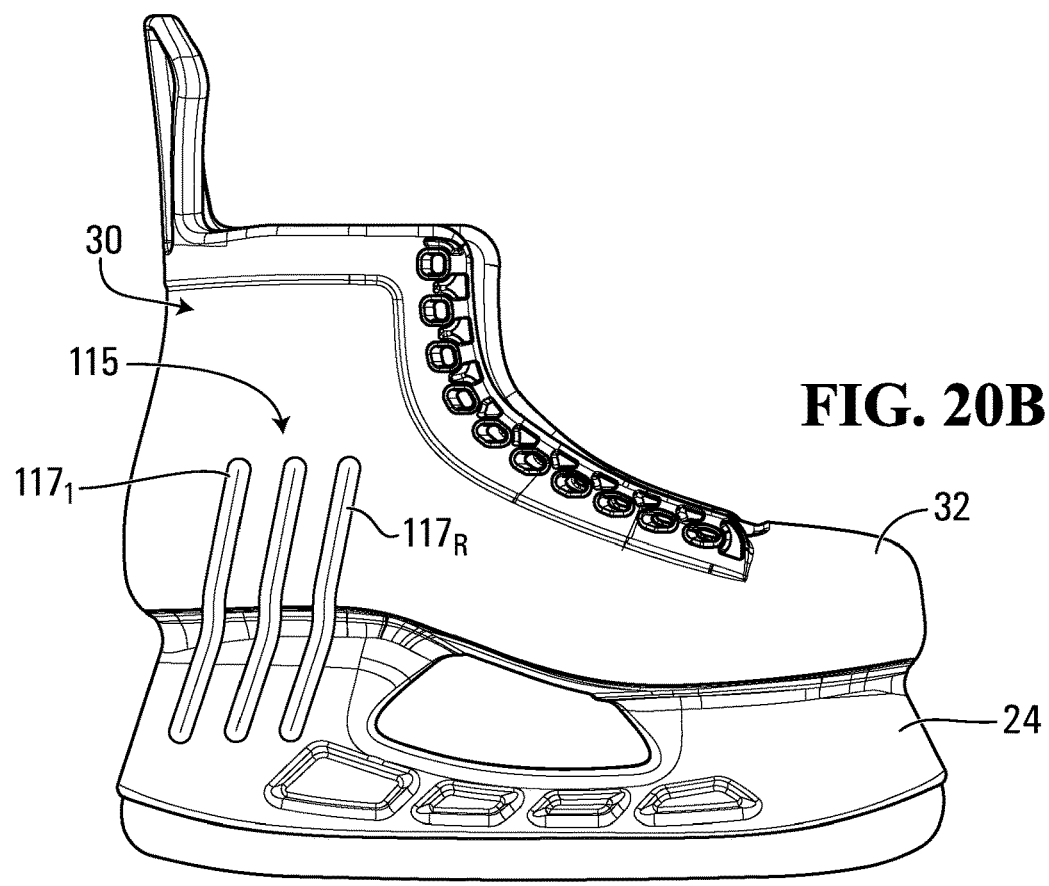

The reinforcement 115 may be configured in any suitable way. For instance, as shown in FIG. 20A, the reinforcement 115 may comprise a plurality of ribs $117_1$-$117_R$ (or a single rib $117_i$) which project outwardly from the exterior surface of the intermediate subshell $85_2$ when the reinforcement 115 is affixed to the intermediate subshell $85_2$. Moreover, the ribs $117_1$-$117_R$ may extend on the shell 30 and/or on the blade holder 24. As shown in FIG. 20B, in some embodiments, the ribs $117_1$-$117_R$ may extend from the shell 30 to the blade holder 24. That is, the ribs $117_1$-$117_R$ have a vertical extent that spans the blade holder 24 and the shell 30. In other examples, the ribs $117_1$-$117_R$ may span the blade holder 24, the shell 30 and the lace members $44_1$, $44_2$. Furthermore, in some cases, the ribs $117_1$-$117_R$ may not all be disposed between the same subshells. For example, in some cases, a first rib $117_i$ may be disposed between the intermediate and external subshells $85_2$, $85_3$ while a second rib $117_j$ is disposed between the internal and intermediate subshells $85_1$, $85_2$.

Figure 21A:
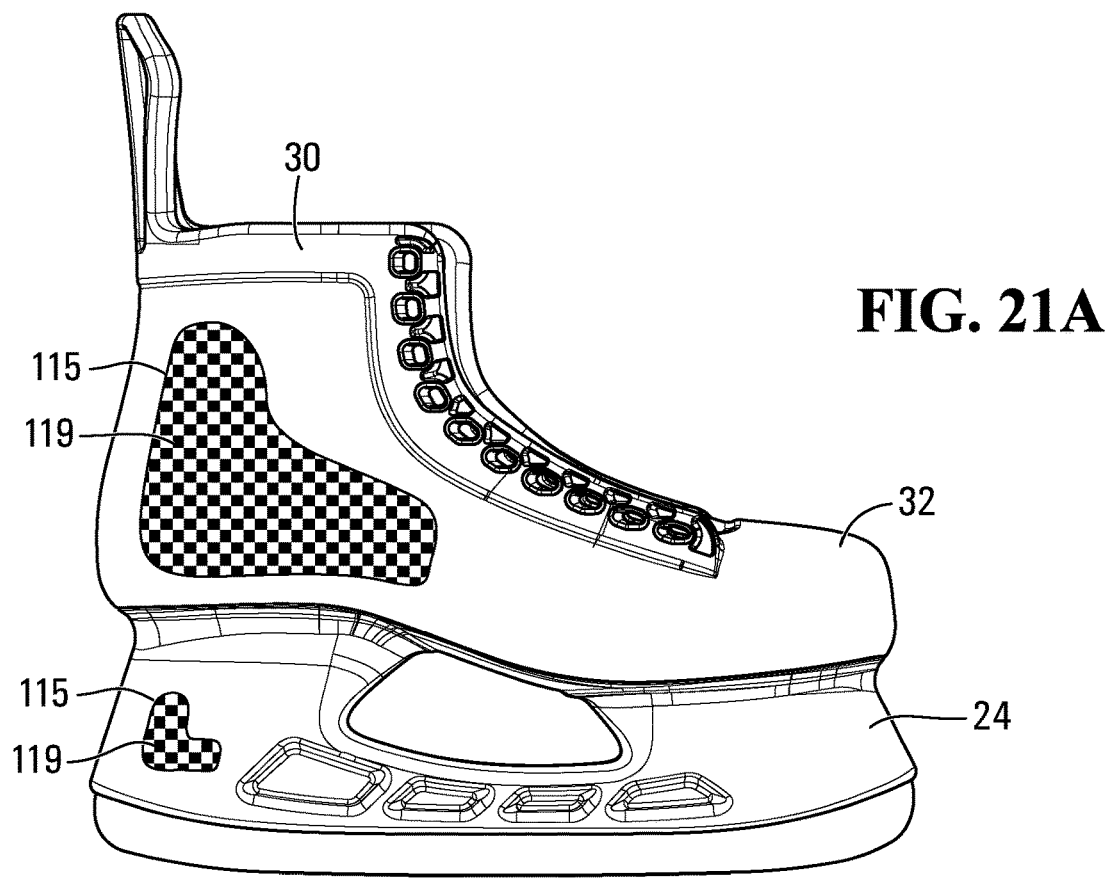
FIGS. 21A and 21B are side views of the shell in embodiments in which the reinforcement comprises a reinforcing sheet.
Figure 21B:
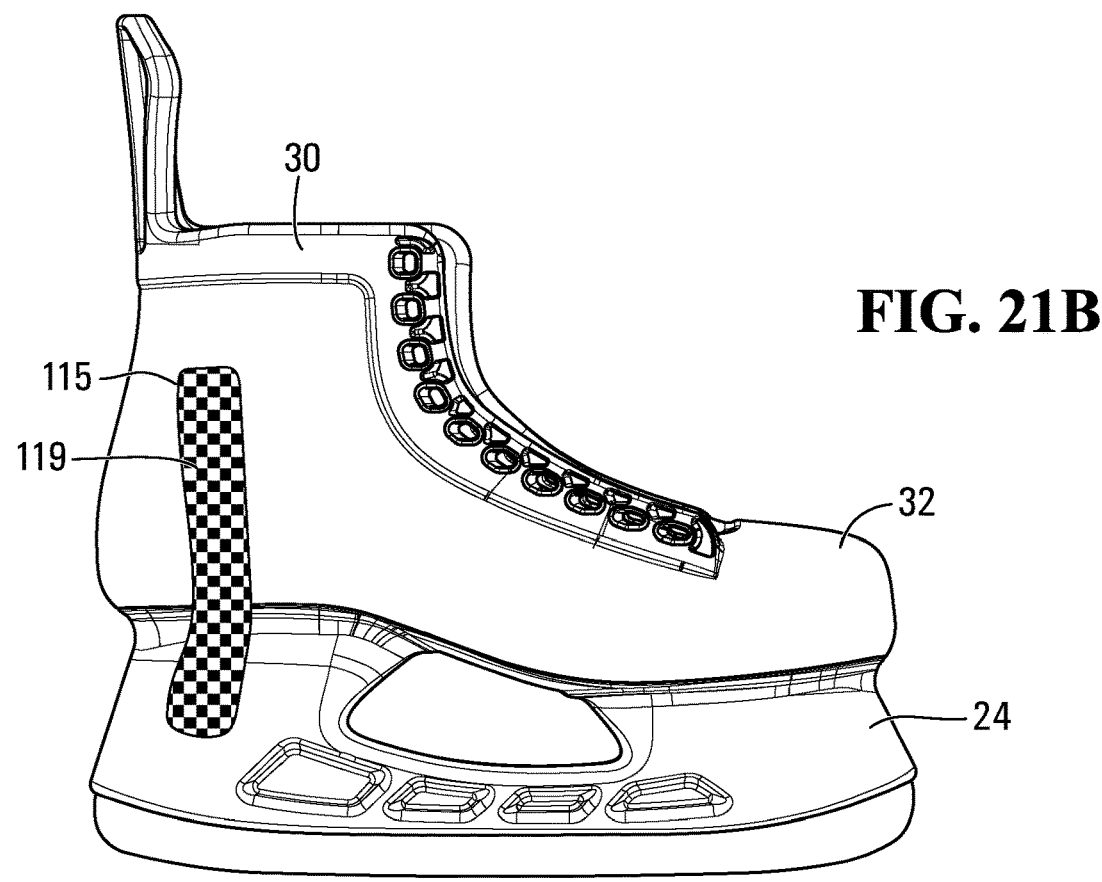

Alternatively, as shown in FIG. 21, the reinforcement 115 may comprise a reinforcing sheet 119 that is similarly affixed to the exterior surface of the intermediate subshell $85_2$ (e.g., glued thereto). In this embodiment, the reinforcing sheet 119 comprises a material that is stiffer and/or harder than the polymeric material $M_2$ of the intermediate subshell $85_2$. For instance, the reinforcing sheet 119 may comprise a composite material comprising thermoset material, thermoplastic material, carbon fibers and/or fiberglass fibers. For example, the composite material may be a fiber-matrix composite material that comprises a matrix in which fibers are embedded. The matrix may include any suitable polymeric resin, such as a thermosetting polymeric material (e.g., polyester, vinyl ester, vinyl ether, polyurethane, epoxy, cyanate ester, etc.), a thermoplastic polymeric material (e.g., polyethylene, polypropylene, acrylic resin, polyether ether ketone, polyethylene terephthalate, polyvinyl chloride, polymethyl methacrylate, polycarbonate, acrylonitrile butadiene styrene, nylon, polyimide, polysulfone, polyamide-imide, self-reinforcing polyphenylene, etc.), or a hybrid thermosetting-thermoplastic polymeric material. The fibers may be made of any suitable material such as carbon fibers, polymeric fibers such as aramid fibers, boron fibers, glass fibers, ceramic fibers, etc.

Furthermore, in some embodiments, the reinforcing sheet 119 may comprise a fabric or textile material. For example, the reinforcing sheet 119 may comprise a fabric mesh such as a nylon mesh or any other suitable fabric material. For example, the reinforcing sheet 119 may envelop the subshell $85_x$ over which it is disposed such as to cover at least a majority (i.e., a majority or an entirety) of an outer surface of that subshell $85_x$. Moreover, the reinforcing sheet 119 may also cover at least a majority of an internal surface of a subsequent subshell $85_y$ overlying the subshell $85_x$. Thus, the reinforcing sheet 119 may extend from the lateral side portion 66 to the medial side portion 68 of the shell 30. In other cases, the reinforcing sheet 119 may be disposed at limited portions of the shell 30 (e.g., only the ankle portion 64 of the shell 30).

Figure 21C:
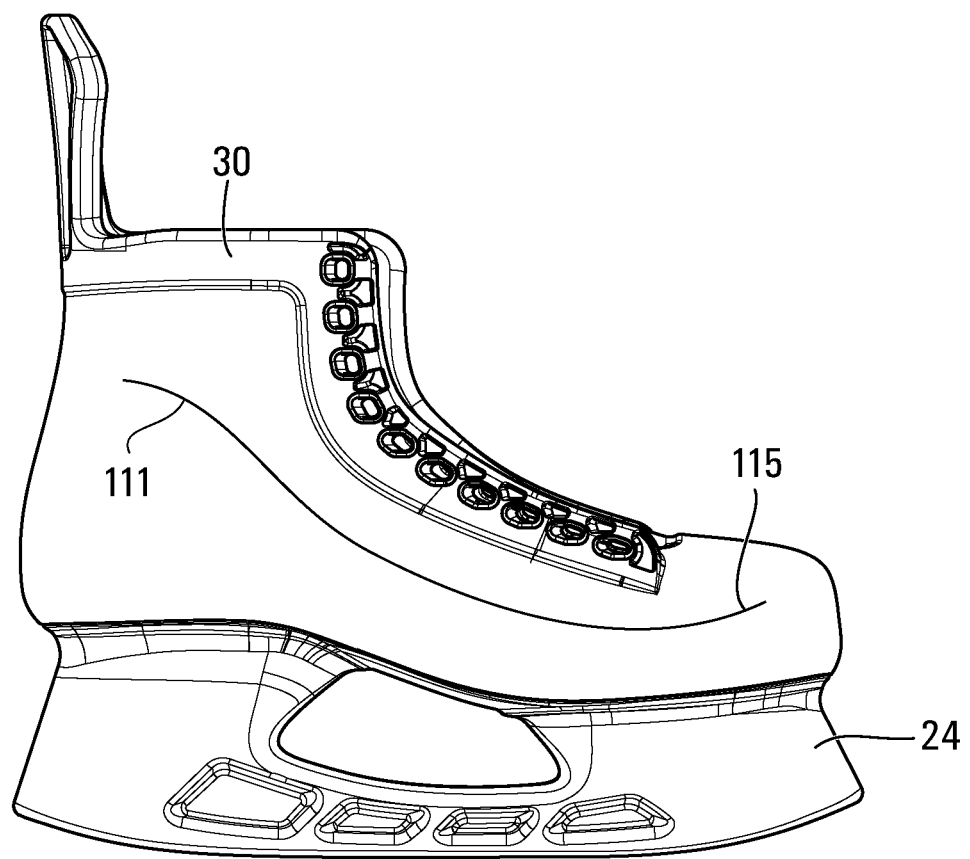
FIG. 21C is a side view of the shell in accordance with an embodiment in which the reinforcement comprises a single fiber.

In another example, as shown in FIG. 21C, the reinforcement 115 may comprise a single fiber 111 rather than a fabric mesh. The single fiber 111 is configured to apply tension forces on the shell 30 and/or other components of the skate boot 22. In particular, the tension of the single fiber 111 is transmitted onto the shell 30 and thus may allow controlling its performance.

In some embodiments, multiple reinforcements 115 may be included between the subshells $85_1$-$85_L$ of the shell 30. For instance, a rib $117_i$ may be disposed at a selected area of the shell 30 while a reinforcing sheet 119 may be disposed at another selected area of the shell 30.

Moreover, in some embodiments, rather than or in addition of the reinforcement 115, the shell 30 may comprise a decoration 121, which can be referred to as a design element, disposed between certain ones of the subshells $85_1$-$85_L$ of the shell 30 such as, for instance, between the intermediate and external subshells $85_2$, $85_3$ as shown in FIG. 19. The design element 121 constitutes an aesthetic element that is produced separately from the shell 30 and may be included in the shell 30 in order to affect its aesthetic look. For instance, the design element 121 may comprise a piece of material including a graphical representation of: one or more alphanumeric characters that may form text (e.g., a word, a message, etc.); one or more symbols (e.g., a logo, a sign, an emblem, etc.); one or more shapes or patterns; and/or one or more real or imaginary objects (e.g., a person, an animal, a vehicle, an imaginary or fictional character, or any other real or imaginary thing). The design element 121 is affixed to an exterior surface of the intermediate subshell $85_2$ after forming the intermediate subshell $85_2$ and prior to forming the external subshell $85_3$. For instance, the design element 121 may be mechanically affixed (e.g., stapled, stitched, etc.), glued (e.g., via an adhesive), ultrasonically bonded, or affixed in any other suitable way to the exterior surface of the intermediate subshell $85_2$. While a single design element 121 is depicted in FIG. 19, the shell 30 may comprise a plurality of such design elements which may be spaced apart from one another. Moreover, in some cases, the reinforcement 115, which is depicted in FIG. 19 spaced apart from the decoration 121, itself may act as a decoration in addition to its reinforcing functionality.

Once the reinforcement 115 (or multiple reinforcements 115) and/or the design element 121 (or multiple design elements 121) has been affixed to the exterior surface of the intermediate subshell $85_2$, the molding process proceeds as described above. Notably, the next subshell, in this case the external subshell $85_3$, is formed such that it covers the reinforcement 115 and/or the design element 121 thus trapping the reinforcement 115 and/or the design element 121 between the intermediate subshell $85_2$ and the external subshell $85_3$. In some embodiments, the external subshell $85_3$ may be clear (i.e., translucent) and may thus allow displaying the reinforcement 115 and/or the design element 121 through the external subshell $85_3$. This may be particularly useful to display the design element 121 but may also be useful to display the reinforcement 115 for aesthetic purposes.

In this embodiment, the molding process employed to form the shell 30 is low-pressure injection molding. That is, the polymeric materials $M_1$-$M_N$ that constitute the subshells $85_1$-$85_L$ are injected into the mold cavity formed by each mold $154_i$ at a relatively low pressure. In addition, the molding process employed to form the shell 30 may be characterized as a co-injection molding process since the polymeric materials $M_1$-$M_N$ are injected into a same mold.

Figure 22:
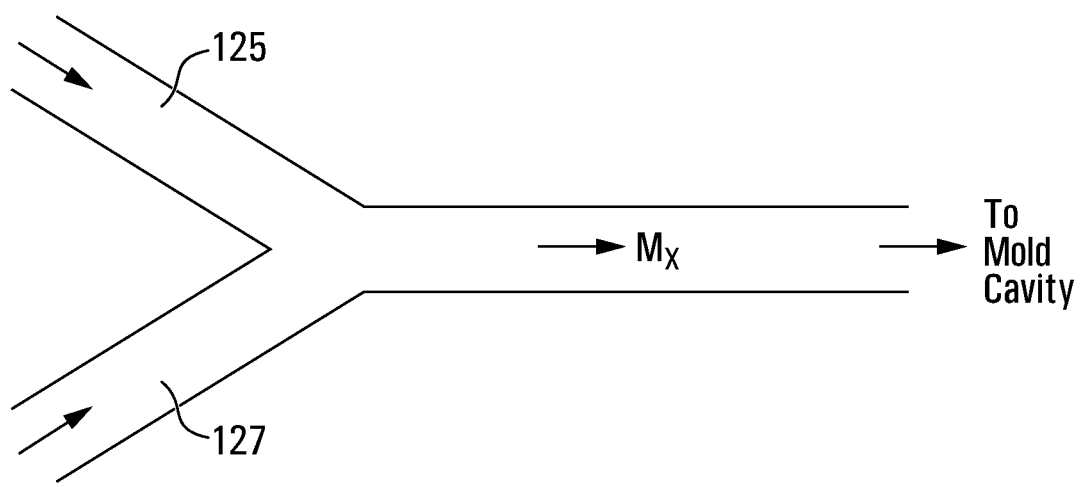
FIG. 22 is a conceptual illustration of constituents of a material flowing into a mold cavity to produce a resulting polymeric material.

In this embodiment, no external heat is applied to the polymeric materials $M_1$-$M_N$ of the shell 30. Rather, in this embodiment, as shown in FIG. 22, in order to form a subshell $85_i$, two or more constituents of a given polymeric material $M_x$ chemically react when combined to release heat. In other words, the two or more constituents have an exothermic reaction when combined. For instance, in one example, the material $M_x$ is polyurethane and includes constituents 125, 127 that chemically react when combined. The constituents 125, 127 may be polyols and isocyanates. The exothermic chemical reaction that characterizes the molding process of the shell 30 contrasts the conventional method of forming a skate boot shell which involves thermoforming whereby heat is applied to a thermoformable sheet of material in a mold such that the thermoformable sheet of material acquires the shape of the mold.

The molding process of the shell 30 may be implemented in any suitable way in other embodiments. For example, in some embodiments, injection molding at higher pressure may be used. As another example, in some embodiments, two or more lasts such as the last 152 may be used (e.g., different lasts for molding respective ones of the subshells $85_1$-$85_L$). Moreover, the last 152 may be configured differently than the last shown in FIG. 13. For instance, the last 152 may not comprise projections for forming the apertures 48 and rather one or more of the female molds $154_1$-$154_N$ may comprise such projections for forming the apertures 48. In other cases, the projections on the last 152 for forming the apertures 48 may be retractable. As another example, in some embodiments, the molding process of the shell 30 may be casting in which the polymeric materials $M_1$-$M_N$ are poured into one or more molds.

The skate boot 22 may comprise an overlay 102 on an external surface 65 of the shell 30 for aesthetic or functional purposes.

Figure 23:
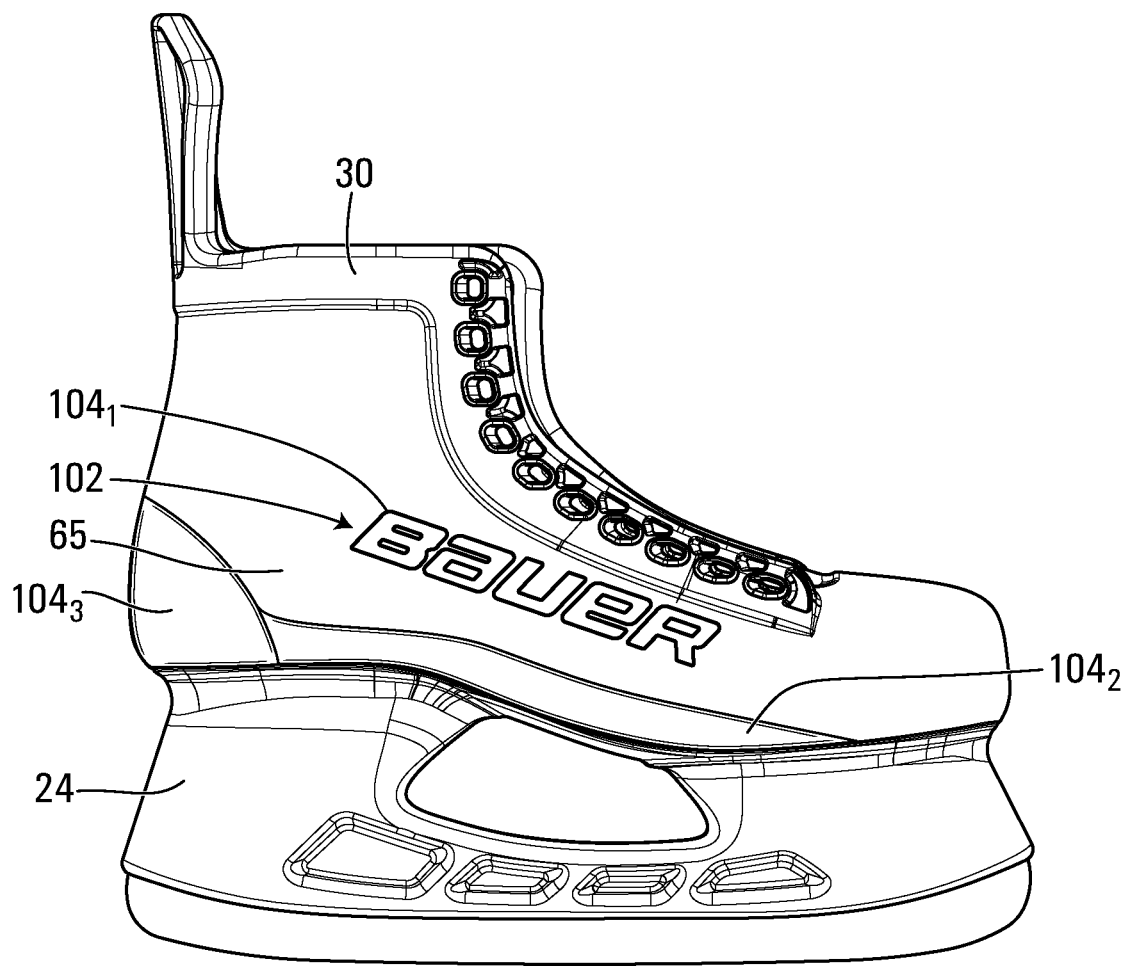
FIG. 23 is a perspective view of an embodiment in which the shell comprises an overlay.

With additional reference to FIG. 23, in this embodiment, the overlay 102 comprises a plurality of overlay elements $104_1$-$104_O$ that can be disposed at any suitable part of the shell 30. For example, in some cases, the overlay elements $104_1$-$104_O$ may be a graphic (e.g., a logo), a brand name, a pattern, a word, etc. While the overlay elements $104_1$-$104_O$ may improve an aesthetic appearance of the skate 10, in some cases, certain overlay elements $104_1$-$104_O$ may also serve functional purposes. For instance, in some cases, the overlay elements $104_1$-$104_O$ may be configured to minimize wear of at least a portion of the external surface 65 of the shell 30. For example, an overlay element $104_x$ may be located close to a bottom portion of the medial and/or lateral sides of the shell 30 in order to prevent contact between the playing surface 12 and the shell 30 of the skate boot 22. This may help in reducing undue wear of the skate 10.

The overlay 102 may be affixed to the external surface 65 of the shell 30 in various ways. For instance, each of the overlay elements $104_1$-$104_O$ may be mechanically fastened to the external surface 65 of the shell 30 (e.g., via stitching, staples, etc.), glued thereto via an adhesive, or ultrasonically bonded. The overlay elements $104_1$-$104_O$ may be affixed to the external surface 65 of the shell 30 in any other suitable way.

The inner lining 36 of the skate boot 22 is affixed to an inner surface of the shell 30 and comprises an inner surface 96 for facing the heel HL and medial and lateral sides MS, LS of the player's foot 11 and ankle A in use. The inner lining 36 may be made of a soft material (e.g., a fabric made of NYLON® fibers or any other suitable fabric). The footbed 38 is mounted inside the shell 30 and comprises an upper surface 106 for receiving the plantar surface PS of the player's foot 11 and a wall 108 projecting upwardly from the upper surface 106 to partially cup the heel HL and extend up to a medial line of the player's foot 11. The insole 40 has an upper surface 25 for facing the plantar surface PS of the player's foot 11 and a lower surface 23 on which the shell 30 may be affixed.

In some embodiments, the skate boot 22 may not comprise an inner lining 36. For instance, the internal subshell $85_1$ of the shell 30 of the skate boot 22 may serve as an inner lining already and thus the addition of the inner lining 36 may be redundant. In other cases, the inner lining 36 may be inserted during the molding process using the molding apparatus 150. For example, a textile material may first be placed on the last 152 prior to forming the first subshell (i.e., the internal subshell $85_1$) such as to serve as a pre-formed "sock" onto which the internal subshell $85_1$ is formed.

Figure 6:
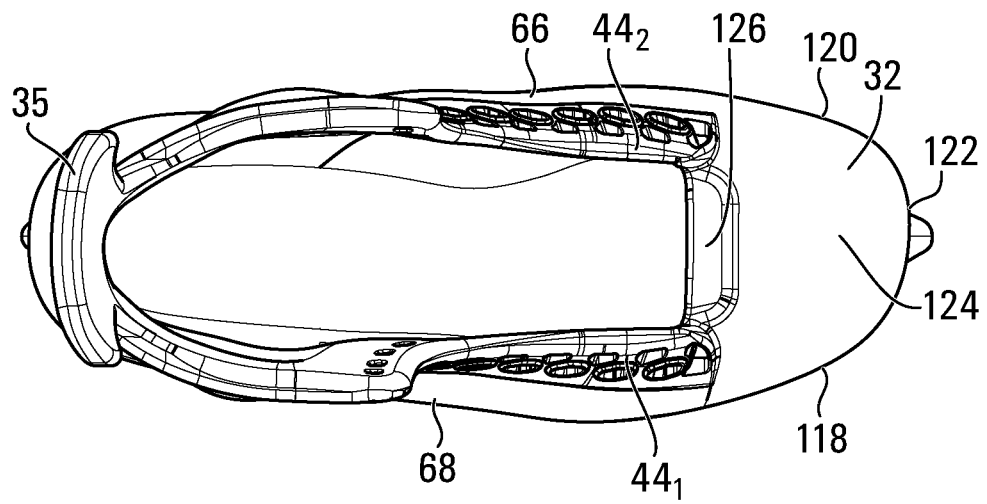
Figure 8:
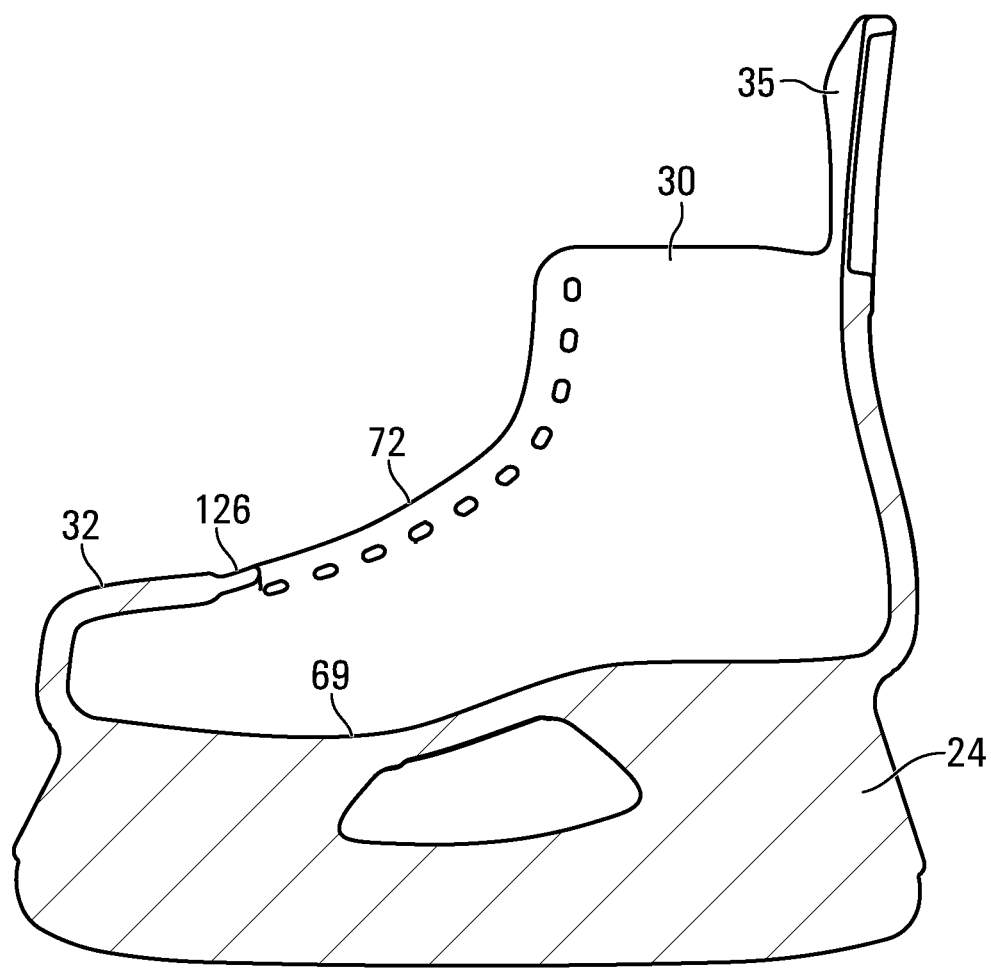
FIG. 8 is a cross-sectional view of the shell taken along line 8-8 of FIG. 5.
Figure 9:
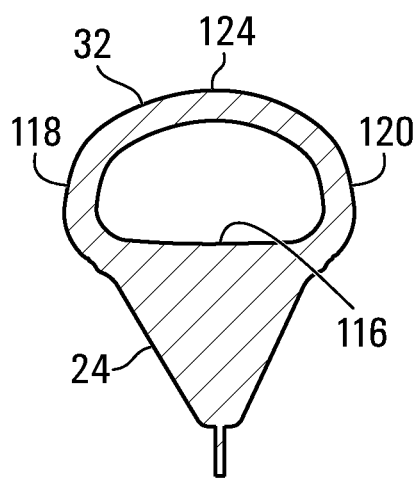
FIGS. 9 and 10 are cross-sectional views of the shell taken along lines 9-9 and 10-10 of FIG. 4.
Figure 10:
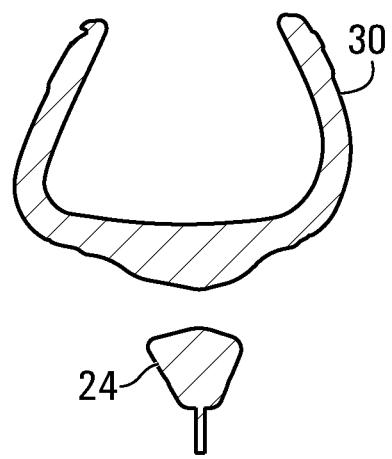

The toe cap 32 of the skate boot 22 is configured to face and protect the toes T of the player's foot 11. As will be described in more detail below, in this example, at least part (i.e., part or all) of the toe cap 32 is formed integrally with the shell 30. As shown in FIGS. 6, 8 and 9, the toe cap 32 comprises a bottom portion 116 for at least partially covering a front portion of the lower surface 23 of the insole 40, a lateral side portion 118 for facing a small toe of the foot 11 of the player, a medial side portion 120 for facing a big toe of the foot 11 of the player, an end portion 122 between the lateral and medial side portions 118, 120, an upper portion 124 for facing a top of the toes T of the player's foot 11, and a top extension 126 for affixing the tongue 34 to the toe cap 32. The top extension 126 of the toe cap 32 may be affixed (e.g., glued and/or stitched) to a distal end portion of the tongue 34 in order to affix the tongue 34 to the toe cap 32.

The toe cap 32 may comprise a synthetic material 105 that imparts stiffness to the toe cap 32. For instance, in various embodiments, the synthetic material 105 of the toe cap 32 may comprise nylon, polycarbonate materials (e.g., Lexan®), polyurethane, thermoplastics, thermosetting resins, reinforced thermoplastics, reinforced thermosetting resins, polyethylene, polypropylene, high density polyethylene or any other suitable material. In some cases, the synthetic material 105 of the toe cap 32 may be a composite material comprising thermoset material, thermoplastic material, carbon fibers and/or fiberglass fibers. For example, the composite material may be a fiber-matrix composite material that comprises a matrix in which fibers are embedded. The matrix may include any suitable polymeric resin, such as a thermosetting polymeric material (e.g., polyester, vinyl ester, vinyl ether, polyurethane, epoxy, cyanate ester, etc.), a thermoplastic polymeric material (e.g., polyethylene, polyurethane, polypropylene, acrylic resin, polyether ether ketone, polyethylene terephthalate, polyvinyl chloride, polymethyl methacrylate, polycarbonate, acrylonitrile butadiene styrene, nylon, polyimide, polysulfone, polyamide-imide, self-reinforcing polyphenylene, etc.), or a hybrid thermosetting-thermoplastic polymeric material. The fibers may be made of any suitable material such as carbon fibers, polymeric fibers such as aramid fibers, boron fibers, glass fibers, ceramic fibers, etc.

Figure 24:
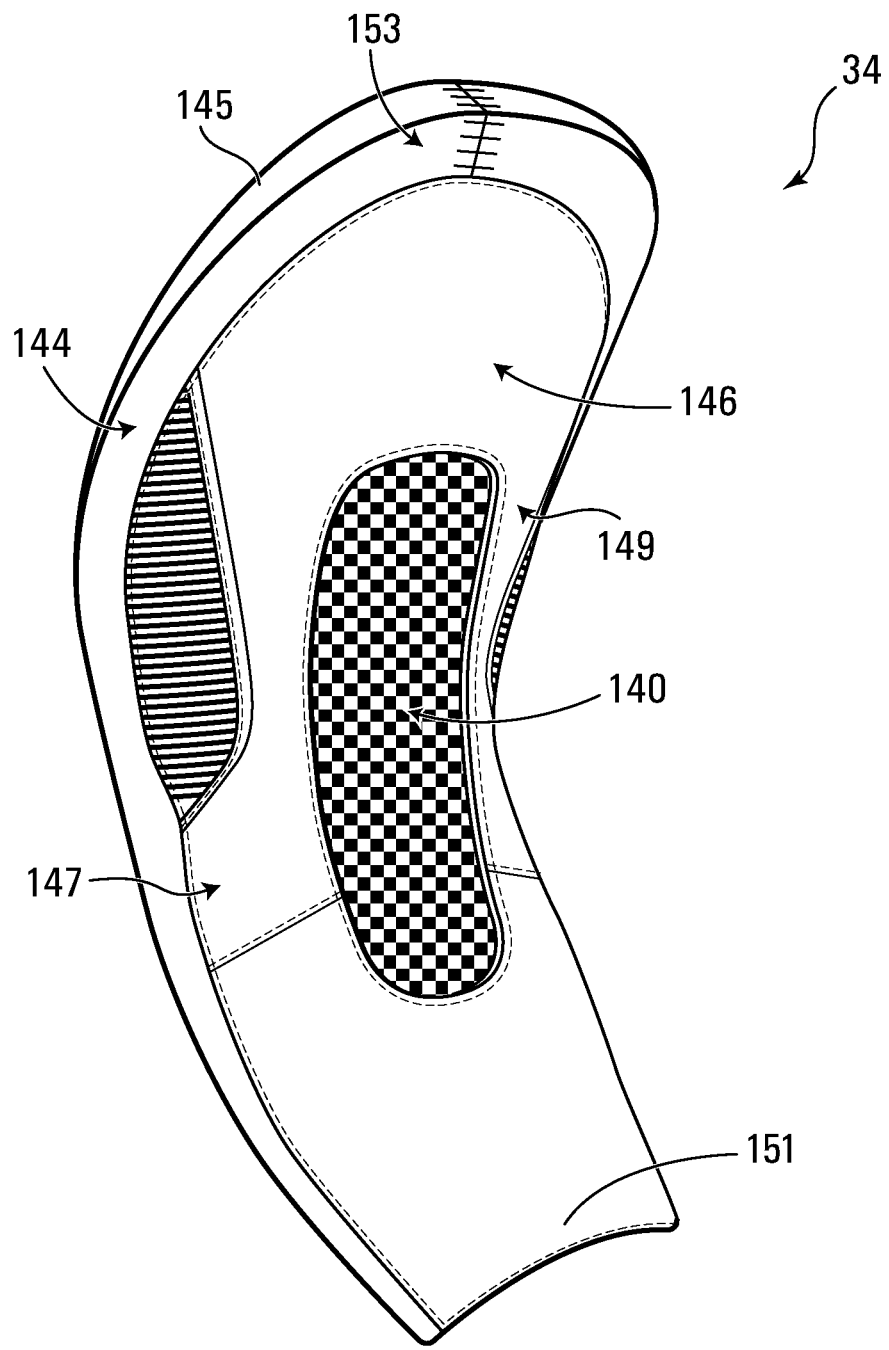
FIG. 24 is a perspective view of a tongue of the skate boot.

The tongue 34 extends upwardly and rearwardly from the toe cap 32 for overlapping the top surface TS of the player's foot 11. In this embodiment, with additional reference to FIG. 24, the tongue 34 comprises a core 140 defining a section of the tongue 34 with increased rigidity, a padding member (not shown) for absorbing impacts to the tongue 34, a peripheral member 144 for at least partially defining a periphery 145 of the tongue 34, and a cover member 146 configured to at least partially define a front surface of the tongue 34. The tongue 34 defines a lateral portion 147 overlying a lateral portion of the player's foot 11 and a medial portion 149 overlying a medial portion of the player's foot 11. The tongue 34 also defines a distal end portion 151 for affixing to the toe cap 32 (e.g., via stitching) and a proximal end portion 153 that is nearest to the player's shin S.

The tendon guard 35 extends upwardly from the rear portion 82 of the ankle portion 64 of the shell 30 in order to protect the player's Achilles tendon AT. As will be described in more detail below, in this embodiment, at least part (i.e., part or all) of the tendon guard 35 is integrally formed with the shell 30 of the skate boot 22. In other embodiments, the tendon guard 35 may be a separate component from the shell 30 such that the tendon guard 35 is fastened to the shell 30 via a mechanical fastener (e.g., via stitching, stapling, a screw, etc.) or in any other suitable way.

The skate boot 22 may be constructed in any other suitable way in other embodiments. For example, in other embodiments, various components of the skate boot 22 mentioned above may be configured differently or omitted and/or the skate boot 22 may comprise any other components that may be made of any other suitable materials and/or using any other suitable processes.

Figure 25:
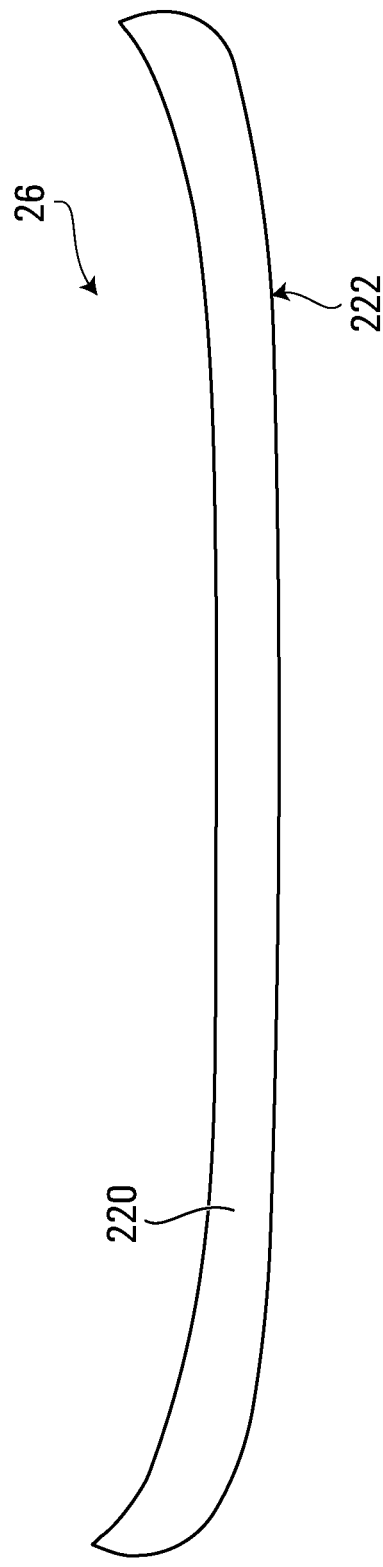
FIG. 25 is a side view of a blade of a skating device of the skate.

As shown in FIG. 25, the blade 26 comprises an ice-contacting material 220 including an ice-contacting surface 222 for sliding on the ice surface while the player skates. In this embodiment, the ice-contacting material 220 is a metallic material (e.g., stainless steel). The ice-contacting material 220 may be any other suitable material in other embodiments.

Figure 5:
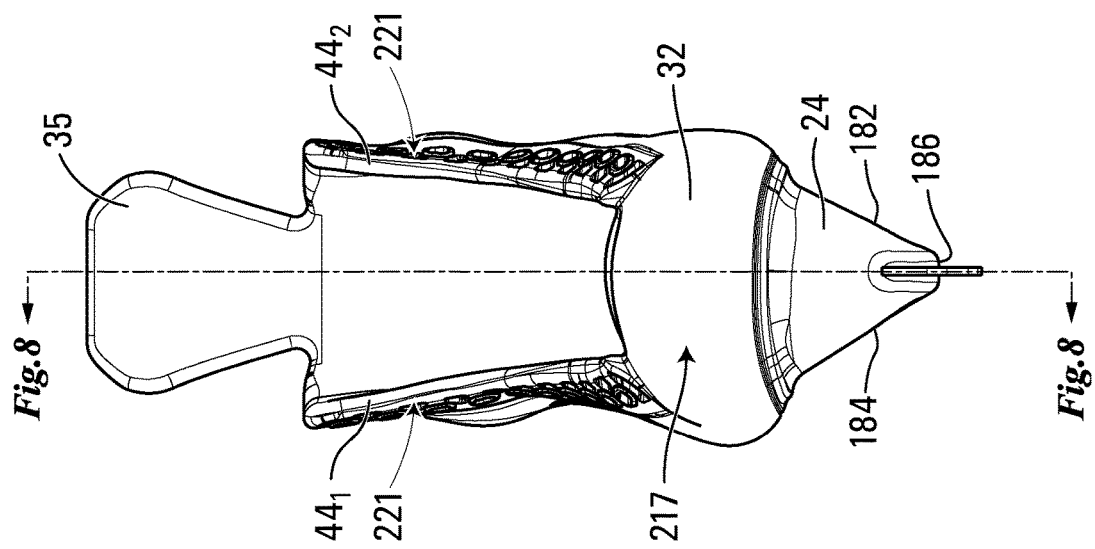
FIGS. 4 to 7 are respective side, front, top and bottom views of the shell of FIG. 3.
Figure 4:
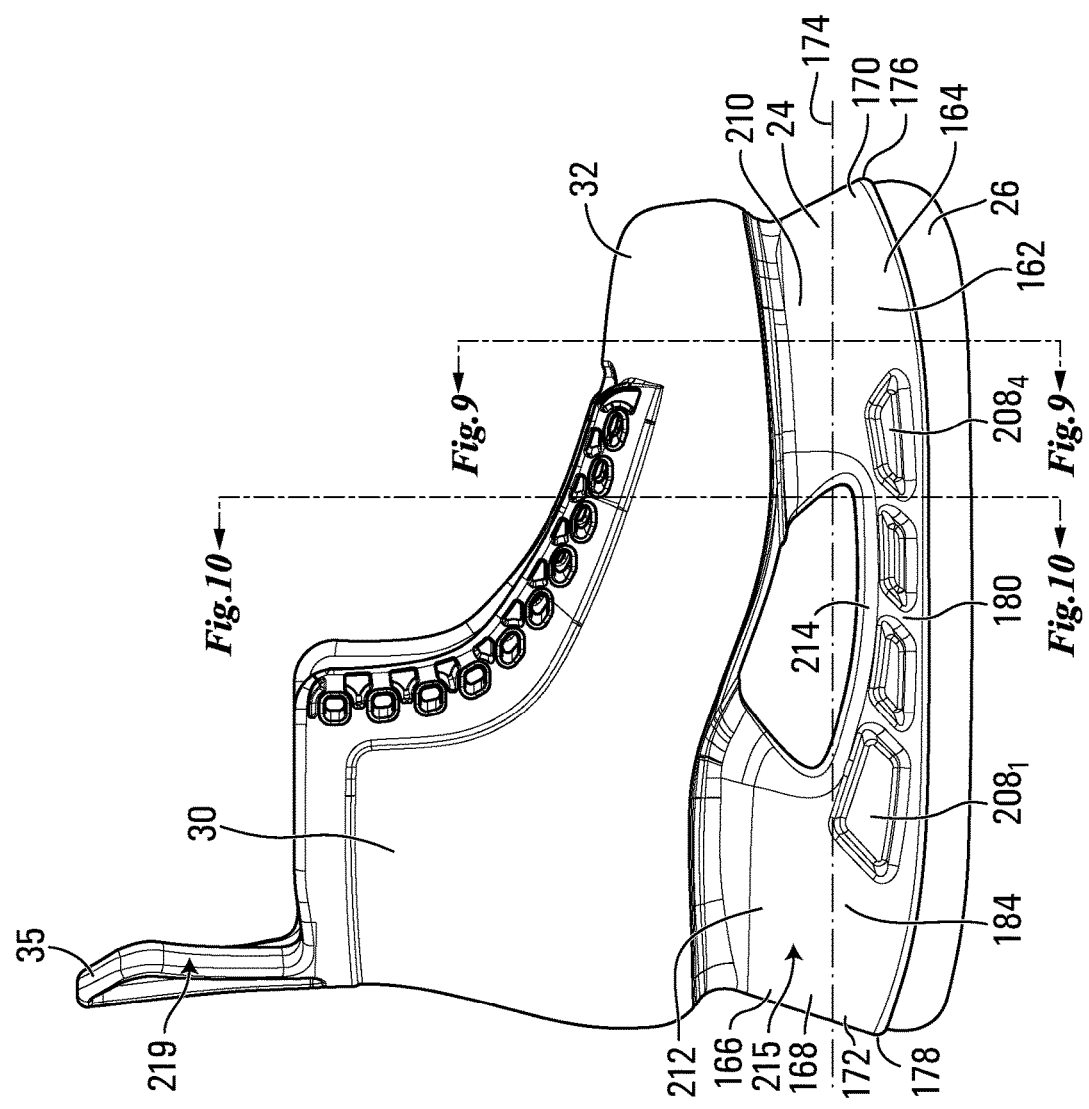
Figure 7:
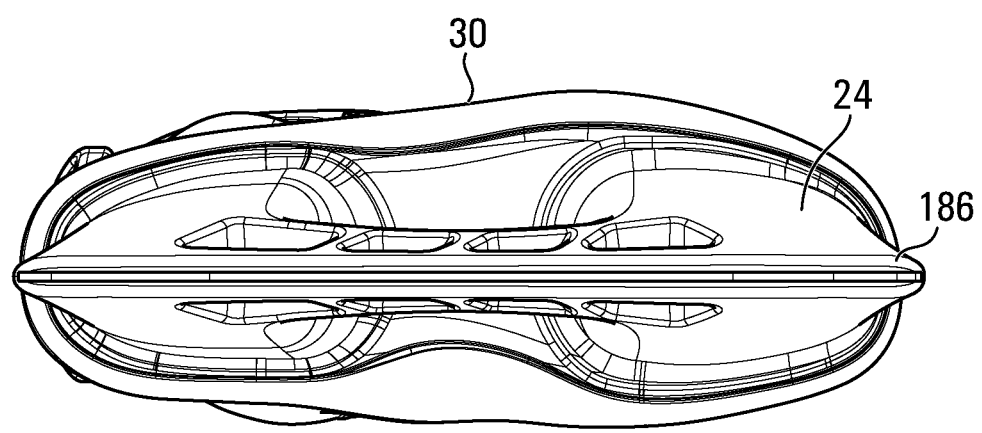

As shown in FIGS. 4, 5 and 7, the blade holder 24 comprises a lower portion 162 comprising a blade-retaining base 164 that retains the blade 26 and an upper portion 166 comprising a support 168 that extends upwardly from the blade-retaining base 164 towards the skate boot 22 to interconnect the blade holder 24 and the skate boot 22. A front portion 170 of the blade holder 24 and a rear portion 172 of the blade holder 24 define a longitudinal axis 174 of the blade holder 24. The front portion 170 of the blade holder 24 includes a frontmost point 176 of the blade holder 24 and extends beneath and along the player's forefoot in use, while the rear portion 172 of the blade holder 24 includes a rearmost point 178 of the blade holder 24 and extends beneath and along the player's hindfoot in use. An intermediate portion 180 of the blade holder 24 is between the front and rear portions 170, 172 of the blade holder 24 and extends beneath and along the player's midfoot in use. The blade holder 24 comprises a medial side 182 and a lateral side 184 that are opposite one another.

Figure 26B:
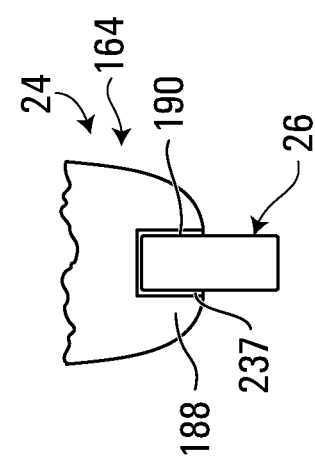
Figure 26A:
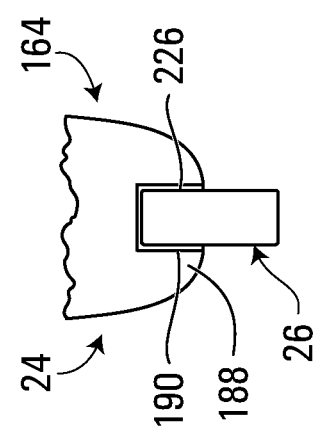

The blade-retaining base 164 is elongated in the longitudinal direction of the blade holder 24 and is configured to retain the blade 26 such that the blade 26 extends along a bottom portion 186 of the blade-retaining base 164 to contact the ice surface 12. To that end, the blade-retaining base 164 comprises a blade-retention portion 188 to face and retain the blade 26. In this embodiment, as shown in FIG. 26A, the blade-retention portion 188 comprises a recess 190 in which an upper portion of the blade 26 is disposed.

Figure 27:
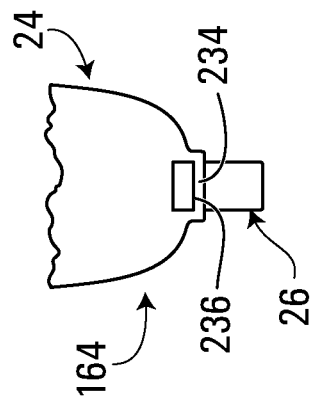
FIGS. 26A to 29 show different examples of embodiments in which the blade is affixed to a blade holder of the skating device of the skate.
Figure 28:
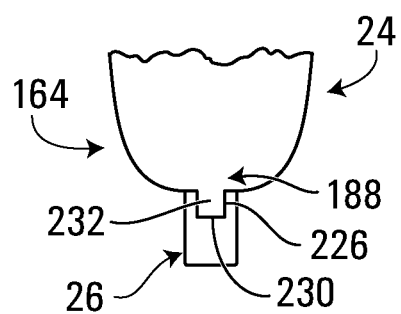
Figure 29:
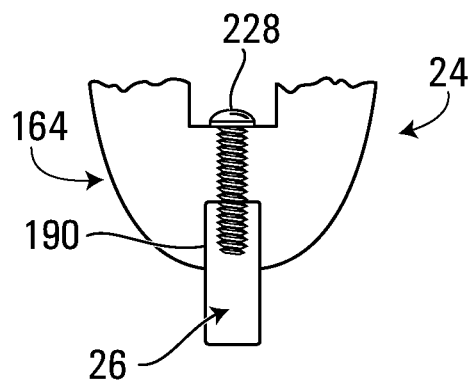

The blade holder 24 can retain the blade 26 in any suitable way. For instance, in this embodiment, the blade 26 may be permanently affixed to the blade holder 24 (i.e., not intended to be detached and removed from the blade holder 24). For example, as shown in FIG. 27, the blade 26 and the blade-retaining base 164 of the blade holder 24 may be mechanically interlocked via an interlocking portion 234 of one of the blade-retaining base 164 and the blade 26 that extends into an interlocking void 236 of the other one of the blade-retaining base 164 and the blade 26. For instance, in some cases, the blade 26 can be positioned in a mold used for molding the blade holder 24 such that, during molding, the interlocking portion 234 of the blade-retaining base 164 flows into the interlocking void 236 of the blade 26 (i.e., the blade holder 24 is overmolded onto the blade 26). In some embodiments, as shown in FIGS. 26 and 28, the blade holder 24 may retain the blade 26 using an adhesive 226 and/or one or more fasteners 228. For instance, in some embodiments, as shown in FIG. 26, the recess 190 of the blade holder 24 may receive the upper portion of the blade 26 that is retained by the adhesive 226. The adhesive 226 may be an epoxy-based adhesive, a polyurethane-based adhesive, or any suitable adhesive. In some embodiments, instead of or in addition to using an adhesive, as shown in FIG. 29, the recess 190 of the blade holder 24 may receive the upper part of the blade 26 that is retained by the one or more fasteners 228. Each fastener 228 may be a rivet, a screw, a bolt, or any other suitable mechanical fastener. In some embodiment, the blade holder 24 may retain the blade 26 via a press fit. For example, as shown in FIG. 26B, the recess 190 of the blade holder 24 may be configured (e.g., sized) such as to enter into a press fit with the blade 26. More particularly, in this example of implementation, the blade 26 comprises an elastomeric coating 237 including an elastomeric material (e.g., polyurethane, rubber, or any other suitable elastomeric material) that forms at least part of an outer surface of the blade 26. The elastomeric coating 237 has a greater friction coefficient than the ice-contacting material 220 of the blade 26 when interacting with the blade holder 24 such as to improve retention of the blade 26 by the blade holder 24 in a press fit. Alternatively or additionally, in some embodiments, as shown in FIG. 28, the blade-retention portion 188 of the blade holder 24 may extend into a recess 230 of the upper part of the blade 26 to retain the blade 26 using the adhesive 226 and/or the one or more fasteners 228. For instance, in some cases, the blade-retention portion 188 of the blade holder 24 may comprise a projection 232 extending into the recess 230 of the blade 26.

In this embodiment, the blade-retaining base 164 comprises a plurality of apertures $208_1$-$208_4$ distributed in the longitudinal direction of the blade holder 24 and extending from the medial side 182 to the lateral side 184 of the blade holder 24. In this example, respective ones of the apertures $208_1$-$208_4$ differ in size. The apertures $208_1$-$208_4$ may have any other suitable configuration, or may be omitted, in other embodiments.

The blade-retaining base 164 may be configured in any other suitable way in other embodiments.

The support 168 is configured for supporting the skate boot 22 above the blade-retaining base 164 and transmit forces to and from the blade-retaining base 164 during skating. In this embodiment, the support 168 comprises a front pillar 210 and a rear pillar 212 which extend upwardly from the blade-retaining base 164 towards the skate boot 22. The front pillar 210 extends towards the front portion 56 of the skate boot 22 and the rear pillar 212 extends towards the rear portion 58 of the skate boot 22. The blade-retaining base 164 extends from the front pillar 210 to the rear pillar 212. More particularly, in this embodiment, the blade-retaining base 164 comprises a bridge 214 interconnecting the front and rear pillars 210, 212.

In this embodiment, at least part (i.e., part or all) of the blade holder 24 is integrally formed with the shell 30 of the skate boot 22. That is, at least part of the blade holder 24 and the shell 30 of the skate boot 22 constitute a monolithic one-piece structure. The blade holder 24 thus comprises a portion 215 that is integrally formed with the shell 30 of the skate boot 22 such that the portion 215 of the blade holder 34 and the shell 30 of the skate boot 22 are formed together as one-piece in the molding apparatus 150 during the molding process.

In this embodiment, the portion 215 of the blade holder 24 includes one or more of the polymeric materials $M_1$-$M_N$ of the subshells $85_1$-$85_L$ of the shell 30 of the skate boot 22. For instance, in this example, the portion 215 of the blade holder 24 includes the intermediate and external subshells $85_2$, $85_3$ and therefore comprises the polymeric materials $M_2$, $M_3$ associated therewith. In particular, in this example, a majority of the blade holder 24 is constituted by the polymeric material $M_2$ of the intermediate subshell $85_2$ such that the blade holder 24 consists primarily of a structural foam material. Alternatively, the portion 215 of the blade holder 24 may include one or more different materials.

In this embodiment, at least a majority (i.e., a majority or an entirety) of the blade holder 24 may be integrally formed with shell 30. That is, the portion 215 of the blade holder 24 may be a major portion or the entirety of the blade holder 24. In this embodiment, an entirety of the blade holder 24 is integrally formed with the shell 30.

Figure 73:
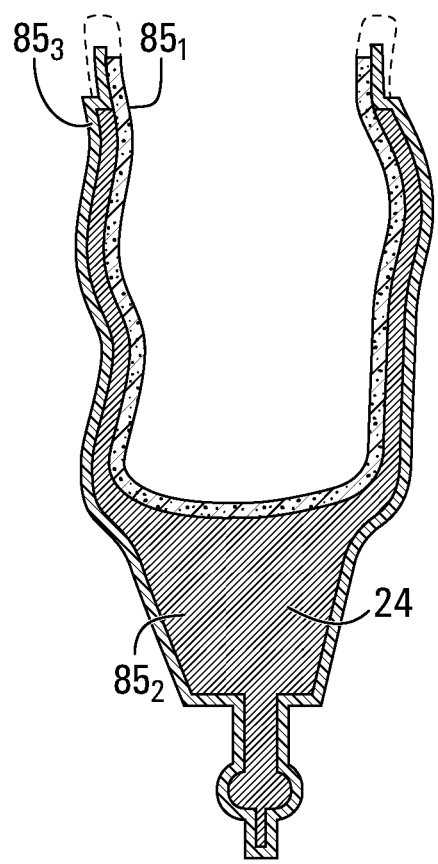
FIG. 73 shows an example of an embodiment in which an outermost one of the subshells makes up an outer surface of the shell and an outer surface of the blade holder.

Therefore, in this embodiment, the blade holder 24 is formed with the shell 30 in the molding apparatus 150 with the last 152. In particular, the blade holder 24 is initially formed during forming of the intermediate subshell $85_2$ of the shell 30 and is completed by the forming of the external subshell $85_3$ of the shell 30. That is, in this embodiment, as shown in FIG. 73, the intermediate subshell $85_2$ is the innermost subshell of the blade holder 24 while the external subshell $85_3$ is the outermost subshell of the blade holder 24.

Moreover, in this embodiment, the blade 26 is attached to the blade holder 24 during the molding process by including the blade 26 in a given mold $154_i$ such that the blade holder 24 overmolds the blade 26 during the molding process. For instance, the mold $154_i$ may be designed specifically to hold the blade 26 during the molding process prior to the forming of the intermediate subshell $85_2$.

In this embodiment, one or more other components (e.g., the toe cap 32, the tendon guard 35, the lace members $44_1$, $44_2$, the tongue 34, the footbed 38, etc.) of the skate boot 22 may be molded integrally with the shell 30 in the molding apparatus 150 during the molding process. The shell 30 and these one or more other components of the skate boot 22 may thus constitute a monolithic one-piece structure.

For example, in this embodiment, the toe cap 32, the tendon guard 35, and the lace members $44_1$, $44_2$ are molded integrally with the shell 30 in the molding apparatus 150 during the molding process.

For instance, in this embodiment, the toe cap 32 comprises a portion 217 that is integrally formed with the shell 30 such that the portion 217 of the toe cap 32 of the skate boot 22 and the shell 30 of the skate boot 22 are formed together as one-piece in the molding apparatus 150 during the molding process. As such, the portion 217 of the toe cap 32 of the skate boot 22 may include one or more of the polymeric materials $M_1$-$M_N$ of the subshells $85_1$-$85_L$ of the shell 30 of the skate boot 22.

In this embodiment, the portion 217 of the toe cap 32 includes one or more of the polymeric materials $M_1$-$M_N$ of the subshells $85_1$-$85_L$ of the shell 30 of the skate boot 22. For instance, in this example, the portion 217 of the toe cap 32 includes the internal, intermediate and external subshells $85_1$, $85_2$, $85_3$ and therefore comprises the polymeric materials $M_1$, $M_2$, $M_3$ associated therewith. Alternatively, the portion 217 of the toe cap 32 may include one or more different materials.

Moreover, in this embodiment, the tendon guard 35 comprises a portion 219 that is integrally formed with the shell 30 such that the portion 219 of the tendon guard 35 of the skate boot 22 and the shell 30 of the skate boot 22 are formed together as one-piece in the molding apparatus 150 during the molding process. As such, the portion 219 of the tendon guard 35 of the skate boot 22 may include one or more of the polymeric materials $M_1$-$M_N$ of the subshells $85_1$-$85_L$ of the shell 30 of the skate boot 22. For instance, in this example, the portion 219 of the tendon guard 35 includes solely the external subshell $85_3$ and therefore comprises the polymeric material $M_3$ associated therewith. Alternatively, the portion 219 of the tendon guard 35 may include one or more different materials. For example, in some embodiments, the portion 219 of the tendon guard 219 may also comprise the internal subshell $85_1$ and/or the intermediate subshell $85_2$ such that the portion 219 of the tendon guard 35 also comprises the polymeric material $M_1$ and/or the polymeric material $M_2$ associated therewith.

Moreover, in this embodiment, each of the lace members $44_1$, $44_2$ comprises a portion 221 that is integrally formed with the shell 30 such that the portion 221 of each of the lace members $44_1$, $44_2$ of the skate boot 22 and the shell 30 of the skate boot 22 are formed together as one-piece in the molding apparatus 150 during the molding process. As such, the portion 221 of each lace member $44_i$ of the skate boot 22 may include one or more of the polymeric materials $M_1$-$M_N$ of the subshells $85_1$-$85_L$ of the shell 30 of the skate boot 22. For instance, in this example, the portion 221 of the lace member 44i includes solely the external subshell $85_3$ and therefore comprises the polymeric material $M_3$ associated therewith. Alternatively, the portion 221 of the lace member $44_i$ may include one or more different materials. For example, in some embodiments, the portion 221 of the lace member $44_i$ may also comprise the internal subshell $85_1$ and/or the intermediate subshell $85_2$ such that the portion 221 of the lace member $44_i$ also comprises the polymeric material $M_1$ and/or the polymeric material $M_2$ associated therewith. Moreover, in this embodiment, the apertures 48 that extend through the lace members $44_1$, $44_2$ are formed during the molding process by appropriate structures (e.g., projections) of the last 152 and an associated female mold $154_i$.

The skate 10 may be implemented in any other suitable manner in other embodiments.

Figure 30:
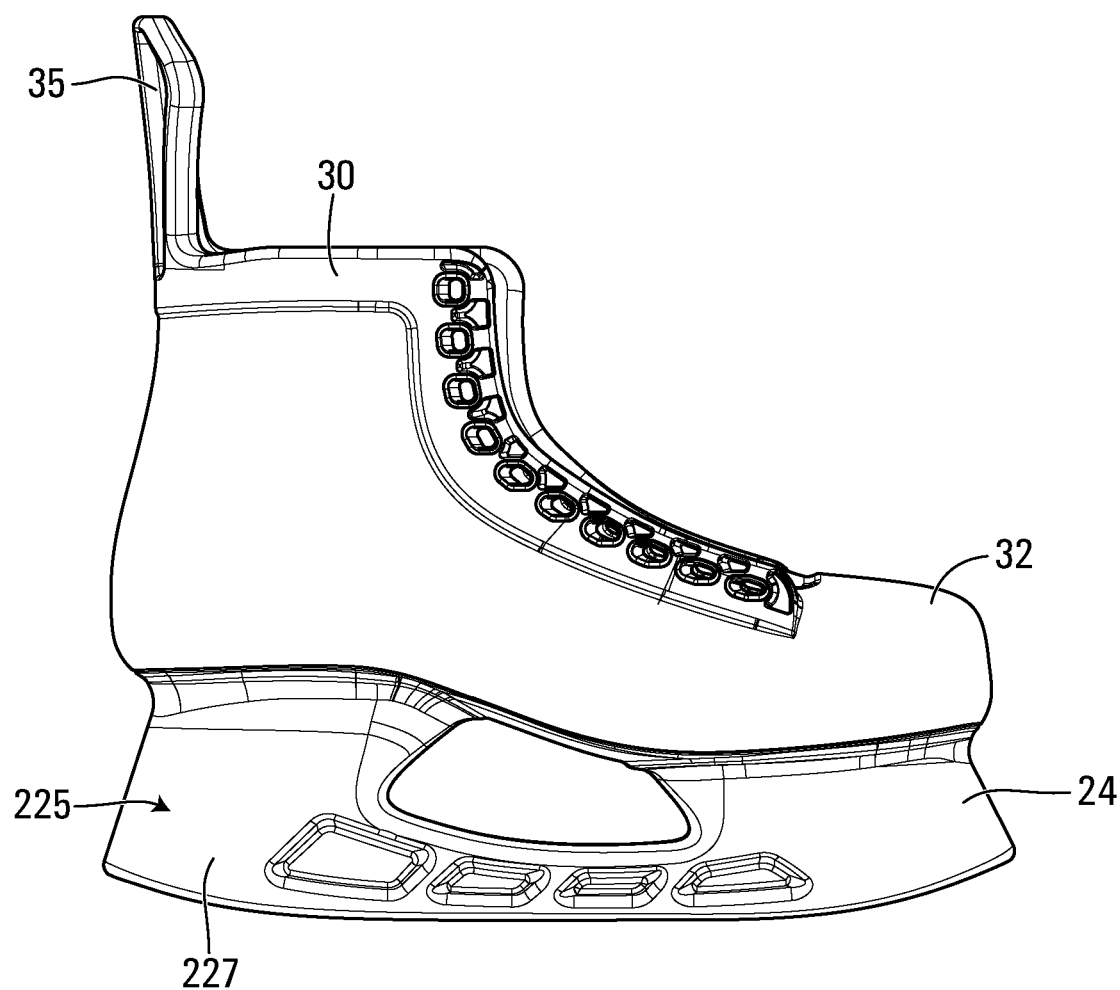
FIG. 30 is a side view of the shell in an embodiment in which a limited part of the blade holder is molded integrally with the shell.
Figure 31:
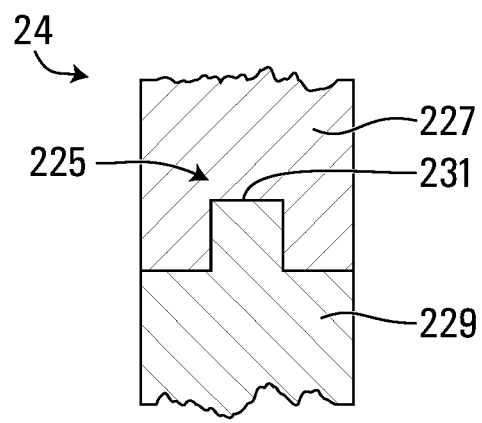
FIGS. 31 and 32 are cross-sectional views of examples of securing the limited part of the blade holder which is molded integrally with the shell with another part of the blade holder.
Figure 32:
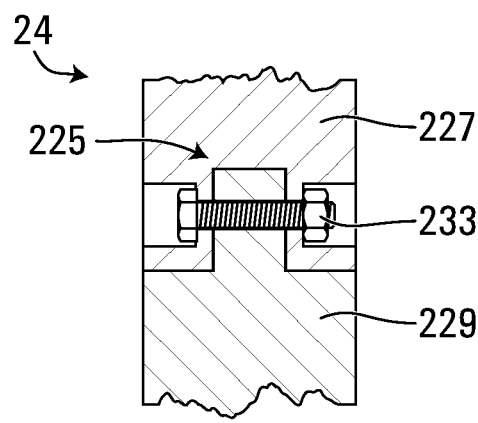

For example, in some embodiments, as shown in FIGS. 30 to 32, only a limited part 225 of the blade holder 24 may be integrally formed with the shell 30. For instance, in some embodiments, the part 225 of the blade holder 24 may comprise a projection 227 projecting from an underside of the shell 30 to which another part 229 of the blade holder 24 may be secured. As shown in FIGS. 31 and 32, the projection 227 of the part 225 of the blade holder 24 may be secured to the other part 229 of the blade holder 24 via an adhesive 231 that is applied between the two parts 225, 229 or in some cases via mechanical fasteners such as a nut and bolt assembly 233 that traverses the parts 225, 229 to secure them together. The parts 225, 229 of the blade holder 24 may be secured to one another in any other suitable way in other embodiments. In other embodiments, a substantial part of the blade holder 24 may be molded integrally with the shell 30. For example, in some cases, at least a majority of the blade holder 24 may be molded together with the shell 30. In some case, substantially an entirety of the blade holder 24 may be molded integrally with the shell 30.

Figure 33:
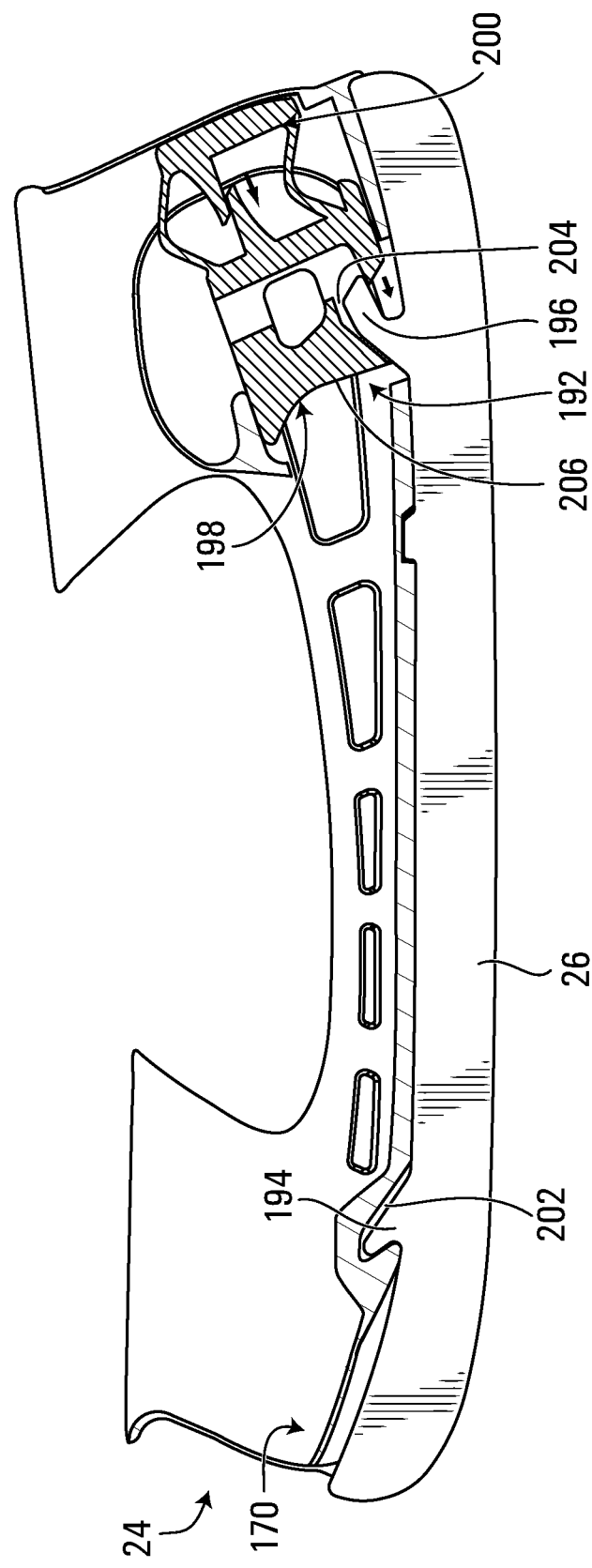
FIG. 33 is a cross-sectional view of the blade holder in an embodiment in which the blade holder comprises a blade-detachment mechanism.

For instance, in some embodiments, the blade holder 24 may retain the blade 26 in any other suitable way. For example, in other embodiments, as shown in FIG. 33, the blade holder 24 comprises a blade-detachment mechanism 192 such that the blade 26 is selectively detachable and removable from, and attachable to, the blade holder 24 (e.g., when the blade 26 is worn out or otherwise needs to be replaced or removed from the blade holder 24).

More particularly, in this embodiment, the blade 26 includes a plurality of projections 194, 196. The blade-detachment mechanism 192 includes an actuator 198 and a biasing element 200 which biases the actuator 198 in a direction towards the front portion 170 of the blade holder 24. In this embodiment, the actuator 198 comprises a trigger. To attach the blade 26 to the blade holder 24, the front projection 194 is first positioned within a hollow space 202 (e.g., a recess or hole) of the blade holder 24. The rear projection 196 can then be pushed upwardly into a hollow space 204 (e.g., a recess or hole) of the blade holder 24, thereby causing the biasing element 200 to bend and the actuator 198 to move in a rearward direction. The rear projection 196 will eventually reach a position which will allow the biasing element 200 to force the actuator 198 towards the front portion 170 of the blade holder 24, thereby locking the blade 26 in place. The blade 26 can then be removed by pushing against a finger-actuating surface 206 of the actuator 198 to release the rear projection 196 from the hollow space 204 of the blade holder 24. Thus, in this embodiment, the blade-detachment mechanism 192 is free of any threaded fastener (e.g., a screw or bolt) to be manipulated to detach and remove the blade 26 from the blade holder 24 or to attach the blade 26 to the blade holder 24.

Further information on examples of implementation of the blade-detachment mechanism 192 in some embodiments may be obtained from U.S. Pat. No. 8,454,030 hereby incorporated by reference herein. The blade-detachment mechanism 192 may be configured in any other suitable way in other embodiments.

Figure 34:
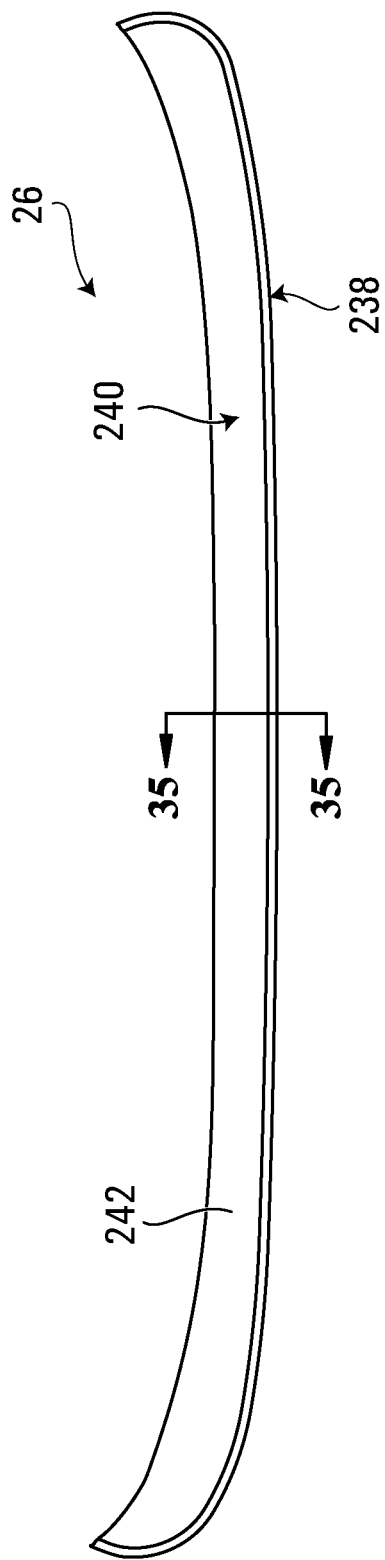
FIG. 34 is a side view of the blade of the skating device.
Figure 35:
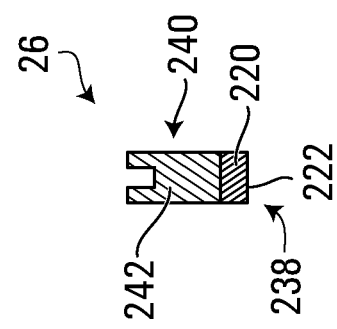
FIG. 35 is a cross-sectional view of the blade taken along line 35-35 of FIG. 34.

The blade 26 may be implemented in any other suitable way in other embodiments. For example, in some embodiments, as shown in FIGS. 34 and 35, the blade 26 may comprise a runner 238 that is made of the ice-contacting material 220 and includes the ice-contacting surface 222 and a body 240 connected to the runner 238 and made of a material 242 different from the ice-contacting material 220. The runner 238 and the body 240 of the blade 26 may be retained together in any suitable way. For example, in some cases, the runner 238 may be adhesively bonded to the body 240 using an adhesive. As another example, in addition to or instead of being adhesively bonded, the runner 238 and the body 240 may be fastened using one or more fasteners (e.g., rivets, screws, bolts, etc.). As yet another example, the runner 238 and the body 240 may be mechanically interlocked by an interlocking portion of one of the runner 238 and the body 240 that extends into an interlocking space (e.g., one or more holes, one or more recesses, and/or one or more other hollow areas) of the other one of the runner 238 and the body 240 (e.g., the body 240 may be overmolded onto the runner 238).

In some embodiments, one or more other components (e.g., the tongue 34, the footbed 38, etc.) of the skate boot 22 may be molded integrally with the shell 30 in the molding apparatus 150 during the molding process. The shell 30 and these one or more other components of the skate boot 22 may thus constitute a monolithic one-piece structure. A given component of the skate boot 22 may therefore comprise a portion 235 that is integrally formed with the shell 30 such that the portion 235 of the given component of the skate boot 22 and the shell 30 of the skate boot 22 are formed together as one-piece in the molding apparatus 150 during the molding process.

As such, the portion 235 of the given component of the skate boot 22 may include one or more of the polymeric materials $M_1$-$M_N$ of the subshells $85_1$-$85_L$ of the shell 30 of the skate boot 22. For instance, the portion 235 of the given component may include one or more of the internal, intermediate and external subshells $85_1$, $85_2$, $85_3$ and therefore may comprise one or more of the polymeric materials $M_1$, $M_2$, $M_3$ associated therewith. Alternatively, the portion 235 of the given component may include one or more different materials.

Figure 36:
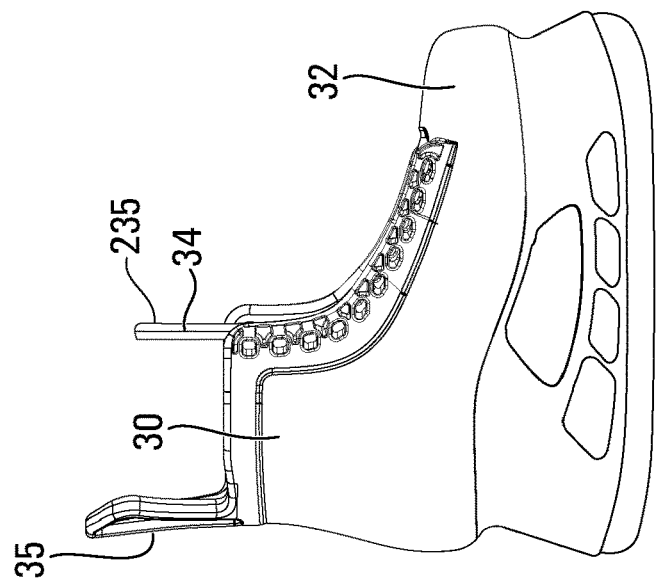
FIG. 36 is a side view of the skate in an embodiment in which a toe cap, a tongue, a tendon guard, a footbed and a pair of lace members of the skate boot are molded integrally with the shell.

For example, in some embodiments, with additional reference to FIG. 36, the toe cap 32, the tongue 34, the tendon guard 35, the footbed 38 and the lace members $44_1$, $44_2$ may be molded integrally with the shell 30 of the skate boot 22. That is, at least a portion of (i.e., a part or an entirety of) each of the toe cap 32, the tongue 34, the tendon guard 35, the footbed 38 and the lace members $44_1$, $44_2$ may be formed integrally with the shell 30 as one-piece in the molding apparatus 150 during the molding process.

Figures 43A, 43B:
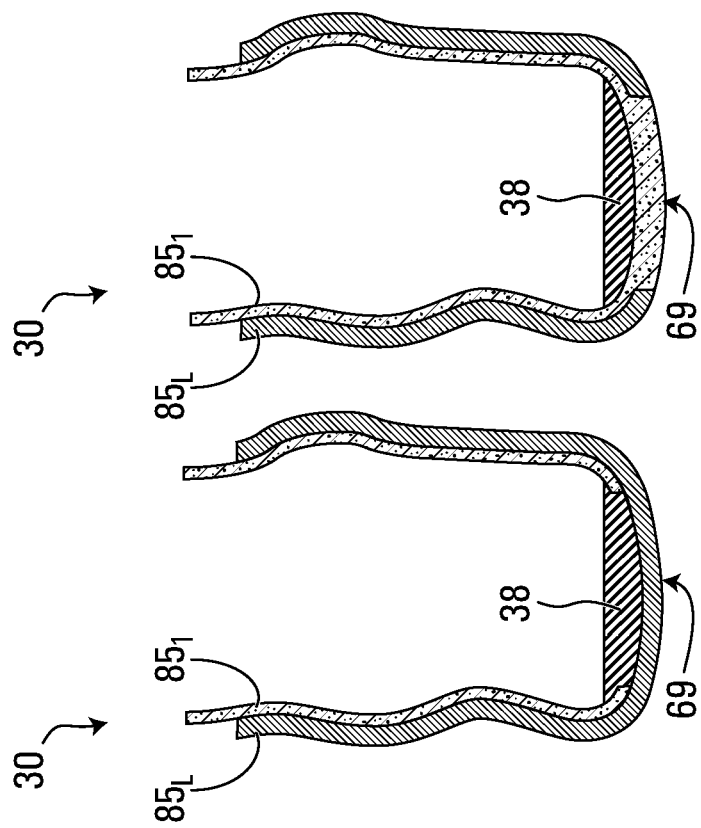
FIGS. 42, 43A and 43B are cross-sectional views of the shell in embodiments in which a footbed of the skate boot is formed integrally with the shell of the skate boot.

As shown in FIG. 42, in some embodiments, when the footbed 38 is formed integrally with the shell 30 during the molding process, one or more the subshells $85_1$-$85_L$ may form the footbed 38. Moreover, in some embodiments, as shown in FIG. 43A, when the footbed 38 is formed integrally with the shell 30 during the molding process, a portion of the footbed 38 may project outwardly such as to fill a gap of a subshell $85_i$ in the sole portion 69 of the shell 30.

In some embodiments, as shown in FIG. 45, when the footbed 38 is formed integrally with the shell 30 during the molding process, the footbed 38 may be configured to project outwardly such as to fill respective gaps of the internal and intermediate subshells $85_1$, $85_2$ in the sole portion 69 of the shell 30.

Figure 47B:
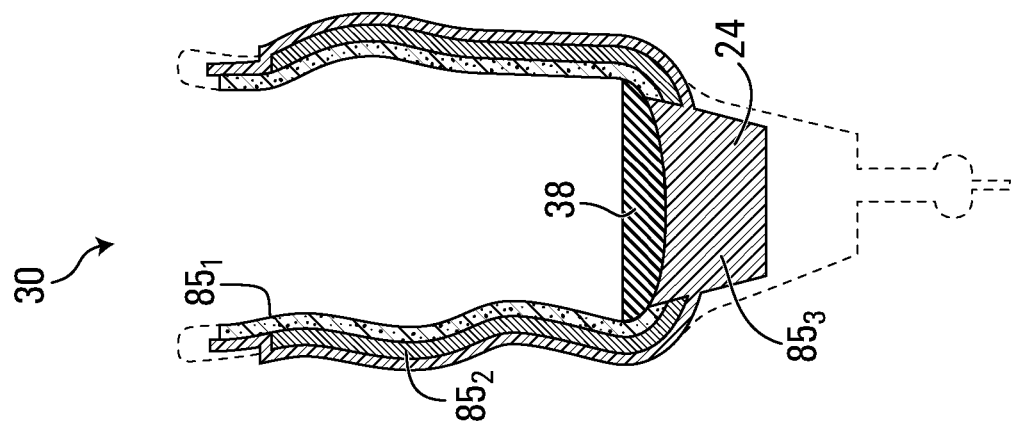
FIGS. 47A and 47B are cross-sectional views of the shell in embodiments in which a limited part of the blade holder is molded integrally with the shell.
Figure 47A:
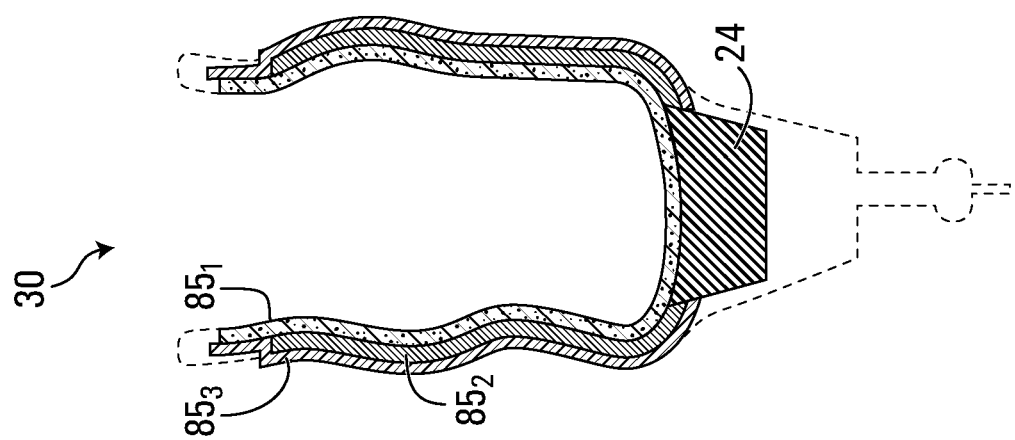

In some embodiments, at least a portion of (i.e., part or an entirety of) the blade holder 24 may be attached to a given one of the subshells $85_1$-$85_L$ of the shell 30. For instance, the portion of the blade holder 24 may be joined to the given one of the subshells $85_1$-$85_L$ during forming of the shell 30. For example, as shown in FIG. 47A, the portion of the blade holder 24 may be affixed to an exterior surface of the internal subshell $85_1$ and the intermediate and external subshells $85_2$, $85_3$ may be formed around the portion of the blade holder 24.

In other embodiments, as discussed above, the portion of the blade holder 24 may be formed during the molding process of the shell 30. For example, as shown in FIG. 47B, a majority or an entirety of the portion of the blade holder 24 may be constituted by the external subshell $85_3$. Moreover, the footbed 38 may be formed or affixed directly on the portion of the blade holder 24 (i.e., on the external subshell $85_3$ that makes up a majority or an entirety of the portion of the blade holder 24).

Figure 48:
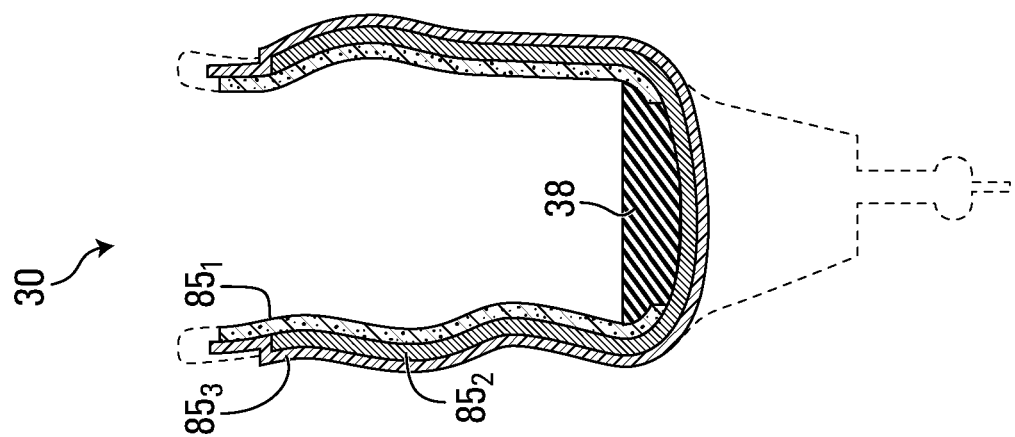
FIG. 48 is a cross-sectional of the shell in an embodiment in which the footbed of the skate boot is formed integrally with the shell.

In some embodiments, as shown in FIG. 48, the footbed 38 may be formed integrally with the shell 30 so as to project outwardly into a gap of the internal subshell $85_1$ in the sole portion 69 of the shell 30.

Figure 53:
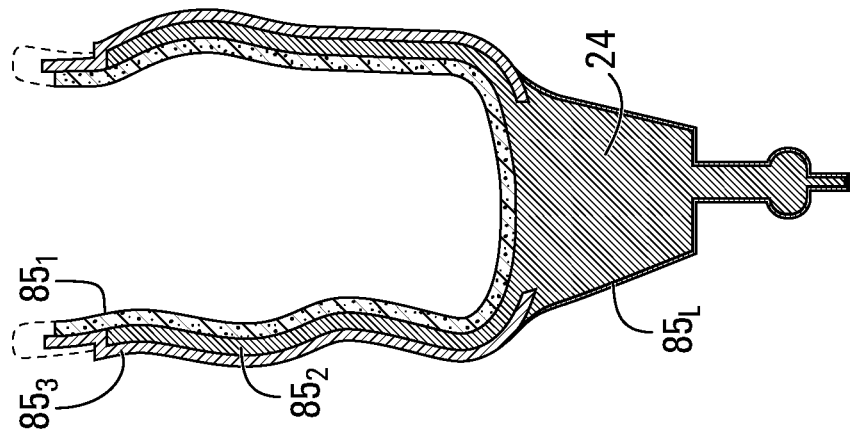
FIG. 53 is a cross-sectional view of the shell in an embodiment in which the blade holder is molded integrally with the shell and a given subshell envelops the blade holder but not the shell.
Figure 52:
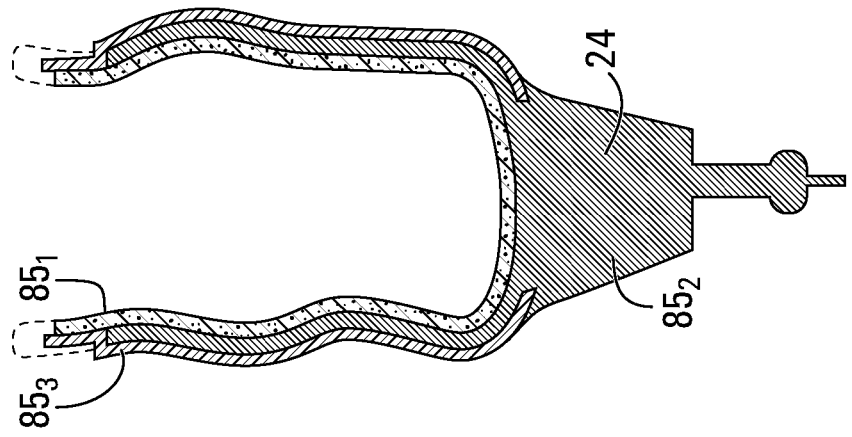
FIG. 52 is a cross-sectional view of the shell in an embodiment in which the blade holder is molded integrally with the shell and the intermediate subshell making up the blade holder is exposed.

In some embodiments, as shown in FIG. 52, when the blade holder 24 is formed integrally with the shell 30 during the molding process, the portion of the blade holder 24 that is formed integrally with the shell 30 (e.g., a part or an entirety of the blade holder 24) may be constituted by the intermediate subshell $85_2$ such that the intermediate subshell $85_2$ is exposed at the blade holder 24. In other embodiments, as shown in FIG. 53, when the blade holder 24 is formed integrally with the shell 30 during the molding process, a given one of the subshells $85_1$-$85_L$ may be formed to envelop the blade holder 24. That is, a given one of the subshells $85_1$-$85_L$ may be formed around the blade holder 24 but not around the shell 30.

Figure 54:
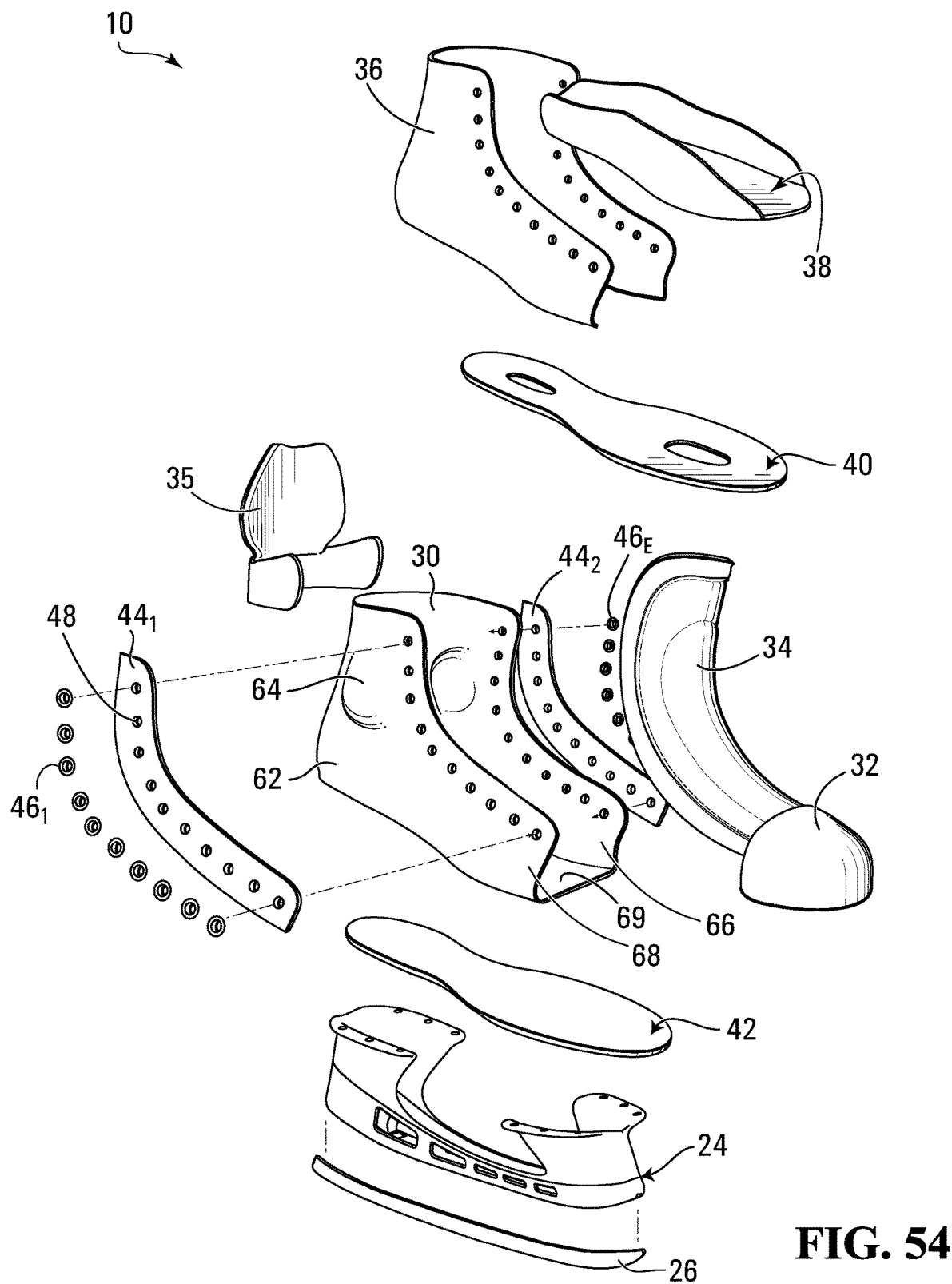
FIG. 54 is an exploded view of the skate in an embodiment in which the shell is molded separately from the blade holder and from other components of the skate boot, notably the toe cap, the tongue, the tendon guard, the footbed and the lace members of the skate boot.

In some embodiments, with additional reference to FIG. 54, the shell 30 and possibly one or more other components of the skate boot 22 may be manufactured separately from the blade holder 24, which may be manufactured separately and attached to the skate boot 22.

Figure 38:
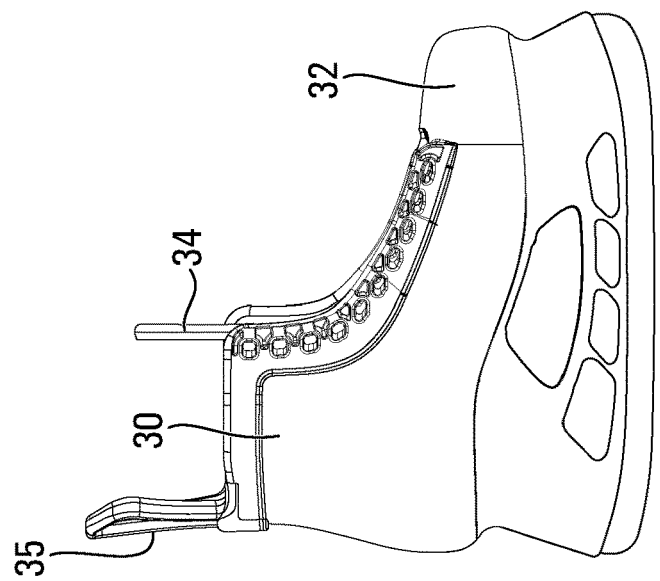
FIG. 38 is a side view of the skate in an embodiment in which any of the toe cap, the tongue, the tendon guard, the footbed and the lace members are molded integrally with the shell of the skate boot.
Figure 37:
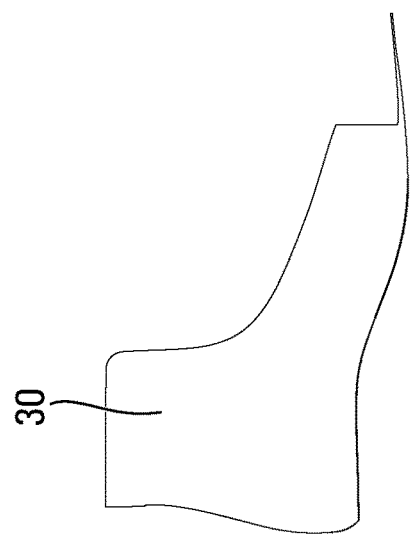
FIG. 37 is a side of the skate in an embodiment in which the shell of the skate boot is molded alone (i.e., separately from the toe cap, the tongue, the tendon guard, the footbed and the lace members of the skate boot)

For example, in some embodiments, as shown in FIG. 37, the shell 30 of the skate boot 22 may be formed alone in the molding apparatus 150, i.e., separately from the toe cap 32, the tongue 34, the tendon guard 35, the footbed 38 and the lace members $44_1$, $44_2$. As shown in FIG. 38, the toe cap 32, the tongue 34, the tendon guard 35, the footbed 38 and the lace members $44_1$, $44_2$ may be attached to the shell 30 after the shell 30 has been formed. For instance, any given one of the toe cap 32, the tongue 34, the tendon guard 35, the footbed 38 and the lace members $44_1$, $44_2$ may be formed on the shell 30 in a separate molding process similar to the one described above in respect of the shell 30. For example, the given one of the toe cap 32, the tongue 34, the tendon guard 35, the footbed 38 and the lace members $44_1$, $44_2$ may be overmolded onto the shell 30. In some cases, the given one of the toe cap 32, the tongue 34, the tendon guard 35, the footbed 38 and the lace members $44_1$, $44_2$ may be formed separately from the shell 30 during another molding process (e.g., a thermoforming process) and attached to the shell 30 via a fastener (e.g., stitching, stapling, etc.) or via gluing (e.g., using an adhesive).

In other embodiments, as shown in FIG. 46, the footbed 38 may be an insert that is placed between the internal subshell $85_1$ and the intermediate subshell $85_2$ and/or between the internal subshell $85_1$ and the external subshell $85_3$ during forming of the shell 30 in a manner similar to that described above in respect of the reinforcement 115 for example. In such embodiments, the player's foot 11 does not contact the footbed 38 directly, however the footbed 38 may still provide comfort to the player's foot 11 by interacting between the subshells.

Figure 49:
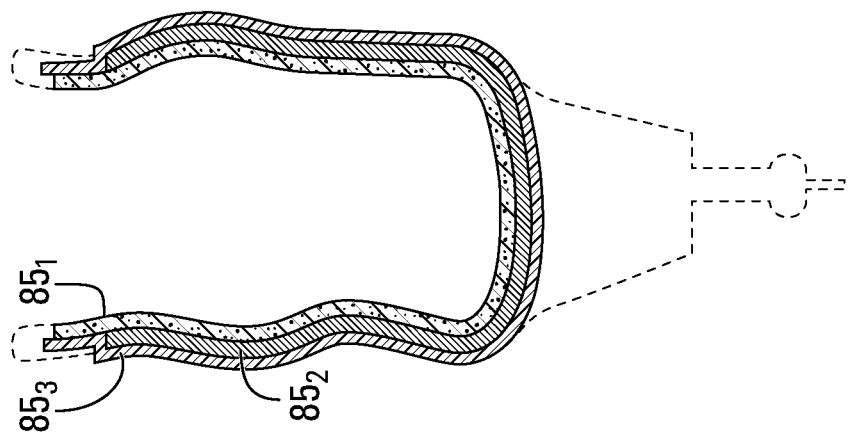
FIG. 49 is a cross-sectional view of the shell in an embodiment in which the shell comprises the internal, intermediate and external subshells and is molded separately from the blade holder.
Figure 51:
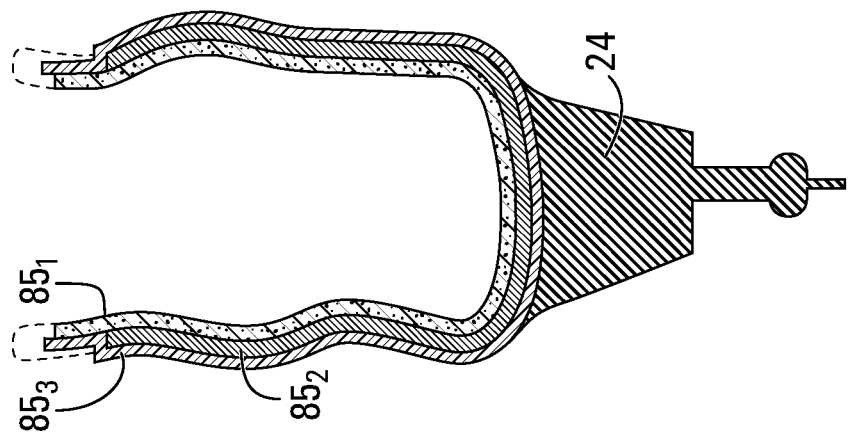
FIG. 51 is a cross-sectional view of the shell in an embodiment in which the blade holder is molded separately from the shell and is affixed to the shell.

As shown in FIGS. 49 and 51, in some embodiments, the blade holder 24 may be formed separately from the internal, intermediate and external subshells $85_1$, $85_2$, $85_3$ of the shell 30.

In such embodiments where the shell 30 and possibly one or more other components of the skate boot 22 are manufactured separately from the blade holder 24, the skate boot 22 may comprise an outsole 42, as shown in in FIG. 54. The outsole 42 is affixed to an underside of the shell 30 for forming the skate boot 22. The outsole 42 comprises a rigid material for imparting rigidity to the outsole 42. More particularly, in this embodiment, the rigid material of the outsole 42 comprises a composite material. For example, the composite material may be a fiber-matrix composite material that comprises a matrix in which fibers are embedded. The matrix may include any suitable polymeric resin, such as a thermosetting polymeric material (e.g., polyester, vinyl ester, vinyl ether, polyurethane, epoxy, cyanate ester, etc.), a thermoplastic polymeric material (e.g., polyethylene, polypropylene, acrylic resin, polyether ether ketone, polyethylene terephthalate, polyvinyl chloride, polymethyl methacrylate, polycarbonate, acrylonitrile butadiene styrene, nylon, polyimide, polysulfone, polyamide-imide, self-reinforcing polyphenylene, etc.), or a hybrid thermosetting-thermoplastic polymeric material. The fibers may be made of any suitable material such as carbon fibers, polymeric fibers such as aramid fibers, boron fibers, glass fibers, ceramic fibers, etc. In other embodiments, the rigid material may comprise any other suitable material (e.g., nylon, polycarbonate materials, polyurethane, thermoplastics, thermosetting resins, reinforced thermoplastics, reinforced thermosetting resins, polyethylene, polypropylene, high density polyethylene).

Figure 55:
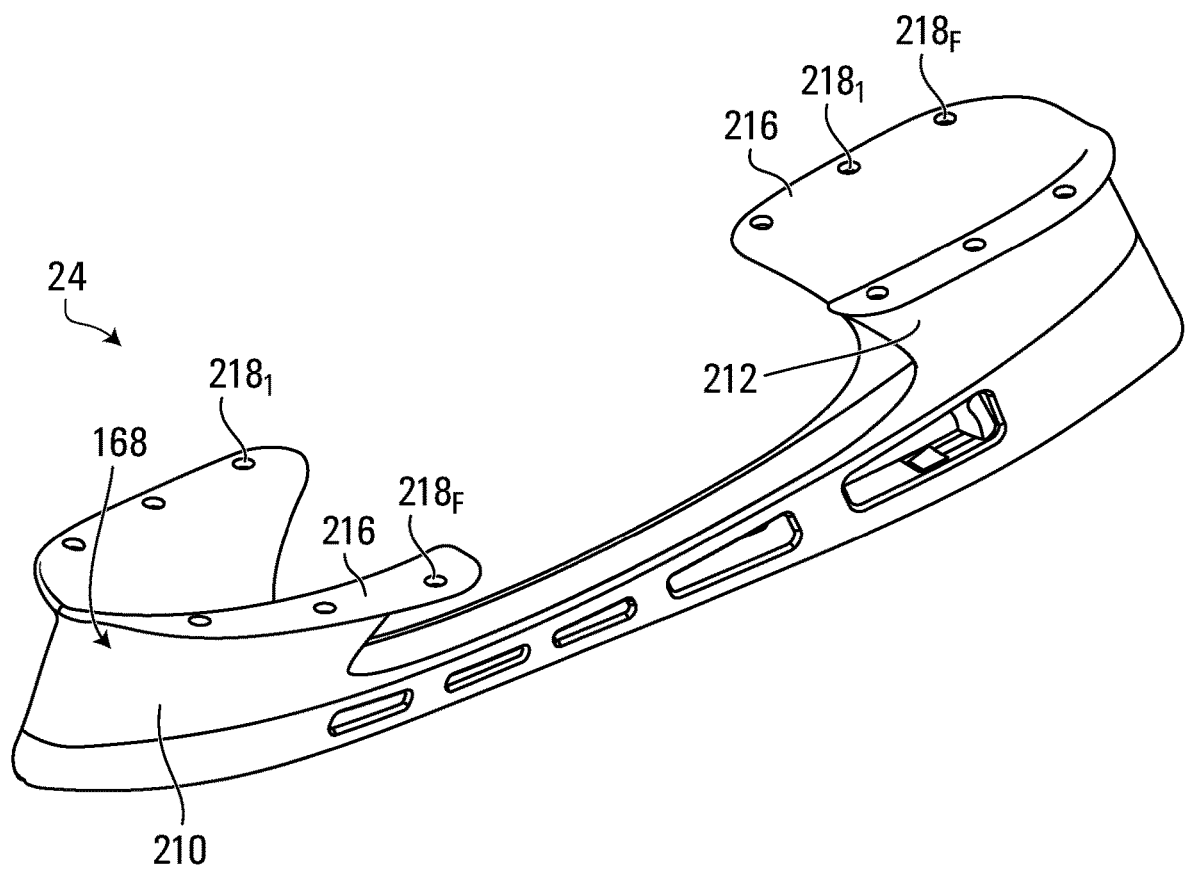
FIG. 55 is a perspective view of the blade holder in an embodiment in which the blade holder is formed separately from the shell of the skate boot.

Moreover, in such embodiments where the skate boot 22 and the blade holder 24 are manufactured separately, the support 168 of the blade holder 24 and the skate boot 22 may be affixed to one another in any suitable way. For example, in some embodiments, as shown in FIG. 55, the front and rear pillars 210, 212 are fastened to the skate boot 22 by fasteners (e.g., rivets, screws, bolts). In this example, each of the front and rear pillars 210, 212 comprises a flange 216 including a plurality of apertures $218_1$-$218_F$ to receive respective ones of the fasteners that fasten the blade holder 24 to the skate boot 22. The support 168 may be affixed to the skate boot 22 in any other suitable manner in other embodiments (e.g., by an adhesive).

In some embodiments, the skate boot 22 may comprise a reinforcement 270 molded integrally with the shell 30 to enhance a torsional strength of the skate boot 22 and/or protection of the player's foot 11 against impacts (e.g., from a puck or hockey stick).

Figure 56:
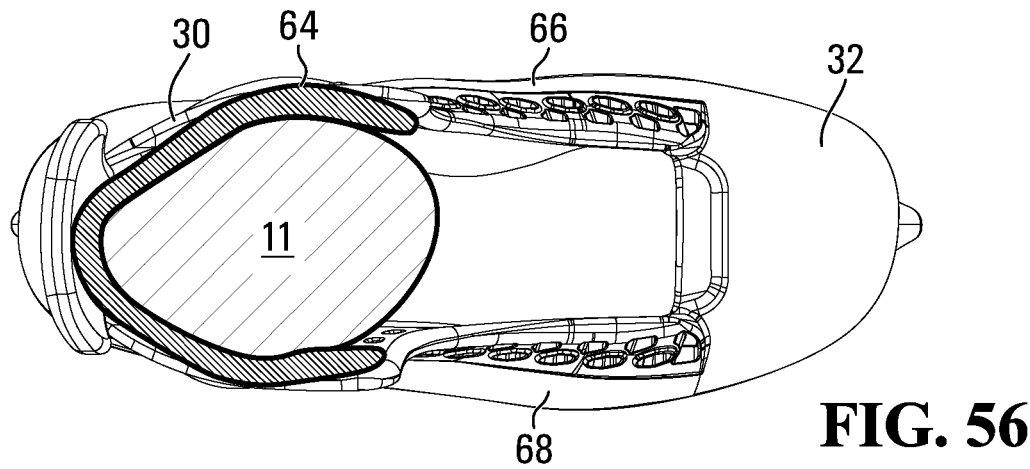
FIG. 56 is a top view of a cross-section of the shell taken along an ankle portion of the shell.

For instance, the reinforcement 270 may comprise an extension 272 that extends beyond the ankle portion 64 of the shell 30 of the skate boot 22 in the longitudinal direction of the skate 10. In contrast, FIG. 56 illustrates a conventional configuration of the shell 30 without the reinforcement 270 and thus without the extension 272. As shown, in such a conventional configuration, no part of the shell extends beyond the ankle portion 64 of the shell 30 in the longitudinal direction of the skate.

Figure 57A:
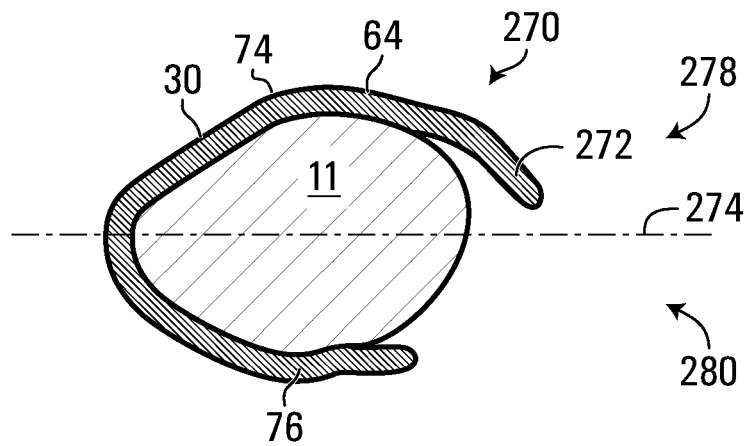
FIGS. 57A and 57B show top cross-sectional views of the ankle portion of the shell in accordance with an embodiment in which the skate boot comprises a reinforcement which comprises an extension.
Figure 57B:
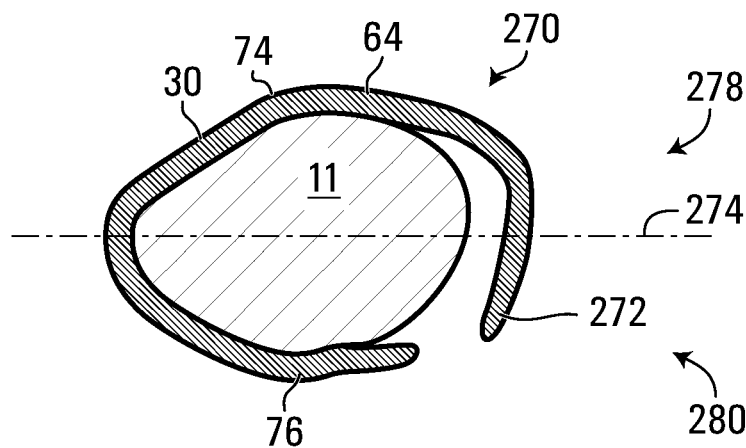

With additional reference to FIGS. 57A and 57B, the extension 272 may be located in front of the ankle portion 64 of the shell 30 in the longitudinal direction of the skate 10. As such, the extension 272 may be configured to protect a front portion of the player's ankle A and the top surface TS of the player's foot 11. The extension 272 may extend in front of the ankle portion 64 of the shell 30 to different extents. For instance, as shown in FIG. 57B, the extension 272 may extend from the medial ankle side 74 of the ankle portion 64 of the shell 30 and wrap around the player's ankle A such that the extension 272 crosses from a medial half 278 of the skate boot 22 over a centerline 274 that generally bisects a width the skate boot 22 and into a lateral half 280 of the skate boot 22. In some cases, as shown in FIG. 57A, the extension 272 may be shorter and extend frontwards from the medial ankle side 74 of the ankle portion 64 of the shell 30 and wrap around over a portion of the player's foot 11 but does not cross over into the lateral half 280 of the skate boot 22. Alternatively, in some cases, rather than extending from the medial ankle side 74, the extension 272 may extend from the lateral ankle side 76 of the ankle portion 64 of the shell 30.

Figure 58:
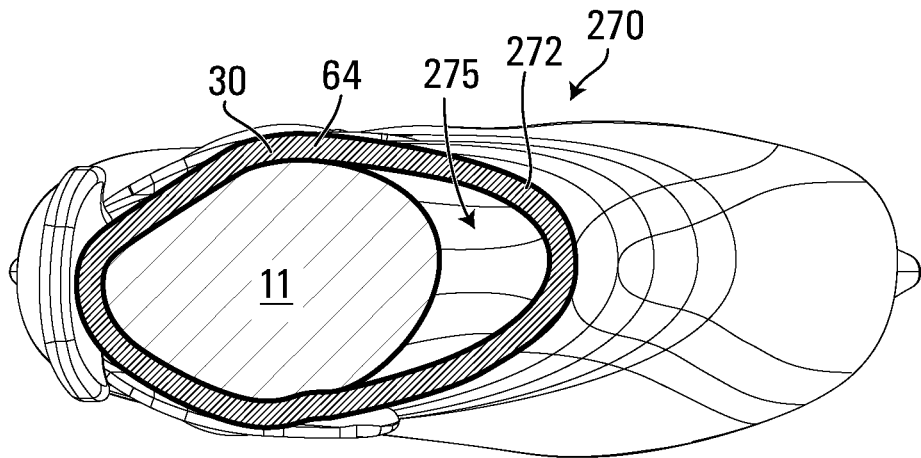
FIGS. 58 and 59 show embodiments in which the extension connects a medial ankle side of the ankle portion to a lateral ankle side of the ankle portion in a direction frontwardly of the ankle portion of the shell.
Figure 59:
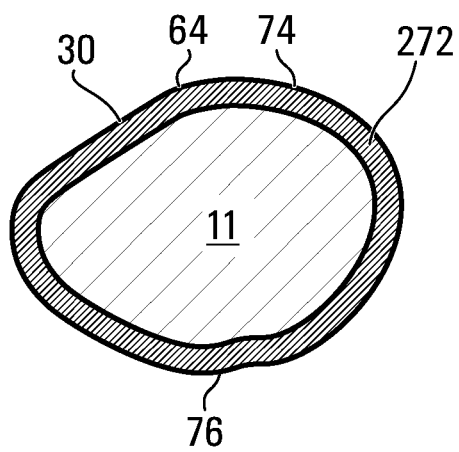

In an example of the variant, as shown in FIG. 58, the extension 272 may connect the medial ankle side 74 of the ankle portion 64 of the shell 30 to the lateral ankle side 76 of the ankle portion 64 of the shell 30 in a direction frontwardly of the ankle portion 64 of the shell 30. In other words, the extension 272 may be configured such that the shell 30 wraps around a front and a rear of the player's ankle A. As such, the shell 30 may be continuous in a region frontwardly of the ankle portion 64 of the shell 30, and may thus lack an opening in which the tongue 34 of the skate boot 22 is typically located. Consequently, in such embodiments, the skate boot 22 may not comprise a tongue 34 or lace members $44_1$, $44_2$. Moreover, the extension 272 may create a gap 275 (i.e., a spacing) between the extension 272 and the player's foot 11 in the longitudinal direction of the skate 10 to facilitate motion (e.g., flexion) of the ankle A while skating. In other embodiments, as shown in FIG. 59, the extension 272 may be configured to wrap around the player's foot 11 such that there is substantially no gap between the extension 272 and the player's foot 11 in the longitudinal direction of the skate 10.

Figure 60:
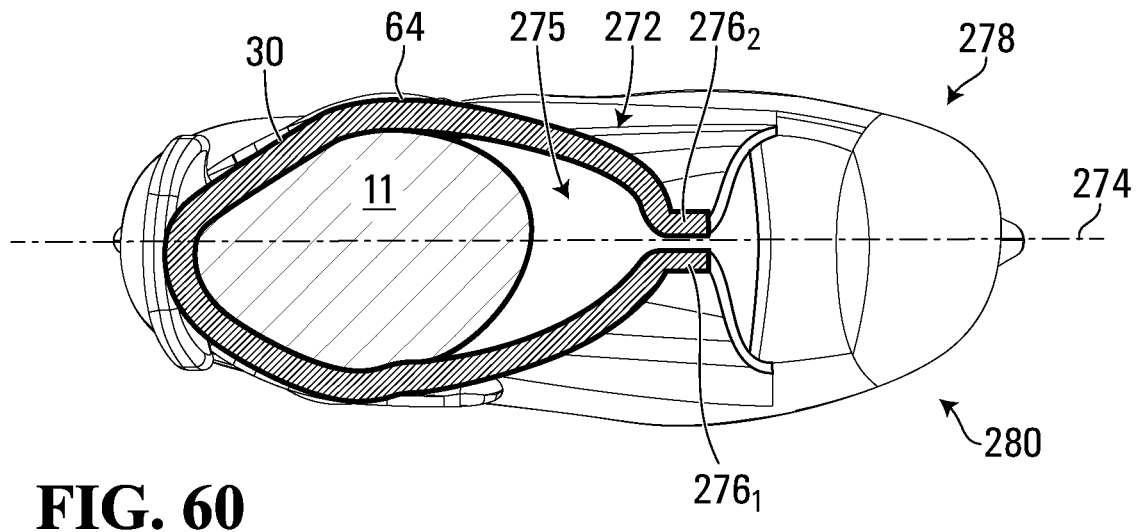
FIGS. 60 and 61 show examples in which the extension comprises a plurality of free ends that are movable relative to one another and converge toward one another.

In some embodiments, the extension 272 may comprise a plurality of free ends $276_1$, $276_2$ that are movable relative to one another and converge toward one another. In some embodiments, as shown in FIG. 60, the free ends $276_1$, $276_2$ of the extension 272 may meet in front of the ankle portion 64 of the shell 30. For example, the free ends $276_1$, $276_2$ may meet symmetrically about the centerline 274 of the skate 10. In other embodiments, the free ends $276_1$, $276_2$ may meet in the medial half 278 or the lateral half 280 of the skate boot 22. While FIG. 60 illustrates the free ends $276_1$, $276_2$ as leaving a gap 275 between the player's foot 11 and the free ends $276_1$, $276_2$ in the longitudinal direction of the skate 10, in some embodiments, the free ends $276_1$, $276_2$ may terminate relatively close to the player's foot 11 such that there is substantially no gap between the player's foot 11 and the free ends $276_1$, $276_2$.

Figure 61:
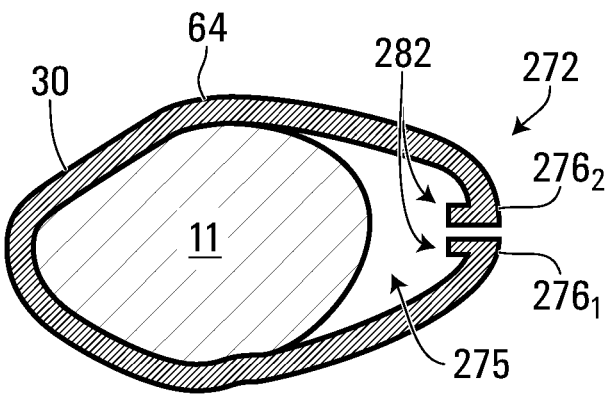

In some embodiments, each free end $276_i$ of the extension 272 may comprise an overlapping portion 282 that overlaps another portion of the free end $276_i$ in the longitudinal direction of the skate 10. For example, as shown in FIG. 61, the overlapping portion 282 of each free end $276i$ may be a portion of the free end $276i$ that faces rearwardly toward the player's ankle A.

Figure 62:
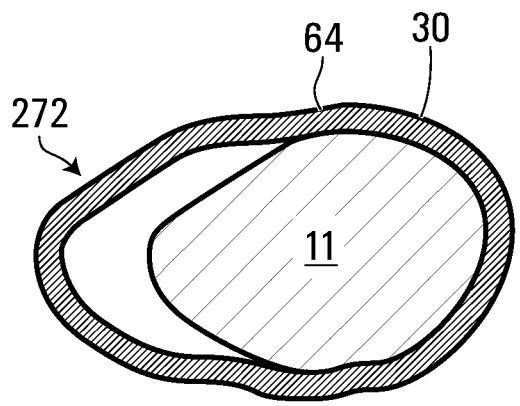
FIG. 62 shows an example of a variant in which the extension is in a rear portion of the ankle portion of the shell.
Figure 63:
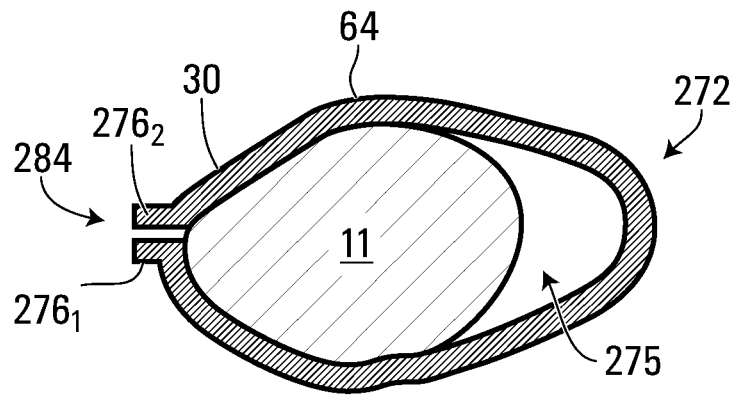
FIGS. 63 and 64 show examples in which the reinforcement comprises two extensions, including one in the rear portion of the ankle portion of the shell.
Figure 64:
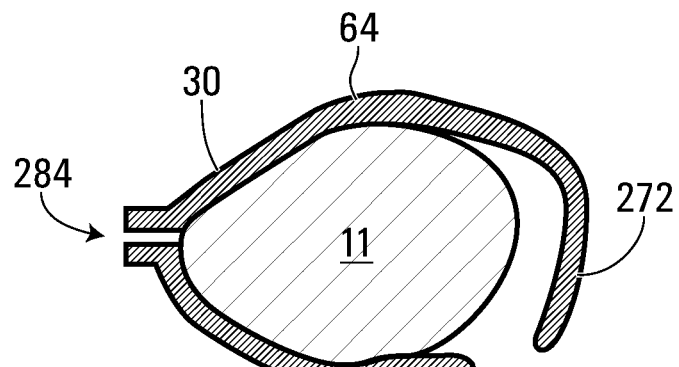
Figure 70:
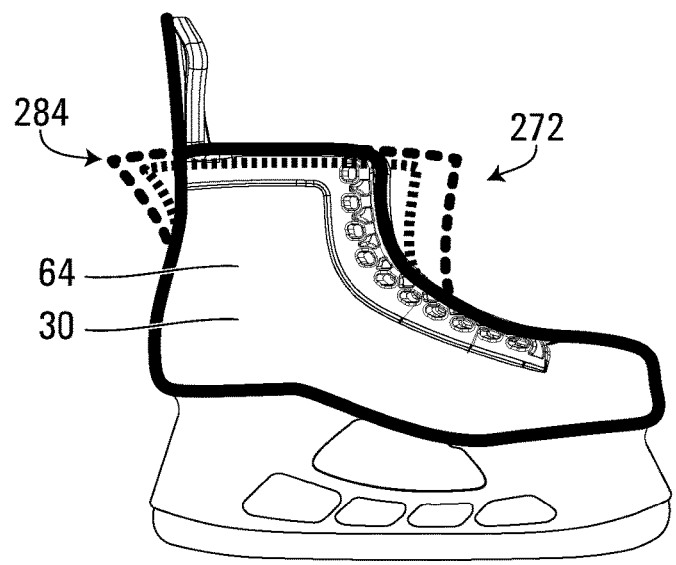
FIG. 70 is a side view of the skate boot of FIG. 63.
Figure 71A:
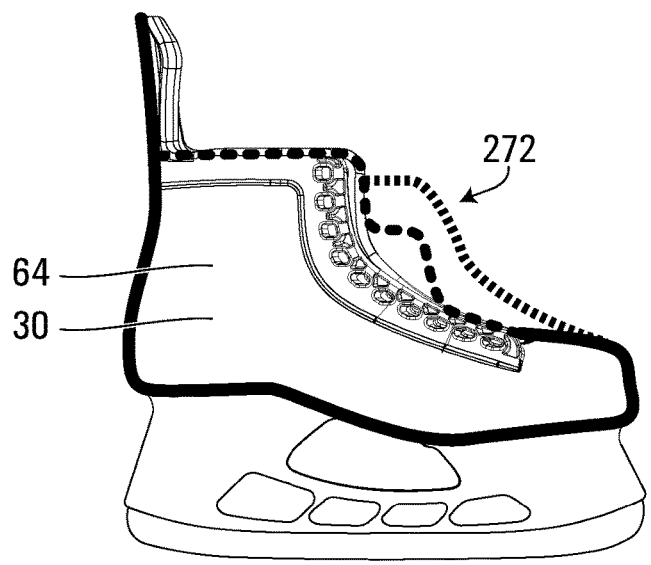
FIGS. 71A and 71B show side and front views of the skate in accordance with another embodiment.
Figure 71B:
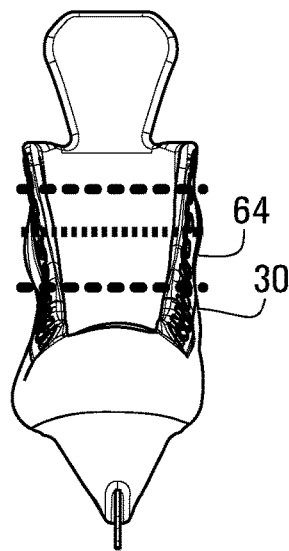

In a variant, the extension 272 may be in the rear portion 82 of the ankle portion 64 of the shell 30. For instance, as shown in FIG. 62, the extension 62 may be configured such that the gap 275 is between a rear portion of the ankle A of the player and the extension 272. In some cases, the reinforcement 270 may comprise more than one extension. For instance, with additional reference to FIGS. 63, 64 and 70, the skate boot 22 may comprise a first extension 272 extending frontwardly of the ankle portion 64 of the shell 30 and a second extension 284 extending rearwardly of the ankle portion 64 of the shell 30. In some embodiments, as shown in FIG. 63, the second extension 284 may comprise the free ends $276_1$, $276_2$ such that the free ends $276_1$, $276_2$ extend rearwardly of the ankle portion 64 of the shell 30.

In some examples of the variant where an extension 272, 284 of the skate boot 22 extends rearwardly of the ankle portion 64 of the shell 30, the tendon guard 35 may be omitted in order to provide additional flexibility when skating.

Figure 66:
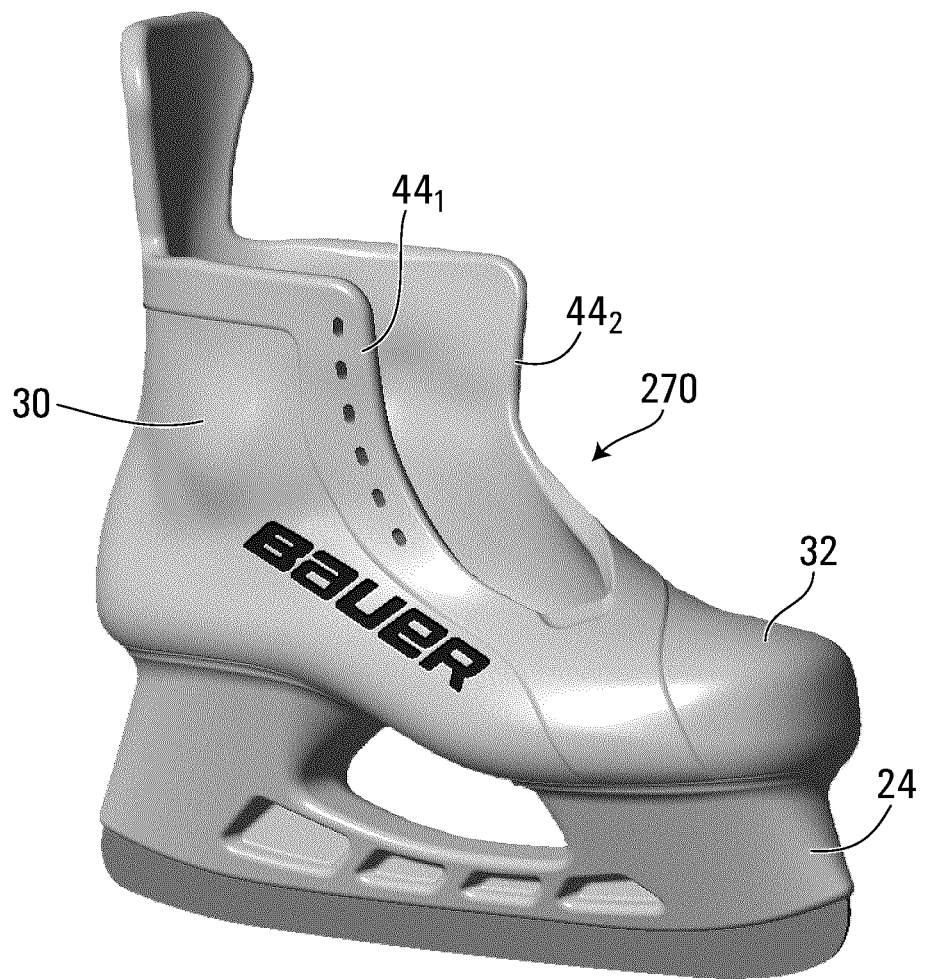
FIG. 66 is a perspective view of the shell of the skate boot in accordance with a variant in which the reinforcement comprises the lace members of the skate boot.
Figure 67:
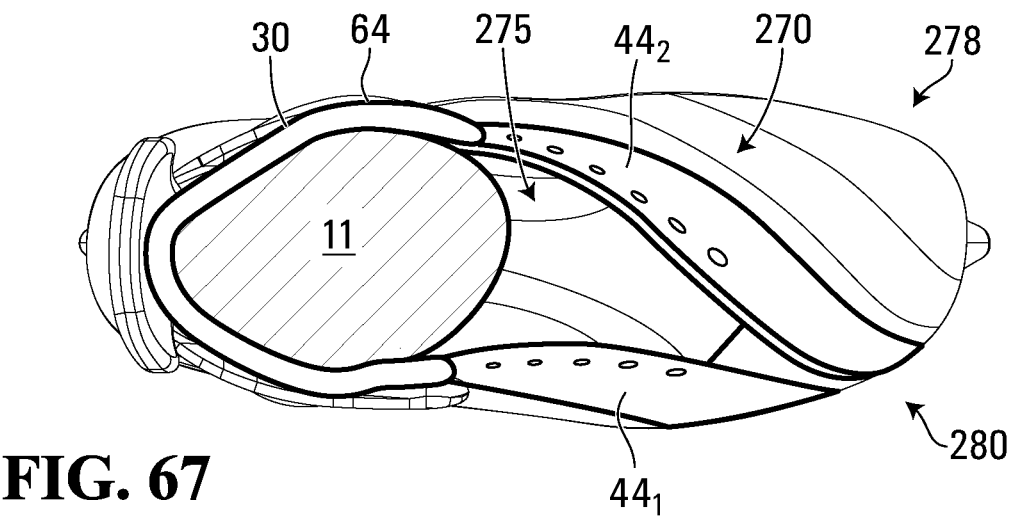
FIGS. 67 and 68 show different examples of the shell in accordance with the variant of FIG. 66.
Figure 68:
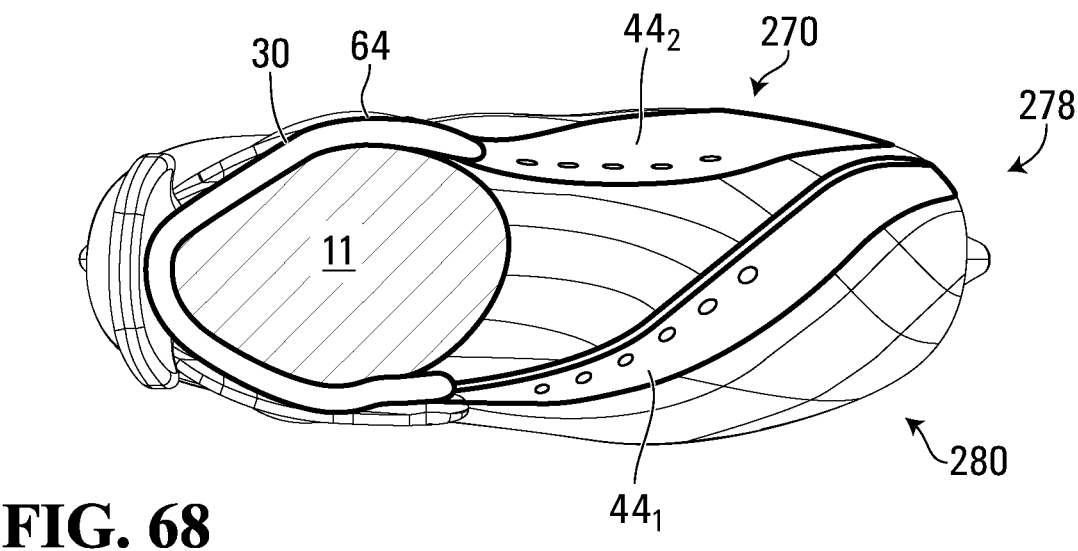

In another variant, the reinforcement 270 may comprise the lace members $44_1$, $44_2$ of the skate boot 22. That is, the lace members $44_1$, $44_2$ may be configured to enhance a torsional strength of the skate boot 22 and/or protection of the player's foot 11 against impacts. For instance, as shown in FIGS. 66 to 68, a given one of the lace members $44_1$, $44_2$ extending in a given one of the medial half 278 and the lateral half 280 of the skate boot 22 may cross over to the other one of the medial half 278 and the lateral half 280 of the skate boot 22. The other one of the lace members $44_1$, $44_2$ may generally follow a direction defined by the given one of the lace members $44_1$, $44_2$. This may be defined as a "twisted" configuration of the skate boot 22.

Figure 69:
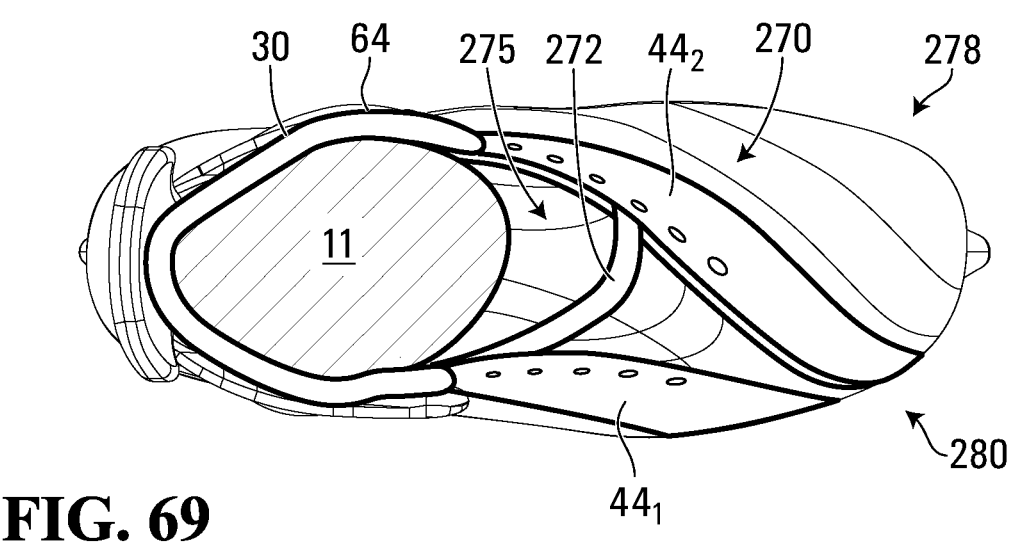
FIG. 69 shows an example of the shell in accordance with the variant of FIG. 66 and in which the skate boot comprises an extension.

As shown in FIG. 69, in some examples of the twisted configuration of the skate boot 22, the reinforcement 270 may also comprise the extension 272. For example, the extension 272 may extend from the medial ankle side 74 to the lateral ankle side 76 of the ankle portion 64 of the shell 30 in a direction frontwardly of the player's ankle A such that the gap 275 is present between the extension 272 and the player's foot 11 in the longitudinal direction of the skate 10.

The twisted configuration of the skate boot 22 may increase the torsional rigidity and frontal impact protection of the skate boot 22 and thus may allow the shell 30 and/or other components of the skate boot 22 (e.g., the toe cap 32) to have a reduced thickness compared to a conventional skate boot without the twisted configuration where the lace members are confined to a single one of the medial or lateral halves of the skate boot. Moreover, the twisted configuration of the skate boot 22 may allow the skate boot 22 to be flexed in a different direction compared to a conventional skate boot. For instance, the twisted configuration of the skate boot 22 may allow the player to flex the skate boot 22 in the medial half 278 of the skate boot 22 in an area around the toe cap 32. As a result, the twisted configuration of the skate boot 22 may allow better conservation of energy used by the player to propulse himself/herself on the ice 12.

Figure 65:
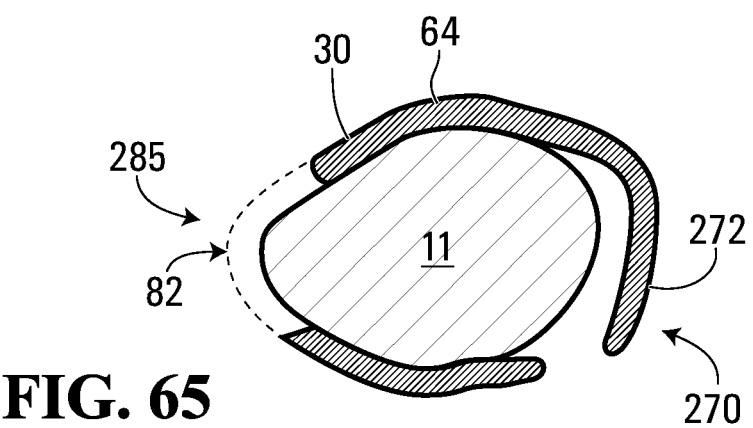
FIG. 65 is an example of a variant in which the rear portion of the ankle portion comprises an opening.

In another variant, with additional reference to FIG. 65, the reinforcement 270 may comprise an opening 285 in the rear portion 82 of the ankle portion 64 of the shell 30. The opening 285 may extend vertically for a substantial portion of a height of the skate boot 22. For instance, in some cases, a ratio between a height of the opening 285 and the height of the skate boot 22 may be at least 0.3, in some cases at least 0.4, in some cases at least 0.5, in some cases at least 0.6 and in some cases even more.

Figure 74:
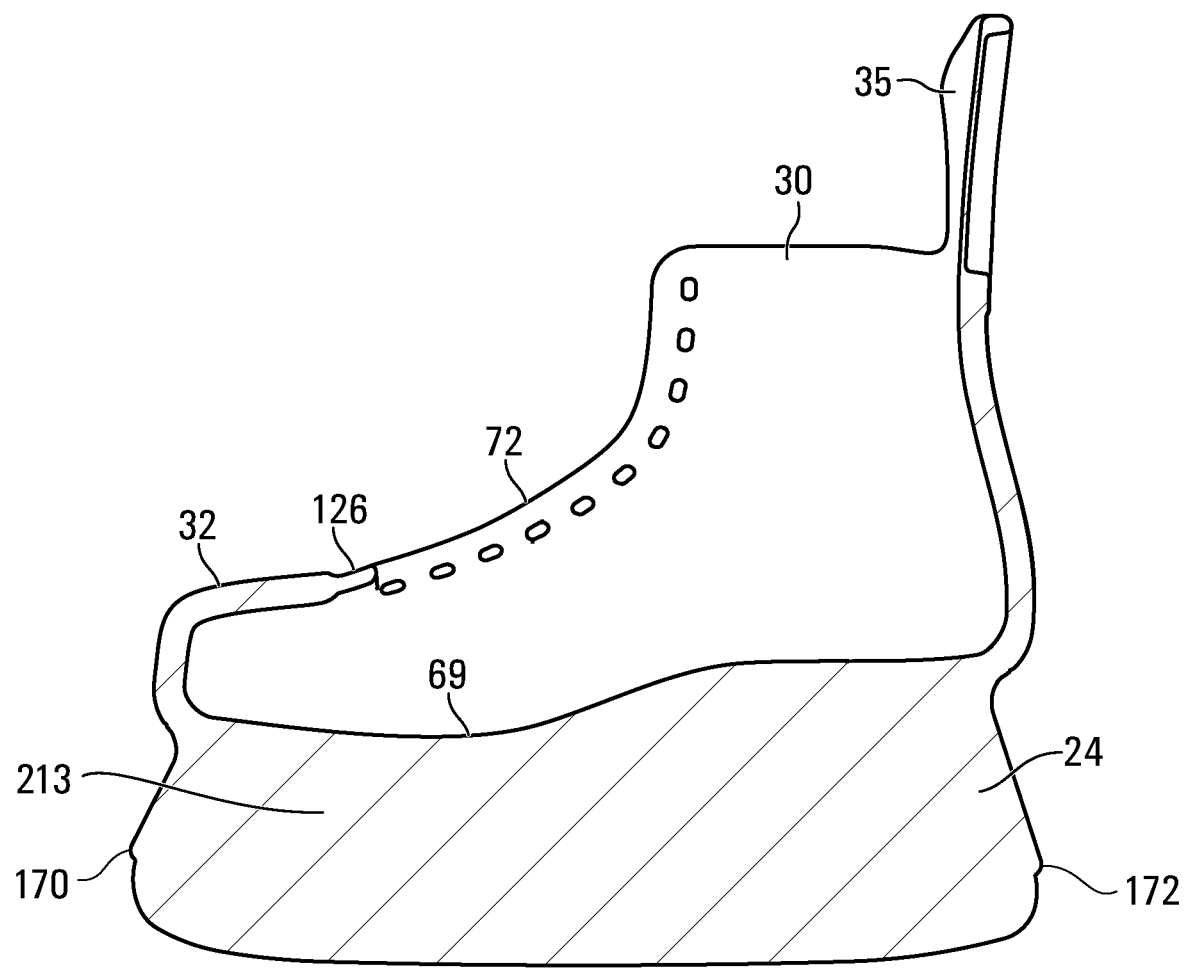
FIG. 74 shows an example of a variant in which the blade holder has no opening extending from its lateral side to its medial side.

In another variant, with reference to FIG. 74, the blade holder 24 may be configured such that there is no spacing between the front and rear pillars 210, 212. In such a variant, the support 168 of the blade holder 24 comprises a "single" pillar 213 which is constituted by material that extends from the front portion 170 of the blade holder 24 to a rear portion 172 of the blade holder 24. In particular, in this example, the blade holder 24 does not have any openings extending from its lateral side to its medial side.

Figure 75:
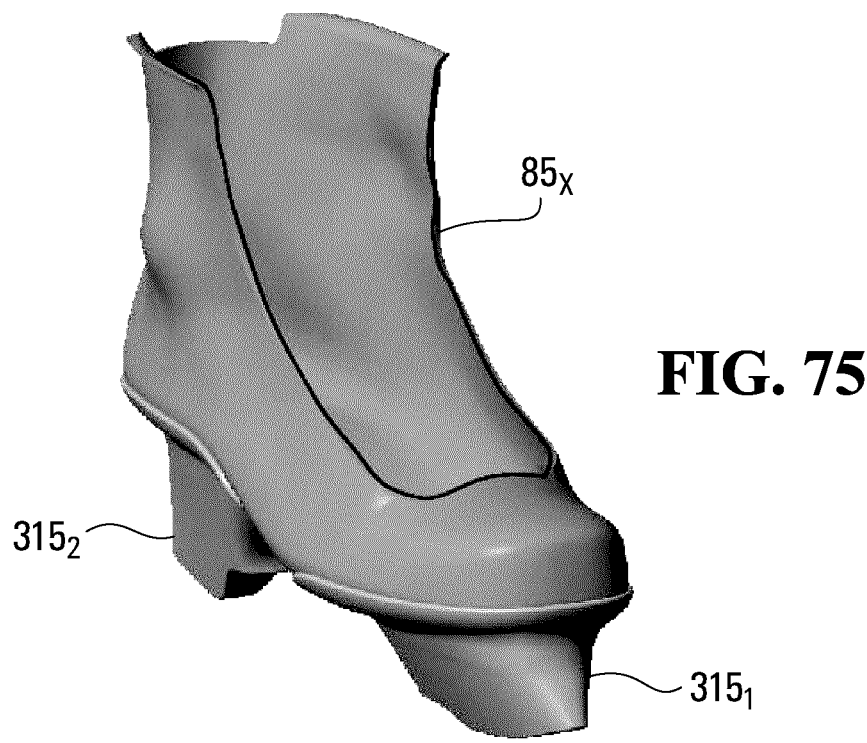
FIGS. 75 to 77 show an example of a variant in which the shell and/or the blade holder comprises one or more inserts over which a subshell is molded.
Figure 76:
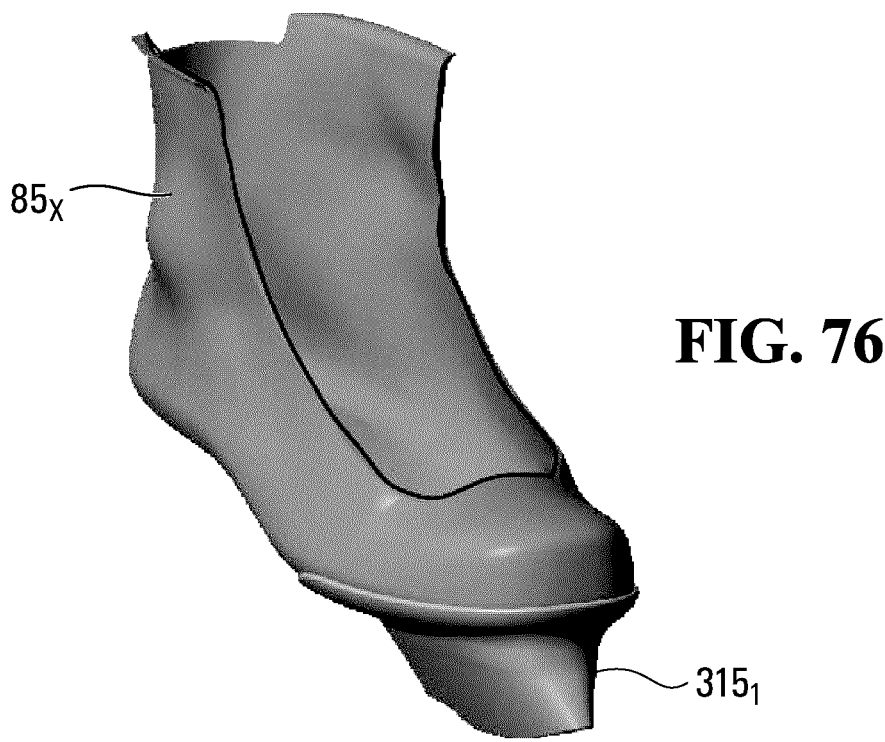
Figure 77:
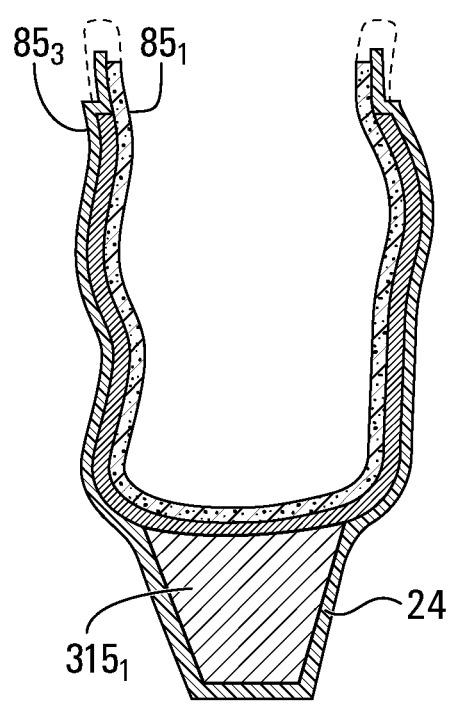

In another variant, the shell 30 and/or the blade holder 24 and/or another component of the skate boot 22 that is made integrally with the shell 30 may comprise one or more inserts $315_1$-$315_N$ over which one or more of the subshells $85_1$-$85_L$ may be molded. For instance, as shown in FIG. 75, in this example, the blade holder 24 comprises a front insert $315_1$ and a rear insert $315_2$ which respectively make up a part of the front and rear pillars 210, 212. More particularly, in this example of implementation, the front and rear inserts $315_1$, $315_2$ make up at least a majority (i.e., a majority or an entirety) of the front and rear pillars 210, 212 of the support 168 of the blade holder 24. In this example, the front and rear inserts $315_1$, $315_2$ are affixed to the shell 30 during the molding process of the shell 30 in order to make the blade holder 24 integrally with the shell 30. For example, once a given number of the subshells $85_1$-$85_L$ are molded, the front and rear inserts $315_1$, $315_2$ are affixed to the formed subshells $85_1$-$85_L$ (e.g., by gluing, taping, or any other suitable way) and one or more other ones of the subshells $85_1$-$85_L$, in this case the exterior subshell $85_3$, is molded over the front and rear inserts $315_1$, $315_2$ and the formed subshells $85_1$-$85_L$ such as to form a continuous subshell $85_3$ extending from the shell 30 to the blade holder 24. In other cases, as shown in FIG. 76, the blade holder 24 may comprise a single one of the inserts $315_1$, $315_2$ (e.g., only the front insert $315_1$ or only the rear insert $315_2$).

Figure 78A:
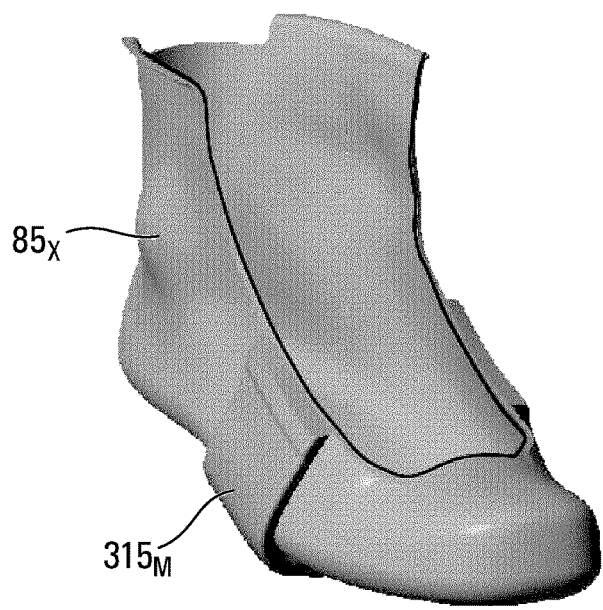
FIGS. 78A to 78C show other examples of the variant of FIG. 75 in which the inserts form a part of the shell.
Figure 78B:
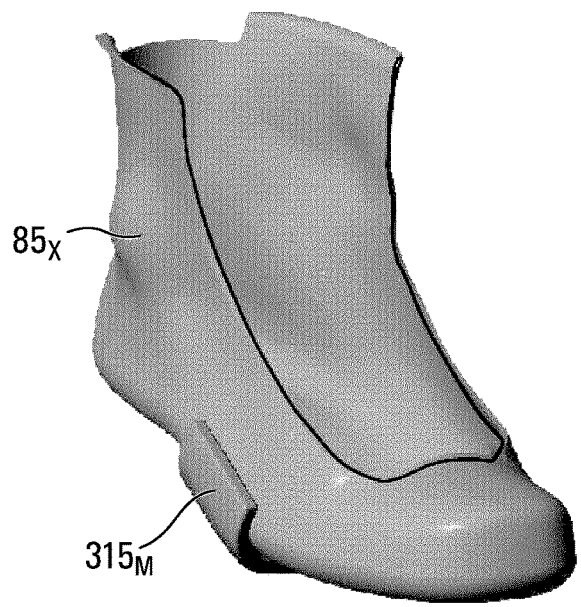
Figure 78C:
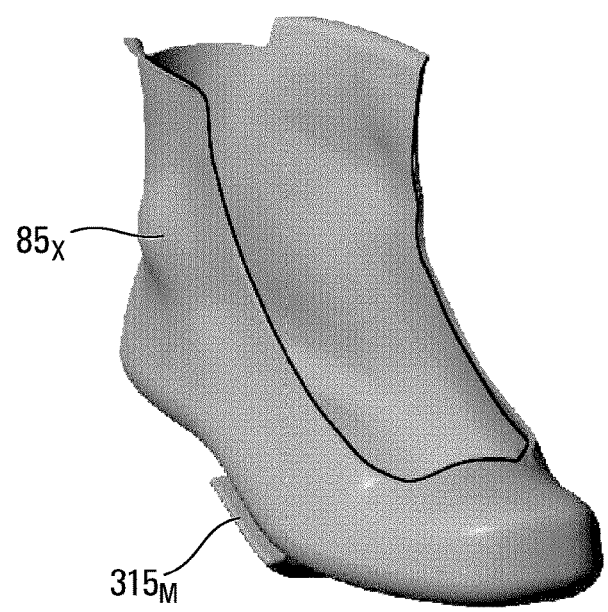

In other examples, the inserts $315_1$-$315_N$ may not be part of the blade holder 24 but may instead form part of the shell 30. For instance, as shown in FIG. 78A, in this example, the shell 30 comprises an insert $315_M$ disposed between given ones of the subshells $85_1$-$85_L$. For example, the insert $315_M$ may be disposed on an outer surface of the intermediate subshell $85_2$ such that the exterior subshell $85_3$ may be molded over the insert $315_M$ and the intermediate subshell $85_2$. The insert $315_M$ may be disposed at any portion of the shell 30. In this example, the insert $315_M$ is disposed at a middle portion of the shell 30 corresponding to the intermediate portion 68 of the skate boot 22. In particular, the insert $315_M$ is disposed such as to extend from the lateral side portion 66 of the shell 30 to the medial side portion 68 of the shell 30 and wrapping around under the sole portion 69 of the shell 30. As shown in FIG. 78B, the insert $315_M$ may extend to various heights on the medial and lateral side portions 66, 68 of the shell 30. In some cases, the insert $315_M$ may extend substantially a full height of each of the lateral and medial side portions 66, 68. As shown in FIG. 78C, in some cases, the insert $315_M$ may not extend to the lateral and medial side portions 66, 68 of the shell 30 but may rather be confined to be disposed under the sole portion 69 of the shell 30.

In this example, the inserts $315_1$-$315_N$ comprise a foam material. In particular, the foam material of the inserts $315_1$-$315_N$ has a density that is less than the density of the exterior subshell $85_3$. This may be helpful to reduce the weight of the skate 10.

Figure 79:
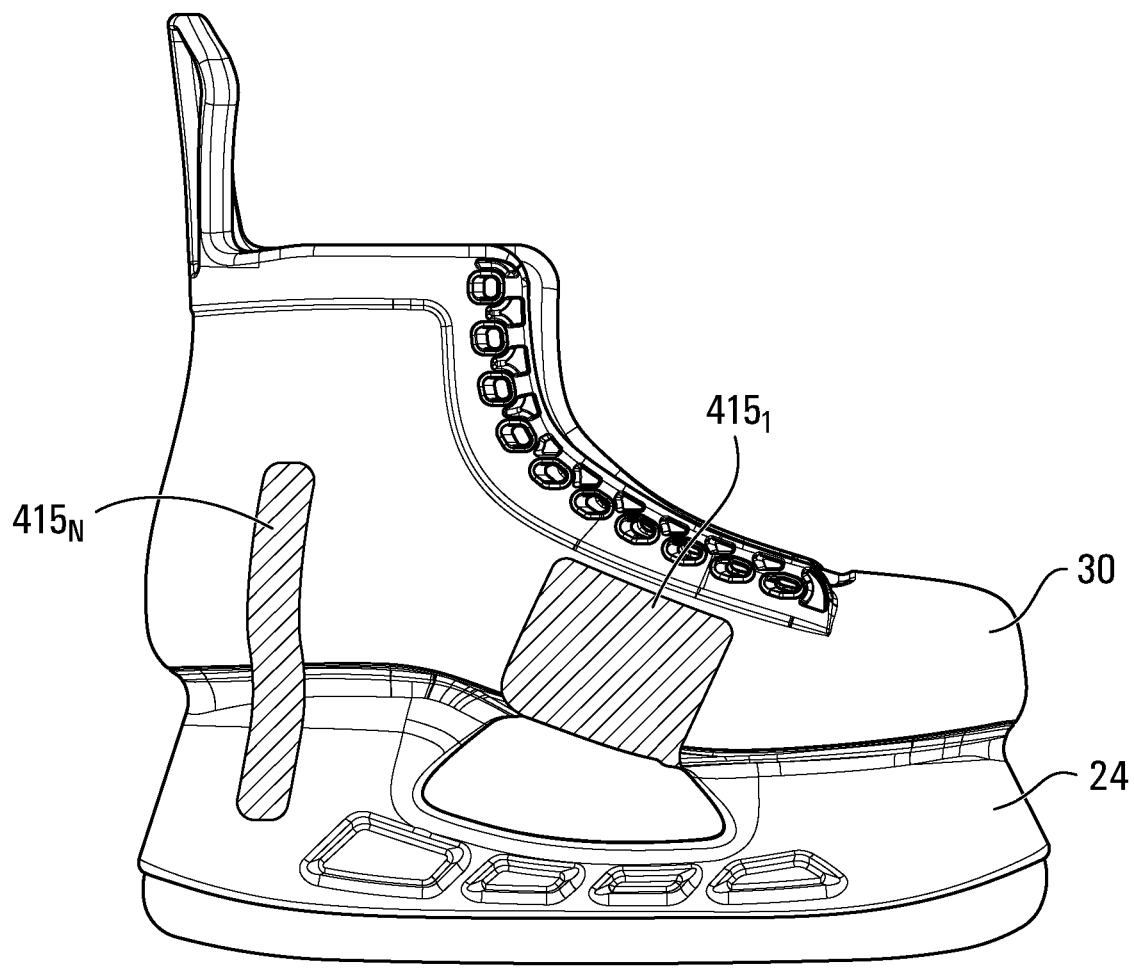
FIG. 79 shows an example of a variant in which one or more of the subshells comprises a filled portion comprising a different material.
Figure 80A:
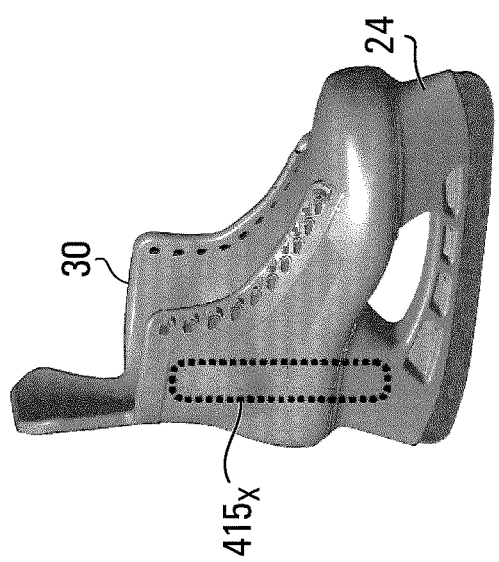
FIGS. 80A to 80F show other examples of the variant of FIG. 79.
Figure 80B:
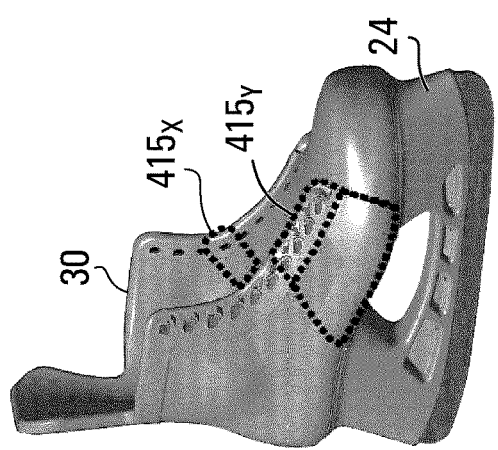
Figure 80C:
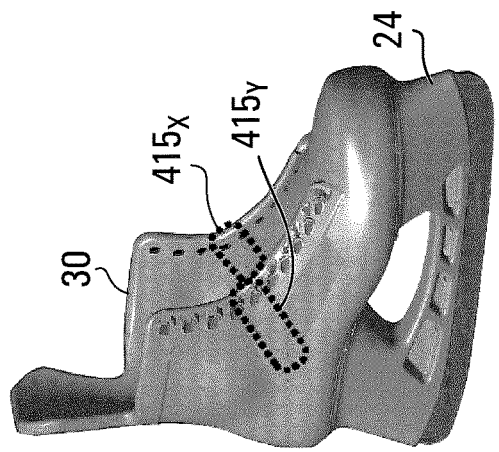
Figure 80D:
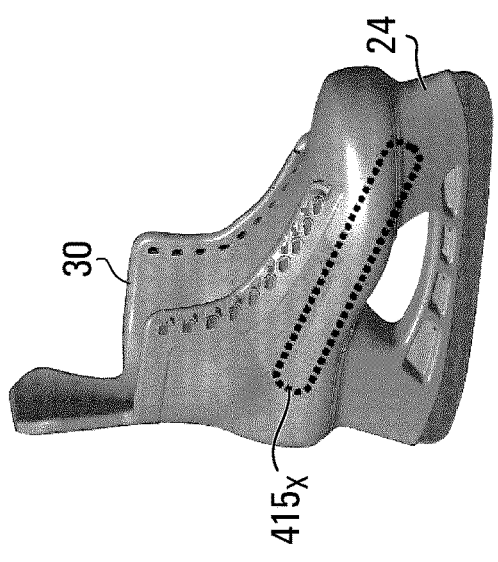
Figure 80E:
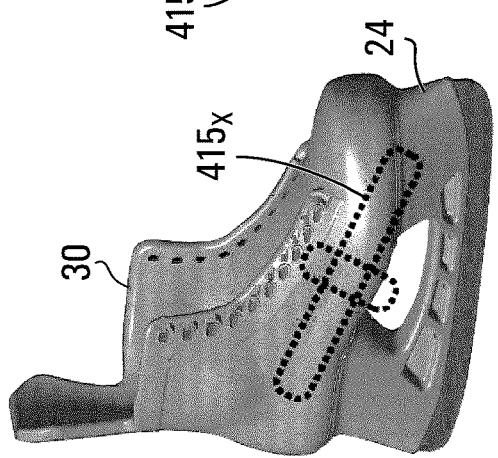
Figure 80F:
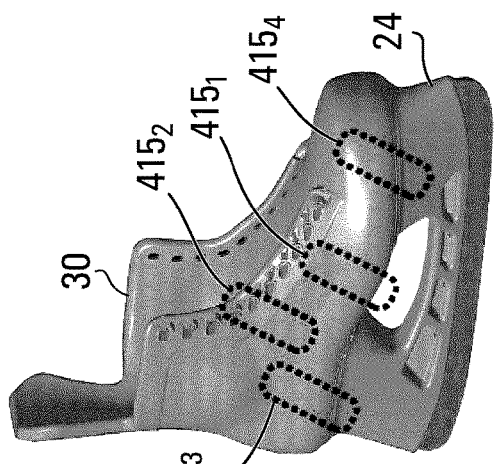

In another variant, as shown in FIG. 79, a given subshell $85_x$ (or more than one of the subshells) may comprise one or more filled portions $415_1$-$415_N$ made of a material $M_z$ different from the material $M_x$ of the subshell $85_x$. The filled portions $415_1$-$415_N$ constitute a portion of an other subshell $85_y$ that was formed such as to fill a void in the given subshell $85_x$. As such the filled portions $415_1$-$415_N$ can be said to be "inserted" into voids formed in the subshell $85_x$ and may thus be referred to as "inserts". To implement the inserts $415_1$-$415_N$, the subshell $85_x$ is first molded to include a void. This may be achieved in various ways. For example, the void of the subshell $85_x$ may be formed by placing a molding insert in the mold during molding of the subshell $85_x$. Once the subshell $85_x$ has been demolded, the molding insert is removed, leaving a void in the subshell $85_x$. Alternatively or additionally, the void of the subshell $85_x$ may be formed by removing (e.g., cutting out) a portion of the subshell $85_x$ to form a void. The subshell $85_x$, which now includes a void, is then re-inserted into a corresponding mold and the material $M_z$ is injected to fill in the void in the subshell $85_x$, effectively resulting in the subshell $85_x$ comprising distinct materials. This can be useful to replace the material $M_x$ of the subshell $85_x$ at selected locations with another material with desired characteristics such as to modify characteristics of the subshell $85_x$. For example, the material $M_z$ may have a stiffness that is different (e.g., greater or less than) from a density of the material $M_x$ of the subshell $85_x$. In this example, the material $M_z$ is stiffer than the material $M_x$ of the subshell $85_x$. Moreover, the material $M_z$ may have a density that is different (e.g., greater or less than) from a density of the material $M_x$ of the subshell $85_x$. In this example, the material $M_z$ is denser than the material $M_x$ of the subshell $85_x$. In particular, the inserts $415_1$-$415_N$ may modify the torsional characteristics of the skate boot 22 such that the skate boot 22 responds to torsional forces differently than if the subshell $85_x$ did not comprise the inserts $415_1$-$415_N$.

The inserts $415_1$-$415_N$ may thus be distributed to achieve a desired performance of the skate boot 22. For example, FIGS. 80A to 80F show different potential distributions of the inserts $415_1$-$415_N$. It is understood that the inserts $415_1$-$415_N$ may be positioned differently in other embodiments.

Figure 89:
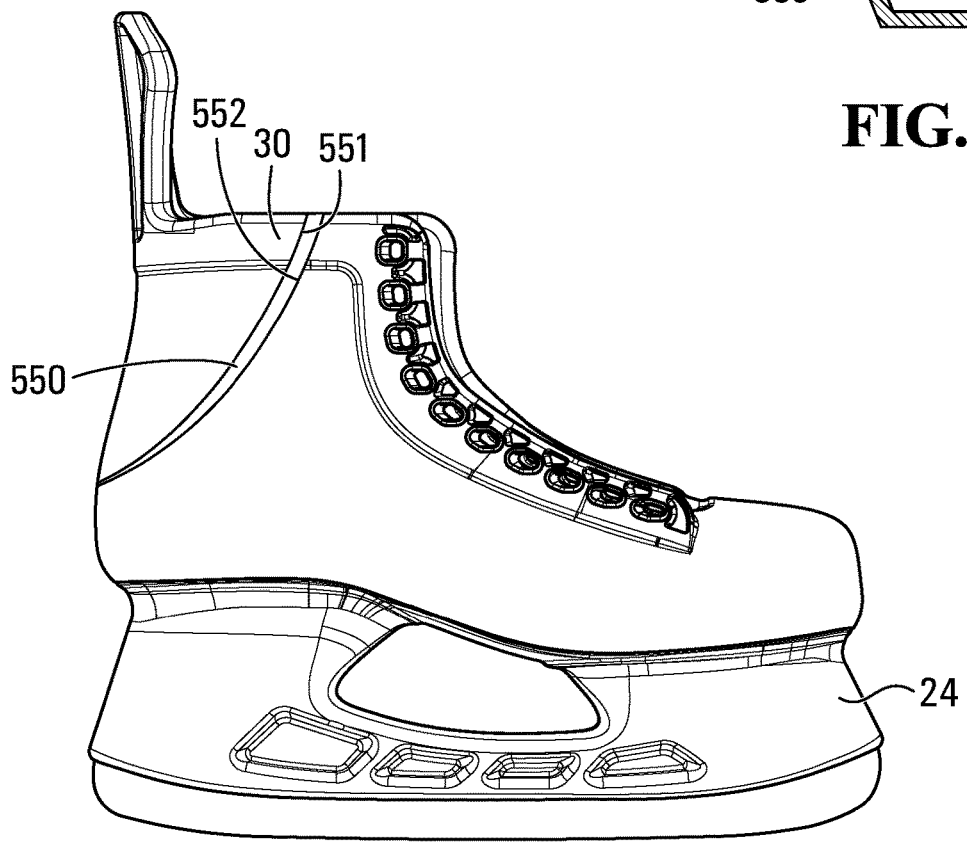
FIG. 89 shows an example of a variant in which the shell and/or the blade holder and/or other components made integrally with the shell comprises an opening configured to modify a performance of the skate boot.

In some cases, rather than filling the void formed in the subshell $85_x$, the void may be left unfilled. This may modify the torsional characteristics of the skate boot 22. For example, as shown in FIG. 89, the void left in the subshell $85_x$ may form an opening 550 that can extend to an edge of the shell 30, such as the lateral or medial edges 45, 47 of the shell 30. The opening 550 comprises opposite edges 551, 552 which converge towards one another at a proximal end and are distanced from one another at a distal end. In some cases, the torsional behavior of the skate boot 22 modified by the opening 550 may allow the opposite edges 551, 552 to contact one another at the distal end. The act of contacting one another may act as a limit to the movement of the shell 30 allowed by the opening 550 which was otherwise not possible by the shell 30 without the opening 550.

Figure 81:
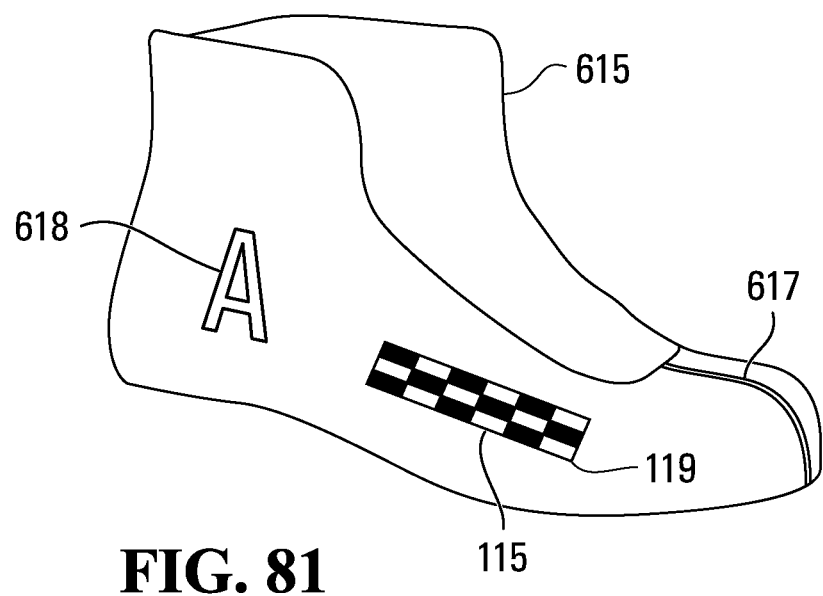
FIGS. 81 and 82 show an example of a variant in which a sheet is used during molding of the shell.
Figure 82:
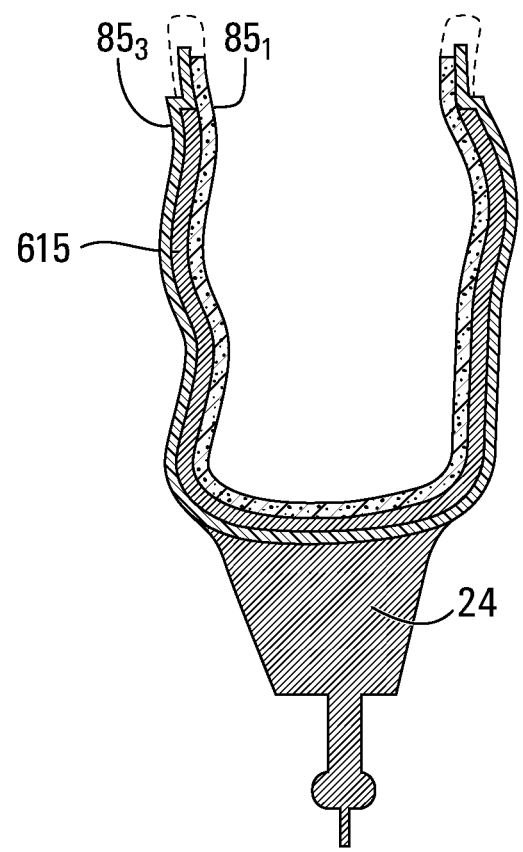

In another variant, with reference to FIGS. 81 and 82, the molding process of the shell 30 (and other components that are integrally made with the shell 30) may include using a sheet 615 (e.g., a film) which may be helpful to facilitate the molding process and/or to facilitate the addition of aesthetic features (e.g, designs) to the skate boot 22. In this embodiment, the sheet 615 is a polymeric sheet comprising a polymeric material such as a polycarbonate, polypropylene, polyethylene or any other suitable polymeric material. Moreover, in this example, the sheet 615 is a clear sheet (e.g., transparent or translucid) through which a person can see.

In an example, the sheet 615 is overlayed on one or more of the formed subshells $85_1$-$85_L$ such as to acquire a shape of the underlying subshell $85_x$ (e.g., by thermoforming the sheet 615). In this example, the sheet 615 extends over at least a majority of the subshell $85_x$. In some cases, the sheet 615 may extend over substantially an entirety of the subshell $85_x$. The sheet 615 may then be sealed (e.g., heat sealed) to form a seam 617. A female mold $154_x$ is then installed over the formed subshells $85_1$-$85_L$ and a material $M_y$ of the subsequent subshell $85_y$ is injected between the sheet 615 and the underlying subshell $85_x$. Once the subshell $85_y$ has cured a desired amount, the subshell $85_y$ is demolded from the mold $154_x$. The sheet 615 may allow the molding process of the subshell $85_y$ to be faster than if no sheet was used. Notably, the presence of the sheet 615 between the material $M_y$ and the female mold $154_x$ may allow faster removal of the subshell $85_y$ therefrom as the subshell $85y$ can be removed from the mold $154_x$ without the material $M_y$ having to have gone through its full polymerization. In contrast, if no sheet was used during the molding process, early removal of the subshell $85_y$ from the mold $154_x$ may compromise the quality of the subshell $85_y$ (e.g., it may be deformed). Furthermore, due to the presence of the sheet 615 between the material $M_y$ and the female mold $154_x$, the molding process may not require the addition of a mold release agent on surfaces of the mold $154_x$ which is typically included to facilitate demolding. As such, the presence of the sheet 615 facilitates demolding of the subshells $85_1$-$85_L$ from the female mold $154_x$ without using a mold release agent. This may also decrease imperfections in the subshell $85_y$ since mold release agents, while useful, have a tendency to introduce imperfections in a molded product. Moreover, if fewer imperfections are formed, this may improve bonding between a subsequent subshell $85_z$ (that is molded over the subshell $85_y$) and the subshell $85_y$.

Once the subshell $85_y$ is molded, the sheet 615 may be disposed of and a new sheet 615 used in a similar manner to mold a subsequent subshell if any. Due to the relatively low cost of manufacturing the sheet 615, using the sheet 615 in the molding process may inexpensively increase quality of the subshells $85_1$-$85_L$ formed therewith.

In another example, the sheet 615 may not be disposed of after molding. Instead, as shown in FIG. 82, the sheet 615 may be affixed to the shell 30 such as, for example, being integrated as a layer between given ones of the subshells $85_1$-$85_L$. In this example, the sheet 615 is formed over the subshell $85_1$ and the subshell $85_3$ is molded over the sheet 615. In examples where the subshell $85_3$ overlying the sheet 615 is a clear subshell (e.g., transparent or translucent), this may be useful to display the sheet 615 in the finished product. Notably, the sheet 615 may comprise one or more design elements 618. The design element 618 may constitute a graphic, a color, a pattern, a word, a letter, a symbol or any other desired visual element. The design element 618 may be provided on the sheet 615 in any suitable way. For example, the design element 618 may be provided on the sheet 615 via silk-screening, pad printing, flexo printing or offset printing. The presence of the design element 618 may on the sheet 615 may allow to hide or otherwise obscure visual imperfections in the subshells $85_1$-$85_L$ which do not affect the mechanical properties of the subshells $85_1$-$85_L$. Alternatively or additionally, the sheet 615 may comprise the reinforcement 115 (such as the ribs $117_1$-$117_8$ or the reinforcing sheet 119) which may be affixed thereto in any suitable way (e.g., gluing).

In the example of FIGS. 81 and 82, the sheet 615 is configured to span the shell 30 and the toe cap 32. In other examples, the sheet 615 may be configured to span the shell 30, the blade holder 24, the toe cap 32, the lace members $44_1$, $44_2$ or any other components of the skate boot 22. Furthermore, the sheet 615 may constitute at least part of an external surface of the skate boot 22. In other words, the sheet 615 may be exposed, not only visually, but physically (i.e., it can be touched). Moreover, in some cases, the sheet 615 may constitute a majority of the external surface of the skate boot 22. For example, the sheet 615 may constitute substantially an entirety of the external surface of the skate boot 22.

While in the examples given, the sheet 615 has been shown as being disposed between the subshells 851-85L, in other examples the sheet 615 may be disposed between the inner lining 36 and the internal subshell $85_1$.

Figure 83:
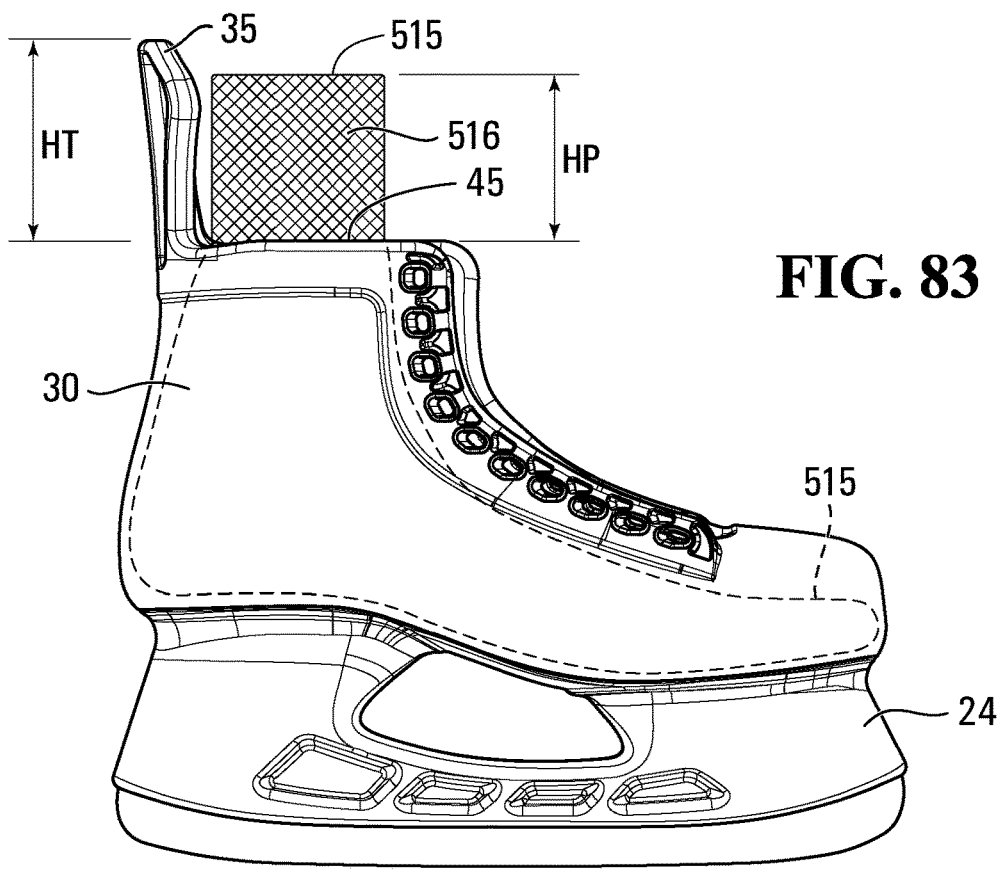
FIG. 83 shows an example of a variant in which the skate boot comprises a slash guard.

In another variant, as shown in FIG. 83, the skate boot 22 may comprise a slash guard 515 configured to protect the player from cuts at a level above lateral and medial upper edges 45, 47 of the shell 30. The slash guard 515 is movable with respect to the tendon guard 35 (or with respect to the rear portion 82 of the ankle portion 64 of the shell 30 if no tendon guard is included). This may provide cut-resistant protection of the player's ankle and/or shin while also allowing mobility thereof.

The slash guard 515 comprises a cut-resistant material 516 that resists cutting from impacts. In this example, the cut-resistant material 516 is a fabric consisting of aramid (e.g., Kevlar®) or any other suitable cut-resistant material. As such, the slash guard 515 may be pliable due to its fabric nature. In this embodiment, the slash guard 515 is movable with respect to the tendon guard 35 (or the rear portion 82 of the ankle portion 64 of the shell 30) due to the pliability of the cut-resistant material.

In this embodiment, the slash guard 515 is integrated (i.e., built into) the shell 30 and is permanently affixed thereto. In other words, in this embodiment, the slash guard 515 is not intended to be disconnected from the shell 30 without causing damage to the slash guard 515 and/or the shell 30. In particular, in this example of implementation, the slash guard 515 is affixed to the shell 30 by disposing the slash guard 515 between the subshells $85_1$-$85_L$ of the shell 30 (i.e., at least one or more of the subshells is overmolded onto the slash guard 515). More specifically, in this embodiment, the slash guard 515 is overlayed over a subshell $85_x$ and a subsequent subshell $85_y$ is molded over the slash guard 515. As such, the slash guard 515 overlaps a portion of the shell 30 sufficient for the slash guard 515 to be permanently affixed between the subshells $85_x$, $85_y$ without the possibility of accidental removal of the slash guard 515. In this example, the slash guard 515 overlaps a significant portion of the shell 30. In particular, the slash guard 515 extends over a majority of a length of the shell 30 (in the longitudinal direction of the skate 10). A portion of the slash guard 515 extending below the lateral and medial upper edges 45, 47 of the shell 30 may act as a reinforcement element (such as the reinforcement sheet 119) between the subshells $85_x$, $85_y$.

The slash guard 515 extends vertically above the lateral and medial upper edges 45, 47 of the shell 30 for a height HP that may be substantial. For example, the height HP of the slash guard 515 extending above lateral and medial upper edges 45, 47 of the shell 30 may be significant in relation to a height HT of the tendon guard 35 measured from a top of the tendon guard 35 to the lateral and medial upper edges 45, 47 of the shell 30. For instance, in some cases, a ratio of the height HP of the slash guard 515 over the height HT of the tendon guard 35 may be at least 0.5, in some cases at least 0.7, in some cases at least 0.9, in some cases at least 1, in some cases at least 1.2, in some cases at least 1.5, in some cases at least 2 and in some cases even more.

As shown in FIG. 85, which shows a top view of the portion of the slash guard 515 which extends vertically above the lateral and medial upper edges 45, 47 of the shell 30, in this embodiment, the slash guard 515 comprises a lateral portion 520 for facing a lateral side of the skate boot 22, a medial portion 522 for facing a medial side of the skate boot 22, and a rear portion 524 for facing a rear side of the skate boot 22. As such, in this embodiment, the slash guard 515 at least partially wraps around the player's ankle A and/or shin S to provide cut-resistant protection from the sides and the rear of the skate boot 22. In other examples, the slash guard 515 may wrap completely around the player's ankle A and/or shin S such that the slash guard 515 also comprises a front portion for facing a front side of the skate boot 22. In such an example, the slash guard 515 may comprise a type of sleeve through which the player must insert his/her foot 11 in order to don the skate 10.

The slash guard 515 may be configured differently in other examples. For instance, the slash guard 515 may not comprise the rear portion 524 if the tendon guard 35 is considered to provide sufficient protection to the player.

Figure 84:
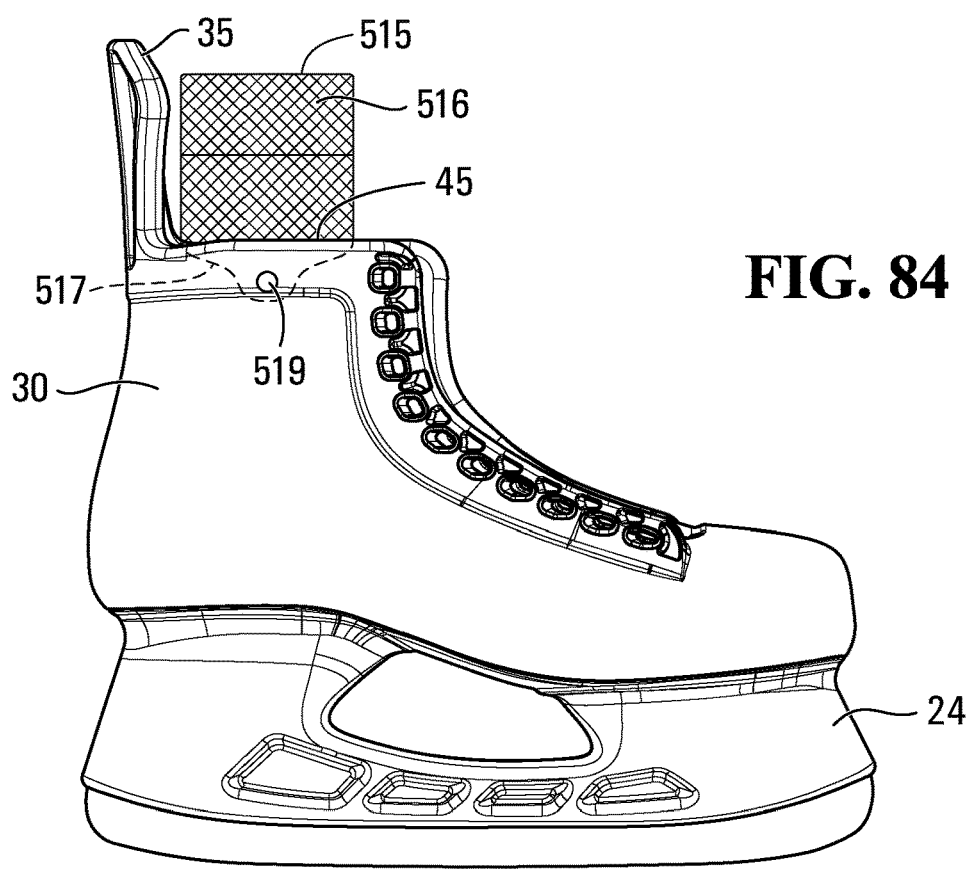
FIG. 84 shows an example of a variant of the slash guard of FIG. 83.

In other embodiments, as shown in FIG. 84, the slash guard 515 may be removeably attachable to the skate boot 22. That is, the slash guard 515 may be selectively attached to and detached from the skate boot 22. In this example, the slash guard 515 is removeably attachable to the shell 30 via interaction between an attachment member 519 of the slash guard 515 and a portion 517 of the slash guard 515. In particular, the attachment member 519 is configured to attach the portion 517 of the slash guard 515 to the shell 30. In this example, the slash guard 515 does not overlap a substantial portion of the shell 30. The portion 517 of the slash guard 515 is an extension of the slash guard 515 which extends vertically below the lateral and medial upper edges 45, 47 of the shell 30. In this embodiment, the attachment member 519 is a fastener which fastens the slash guard 515 to the shell 30. For example, the attachment member 519 may be a pin, a nut and bolt assembly, a hook-and-loop fastener or any other suitable fastener.

In this example of FIG. 84, the cut-resistant material 516 of the slash guard 515 may be rigid and/or pliable. For example, the cut-resistant material 516 may comprise a polymer such as nylon, polyurethane and/or any other suitable polymer. In other words, the cut-resistant material 516 is not limited to pliable fabrics. In this example, the slash guard 515 is movable with respect to the tendon guard 35 (or the rear portion 82 of the ankle portion 64 of the shell 30) by moving with respect to the attachment member 519. In some cases, the slash guard 515 may be pivotable about the attachment member 519. Thus, in cases where the cut-resistant material 516 is a rigid material, the slash guard 515 may still be movable with respect to the tendon guard 35 or the rear portion 82 of the ankle portion 64 of the shell 30) by pivoting about the attachment member 519.

Figure 86C:
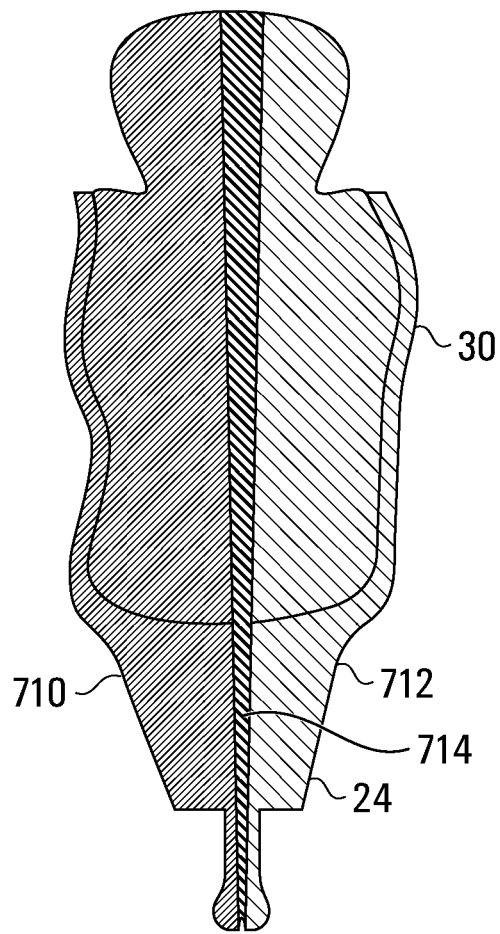
Figure 86D:
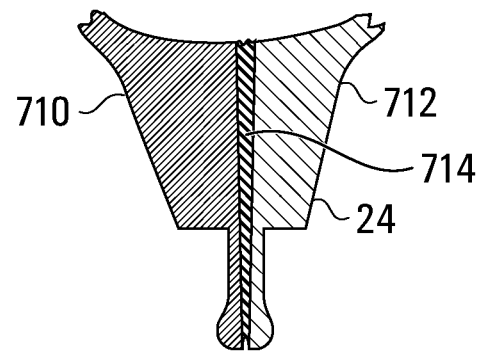

In a variant, as shown in FIGS. 86A to 86D, rather than integrally molding the shell 30 as a single piece, the shell 30 may be molded in a plurality of pieces 710, 712 and the pieces may then be joined together. For example, this may allow using processes other than injection molding, notably such as casting or other molding methods. Moreover, the pieces 710, 712 may be configured to interlock with one another. Notably, the pieces 710, 712 may comprise protrusions and corresponding recesses for fitting the protrusions such as to interlock the pieces 710, 712 with one another. An adhesive may be applied between the pieces 710, 712 to permanently affix the pieces 710, 712 to one another. As shown in FIG. 86A, each of the pieces 710, 712 may constitute a part of the shell 30 and the blade holder 24. In some cases, as shown in FIG. 86B, each of the pieces 710, 712 may constitute a part of only the shell 30 or only the blade holder 24. As shown in FIGS. 86C and 86D, the pieces may include three or more pieces 710, 712, 714.

In another variant, one or more of the subshells $85_1$-$85_L$ may be sprayed rather than injection molded. For instance, this may allow to more easily form thinner subshells $85_1$-$85_L$ (e.g., of 0.1 mm).

Figure 87:
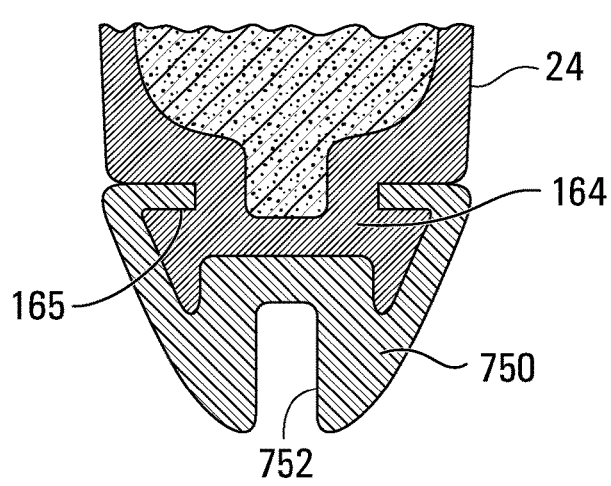
FIG. 87 shows an example of a variant in which the blade holder comprises an insert for receiving the blade.

In another variant, as shown in FIG. 87, the blade holder 24 may comprise an insert 750 configured to receive the blade 26. The insert 750 is affixed to the lower portion 162 of the blade holder 24 in any suitable manner. In this example, the insert 750 comprises projections that interlock into recesses 165 of the blade holder 24. The insert 750 further comprises a recess 752 configured to receive the blade 26. The insert 750 may be made integral with the lower portion 162 of the blade holder 24 by inserting it into a corresponding mold during molding of the blade holder 24. Alternatively, the insert 750 may be affixed to the lower portion 162 of the blade holder 24 after the lower portion 162 has already been formed. The insert 750 comprises a reinforced material that is stronger and/or stiffer than a material of the lower portion 162 of the blade holder 24. For example, the reinforced material may be a composite material (e.g., a carbon fiber material).

Figure 88:
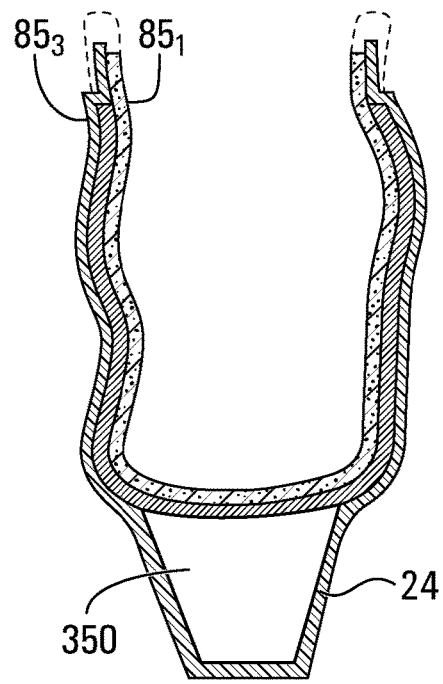
FIG. 88 shows an example of a variant in which the blade holder comprises a void.

In another variant, as shown in FIG. 88, the blade holder 24 may comprise a void 350 in one of its front and rear pillars 210, 212. More particularly, in this example, the void 350 of the blade holder 24 may be formed by separately molding the blade holder 24 with a molding insert, and removing the molding insert after molding the blade holder 24 to obtain a cavity in the blade holder 24. Thus, once the blade holder 24 is assembled with the shell 30, the blade holder 24 comprises the void 350 which is contained between surfaces of the blade holder 24 and the sole portion 69 of the shell 30. In another example, rather than leaving the cavity of the blade holder 24 as a void, an insert, such as the insert $315_1$, may be placed in the cavity and the blade holder 24 secured to the shell 30 such that the insert $315_1$ is contained between inner surfaces of a body of the blade holder 24 and a surface of the sole portion 69 of the shell 30.

In another variant, the exterior subshell $85_3$ may be configured to extend into the recess 190 of the blade-retention portion 188 of the blade-retaining base 164 of the blade holder 24. As such, the subshell $85_3$ may contact the blade 26 as it is inserted into the recess 190. This may be useful in examples where the exterior subshell $85_3$ is relatively rigid as it may provide compaction resistance when the blade 26 is inserted in the recess 190.

Figure 90:
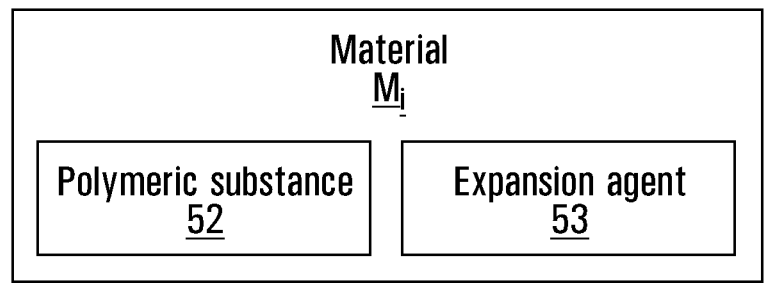
FIG. 90 shows an example of an embodiment in which a material of a given subshell comprises a polymeric substance and an expansion agent.
Figure 91:
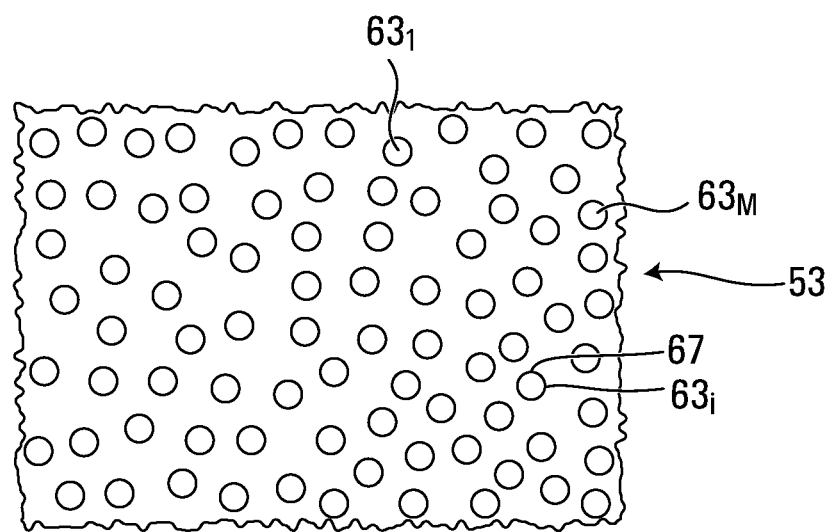
FIG. 91 shows an example of the expansion agent of FIG. 90.

In some embodiments, as shown in FIGS. 90 and 91, the material $M_i$ of a subshell $85_x$ of the skate boot 22 may comprise a mixture of a polymeric substance 52 and an expansion agent 53. This may help the material $M_i$ to have desirable properties, such as being more shock-absorbent than it if was entirely made of the expansion agent 53 and/or being lighter than if it was entirely made of the polymeric substance 52.

The polymeric substance 52 constitutes a substantial part of the material $M_i$ and substantially contributes to structural integrity to the subshell $85_x$. For instance, in some embodiments, the polymeric substance 52 may constitute at least 40%, in some cases at least 50%, in some cases at least 60%, in some cases at least 70%, in some cases at least 80%, and in some cases at least 90% of the material $M_i$ by weight. In this example of implementation, the polymeric substance 52 may constitute between 50% and 90% of the material $M_i$ by weight.

In this embodiment, the polymeric substance 52 may be an elastomeric substance. For instance, the polymeric substance 52 may be a thermoplastic elastomer (TPE) or a thermoset elastomer (TSE).

More particularly, in this embodiment, the polymeric substance 52 comprises polyurethane. The polyurethane 52 may be composed of any suitable constituents such as isocyanates and polyols and possibly additives. For instance, in some embodiments, the polyurethane 52 may have a hardness in a scale of Shore 00, Shore A, Shore C or Shore D, or equivalent. For example, in some embodiments, the hardness of the polyurethane 52 may be between Shore 5A and 95A or between Shore 40D to 93D. Any other suitable polyurethane may be used in other embodiments.

The polymeric substance 52 may comprise any other suitable polymer in other embodiments. For example, in some embodiments, the polymeric substance 52 may comprise silicon, rubber, etc.

The expansion agent 53 is combined with the polyurethane 52. In some cases, this may be done to enhance properties of the material $M_i$. Alternatively or additionally, in some cases, this may be done to enable expansion of the material $M_i$ to a final shape of the subshell $85_x$ in the mold $154_x$. For instance, in some embodiments, the expansion agent 54 may constitute at least 10%, in some cases at least 20%, in some cases at least 30%, in some cases at least 40%, in some cases at least 50%, in some cases at least 60%, of the material $M_i$ by weight and in some cases even more. In this example of implementation, the expansion agent 54 may constitute between 15% and 50% of the material $M_i$ by weight.

In this embodiment, as shown in FIG. 91, the expansion agent 53 comprises an amount of expandable microspheres $63_1$-$63_M$. Each expandable microsphere $63_i$ comprises a polymeric shell 67 expandable by a fluid encapsulated in an interior of the polymeric shell 67. In this example of implementation, the polymeric shell 67 of the expandable microsphere $63_i$ is a thermoplastic shell. The fluid encapsulated in the polymeric shell 67 is a liquid or gas (in this case a gas) able to expand the expandable microsphere $63_i$ when heated during manufacturing of the subshell $85_x$. In some embodiments, the expandable microspheres $63_1$-$63_M$ may be Expancel™ microspheres commercialized by Akzo Nobel. In other embodiments, the expandable microspheres $63_1$-$63_M$ may be Dualite microspheres commercialized by Henkel; Advancell microspheres commercialized by Sekisui; Matsumoto Microsphere microspheres commercialized by Matsumoto Yushi Seiyaku Co; or KUREHA Microsphere microspheres commercialized by Kureha. Various other types of expandable microspheres may be used in other embodiments.

In this example of implementation, the expandable microspheres $63_1$-$63_M$ include dry unexpanded (DU) microspheres when combined with the polymeric substance 52 to create the material $M_i$ before the material $M_i$ is molded. For instance, the dry unexpanded (DU) microspheres may be provided as a powder mixed with one or more liquid constituents of the polymeric substance 52.

The expandable microspheres $63_1$-$63_M$ may be provided in various other forms in other embodiments. For example, in some embodiments, the expandable microspheres $63_1$-$63_M$ may include dry expanded, wet and/or partially-expanded microspheres. For instance, wet unexpanded microspheres may be used to get better bonding with the polymeric substance 52. Partially-expanded microspheres may be used to employ less of the polymeric substance 52, or mix with the polymeric substance 52 in semi-solid form.

In some embodiments, the expandable microspheres $63_1$-$63_M$ may constitute at least 10%, in some cases at least 20%, in some cases at least 30%, in some cases at least 40%, in some cases at least 50%, and in some cases at least 60% of the material $M_i$ by weight and in some cases even more. In this example of implementation, the expandable microspheres $63_1$-$63_M$ may constitute between 15% and 50% of the material $M_i$ by weight.

The subshell $85_x$ comprising the material $M_i$ with the polymeric substance 52 and the expandable microspheres $63_1$-$63_M$ may have various desirable qualities.

For instance, in some embodiments, the subshell $85_x$ may be less dense and thus lighter than if it was entirely made of the polyurethane 52, yet be more shock-absorbent and/or have other better mechanical properties than if it was entirely made of the expandable microspheres $63_1$-$63_M$.

For example, in some embodiments, a density of the material $M_i$ may be less than a density of the polyurethane 52 (alone). For instance, the density of the material $M_i$ of the subshell $85_x$ may be no more than 70%, in some cases no more than 60%, in some cases no more than 50%, in some cases no more than 40%, in some cases no more than 30%, in some cases no more than 20%, in some cases no more than 10% and in some cases no more than 5% of the density of the polyurethane 52 and in some cases even less. For example, in some embodiments, the density of the material $M_i$ may be between 2 to 75 times less than the density of the polyurethane 52 (i.e., the density of the material $M_i$ may be about 1% to 50% of the density of the polyurethane 52).

The density of the material $M_i$ may have any suitable value. For instance, in some embodiments, the density of the material $M_i$ may be no more than 0.7 g/cm³, in some cases no more than 0.4 g/cm³, in some cases no more than 0.1 g/cm³, in some cases no more than 0.080 g/cm³, in some cases no more than 0.050 g/cm3, in some cases no more than 0.030 g/cm³, and/or may be at least 0.010 g/cm³. In some examples of implementation, the density of the material $M_i$ may be between 0.015 g/cm³ and 0.080 g/cm³, in some cases between 0.030 g/cm³ and 0.070 g/cm³, and in some cases between 0.040 g/cm³ and 0.060 g/cm³.

As another example, in some embodiments, a stiffness of the material $M_i$ may be different from (i.e., greater or less than) a stiffness of the expandable microspheres $63_1$-$63_M$ (alone). For instance, a modulus of elasticity (i.e., Young's modulus) of the material IA may be greater or less than a modulus of elasticity of the expandable microspheres $63_1$-$63_M$ (alone). For instance, a difference between the modulus of elasticity of the material $M_i$ and the modulus of elasticity of the expandable microspheres $63_1$-$63_M$ may be at least 20%, in some cases at least 30%, in some cases at least 50%, and in some cases even more, measured based on a smaller one of the modulus of elasticity of the material $M_i$ and the modulus of elasticity of the expandable microspheres $63_1$-$63_M$. In some cases, the modulus of elasticity may be evaluated according to ASTM D-638 or ASTM D-412.

As another example, in some embodiments, a resilience of the material $M_i$ may be less than a resilience of the expandable microspheres $63_1$-$63_M$ (alone). For instance, in some embodiments, the resilience of the material $M_i$ may no more than 70%, in some cases no more than 60%, in some cases no more than 50%, in some cases no more than 40%, in some cases no more than 30%, and in some cases no more than 20%, and in some cases no more than 10% of the resilience of the expandable microspheres $63_1$-$63_M$ according to ASTM D2632-01 which measures resilience by vertical rebound. In some examples of implementation, the resilience of the material $M_i$ may be between 20% and 60% of the resilience of the expandable microspheres $63_1$-$63_M$. Alternatively, in other embodiments, the resilience of the material $M_i$ may be greater than the resilience of the expandable microspheres $63_1$-$63_M$.

The resilience of the material $M_i$ may have any suitable value. For instance, in some embodiments, the resilience of the material $M_i$ may be no more than 40%, in some cases no more than 30%, in some cases no more than 20%, in some cases no more than 10%, and in some cases even less (e.g., 5%), according to ASTM D2632-01, thereby making the subshell $85_x$ more shock-absorbent. In other embodiments, the resilience of the material $M_i$ may be at least 60%, in some cases at least 70%, in some cases at least 80% and in some cases even more, according to ASTM D2632-01, thereby making the material $M_i$ provide more rebound.

As another example, in some embodiments, a tensile strength of the material $M_i$ may be greater than a tensile strength of the expandable microspheres $63_1$-$63_M$ (alone). For instance, in some embodiments, the tensile strength of the material $M_i$ may be at least 120%, in some cases at least 150%, in some cases at least 200%, in some cases at least 300%, in some cases at least 400%, and in some cases at least 500% of the tensile strength of the expandable microspheres $63_1$-$63_M$ according to ASTM D-638 or ASTM D-412, and in some cases even more.

The tensile strength of the material $M_i$ may have any suitable value. For instance, in some embodiments, the tensile strength of the material $M_i$ may be at least 0.9 MPa, in some cases at least 1 MPa, in some cases at least 1.2 MPa, in some cases at least 1.5 MPa and in some cases even more (e.g., 2 MPa or more).

As another example, in some embodiments, an elongation at break of the material $M_i$ may be greater than an elongation at break of the expandable microspheres $63_1$-$63_M$ (alone). For instance, in some embodiments, the elongation at break of the expandable material $M_i$ may be at least 120%, in some cases at least 150%, in some cases at least 200%, in some cases at least 300%, in some cases at least 400%, and in some cases at least 500% of the elongation at break of the expandable microspheres $63_1$-$63_M$ according to ASTM D-638 or ASTM D-412, and in some cases even more.

The elongation at break of the material $M_i$ may have any suitable value. For instance, in some embodiments, the elongation at break of the material $M_i$ may be at least 20%, in some cases at least 30%, in some cases at least 50%, in some cases at least 75%, in some cases at least 100%, and in some cases even more (e.g. 150% or more).

In some embodiments, a material of the shell 30 (e.g., a given one of the materials $M_1$-$M_N$) may be a composite material. For example, the composite material may be a fiber-matrix composite material that comprises a matrix in which fibers are embedded. The matrix may include any suitable polymeric resin, such as a thermosetting polymeric material (e.g., polyester, vinyl ester, vinyl ether, polyurethane, epoxy, cyanate ester, etc.), a thermoplastic polymeric material (e.g., polyethylene, polyurethane, polypropylene, acrylic resin, polyether ether ketone, polyethylene terephthalate, polyvinyl chloride, polymethyl methacrylate, polycarbonate, acrylonitrile butadiene styrene, nylon, polyimide, polysulfone, polyamide-imide, self-reinforcing polyphenylene, etc.), or a hybrid thermosetting-thermoplastic polymeric material. The fibers may be made of any suitable material such as carbon fibers, polymeric fibers such as aramid fibers, boron fibers, glass fibers, ceramic fibers, etc.

Although in embodiments considered above the skate 10 is designed for playing ice hockey on the skating surface 14 which is ice, in other embodiments, the skate 10 may be constructed using principles described herein for playing roller hockey or another type of hockey (e.g., field or street hockey) on the skating surface 14 which is a dry surface (e.g., a polymeric, concrete, wooden, or turf playing surface or any other dry surface on which roller hockey or field or street hockey is played). Thus, in other embodiments, instead of comprising the blade 26, the skating device 28 may comprise a set of wheels to roll on the dry skating surface 14 (i.e., the skate 10 may be an inline skate or other roller skate). Moreover, in other embodiments, the skate 10 may be a figure skate constructed using principles described herein for figure skating.

Figure 92:
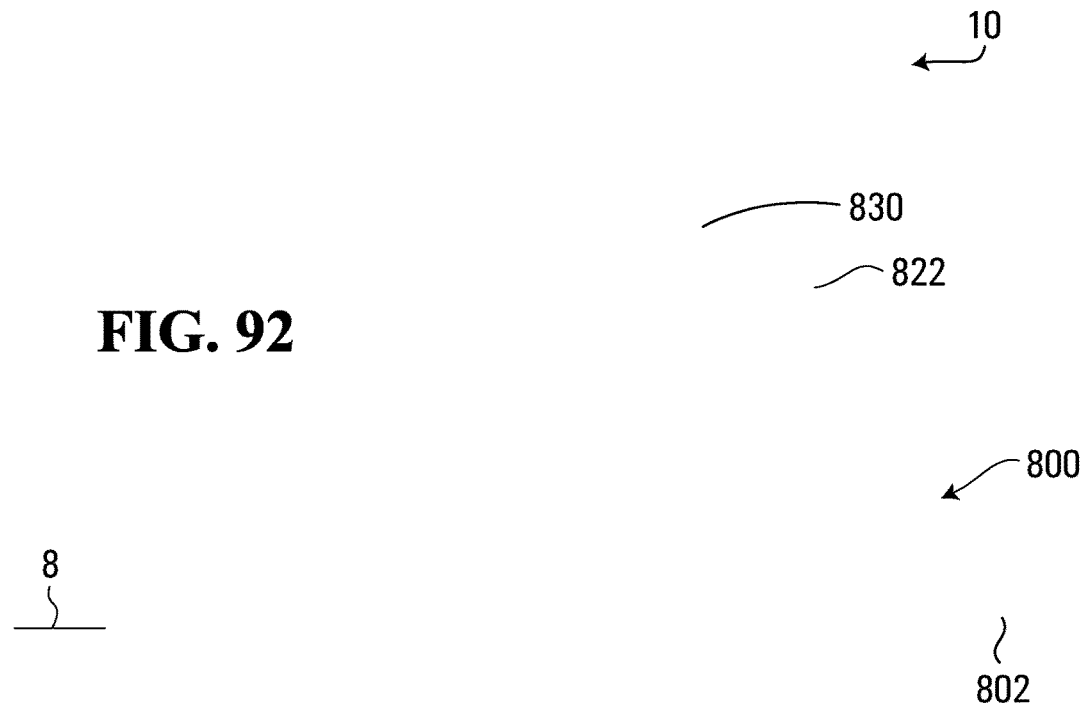
FIG. 92 shows an example of a variant in which the footwear is a ski boot.
Figure 93:
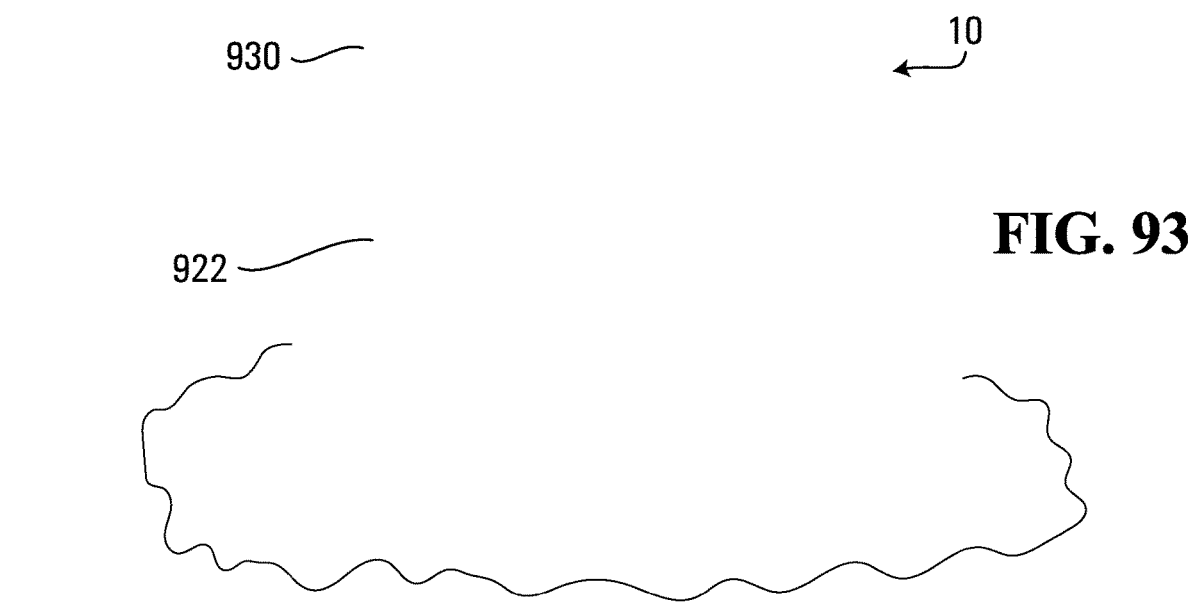
FIG. 93 shows an example of a variant in which the footwear is a work boot.

Furthermore, although in embodiments considered above the footwear 10 is a skate for skating on the skating surface 14, in other embodiments, the footwear 10 may be any other suitable type of footwear. For example, as shown in FIG. 92, the footwear 10 may be a ski boot comprising a shell 830 which may be constructed in the manner described above with respect to the shell of the skate. In particular, the ski boot 10 is configured to be attachable and detachable from a ski 802 which is configured to travel on a ground surface 8 (e.g., snow). To that end, the ski boot 10 is configured to interact with an attachment mechanism 800 of the ski 802. In another example, as shown in FIG. 93, the footwear 10 may be a boot (e.g., a work boot or any other type of boot) comprising a shell 930 which can be constructed in the manner described above with respect to the shell of the skate.

In some embodiments, any feature of any embodiment described herein may be used in combination with any feature of any other embodiment described herein.

Certain additional elements that may be needed for operation of certain embodiments have not been described or illustrated as they are assumed to be within the purview of those of ordinary skill in the art. Moreover, certain embodiments may be free of, may lack and/or may function without any element that is not specifically disclosed herein.

To facilitate the description, any reference numeral designating an element in one figure designates the same element if used in any other figures. In describing the embodiments, specific terminology has been resorted to for the sake of description but the invention is not intended to be limited to the specific terms so selected, and it is understood that each specific term comprises all equivalents.

In case of any discrepancy, inconsistency, or other difference between terms used herein and terms used in any document incorporated by reference herein, meanings of the terms used herein are to prevail and be used.

Although various embodiments have been illustrated, this was for the purpose of describing, but not limiting, the invention. Various modifications will become apparent to those skilled in the art and are within the scope of this invention, which is defined more particularly by the attached claims.

The invention claimed is:

1. An ice skate comprising:
   a skate boot defining a cavity to receive a foot of a user, the skate boot comprising a body that comprises a medial side portion to face a medial side of the user's foot, a lateral side portion to face a lateral side of the user's foot, a heel portion to receive a heel of the user's foot, and an ankle portion to receive an ankle of the user;
   a blade to engage ice; and
   a blade holder between the skate boot and the blade;
   wherein: the medial side portion, the lateral side portion, the heel portion, and the ankle portion of the body of the skate boot are molded together and integral with one another; the body of the skate boot comprises a plurality of layers comprising a plurality of materials that are different and molded by flowing; and at least part of the blade holder is molded together and integral with the body of the skate boot.

2. The ice skate of claim 1, wherein a given one of the materials is a foam.

3. The ice skate of claim 1, wherein each of the materials is a foam.

4. The ice skate of claim 1, wherein a given one of the materials includes a polyurethane.

5. The ice skate of claim 1, wherein a density of a given one of the materials is no more than 40 kg/m³.

6. The ice skate of claim 1, wherein a density of a given one of the materials is no more than 20 kg/m³.

7. The ice skate of claim 1, wherein a density of each of the materials is no more than 40 kg/m³.

8. The ice skate of claim 1, wherein a density of each of the materials is no more than 20 kg/m³.

9. The ice skate of claim 1, wherein a first one of the layers is stiffer than a second one of the layers.

10. The ice skate of claim 9, wherein a ratio of a stiffness of the first one of the layers over a stiffness of the second one of the layers is at least 2.

11. The ice skate of claim 1, wherein a modulus of elasticity of a first one of the materials comprised by a first one of the layers is greater than a modulus of elasticity of a second one of the materials comprised by a second one of the layers.

12. The ice skate of claim 11, wherein a ratio of the modulus of elasticity of the first one of the materials comprised by the first one of the layers over the modulus of elasticity of the second one of the materials comprised by the second one of the layers is at least 2.

13. The ice skate of claim 1, wherein a first one of the layers is denser than a second one of the layers.

14. The ice skate of claim 13, wherein a ratio of a density of the first one of the layers over a density of the second one of the layers is at least 2.

15. The ice skate of claim 1, wherein the plurality of layers includes at least three layers.

16. The ice skate of claim 1, wherein the plurality of layers includes at least four layers.

17. The ice skate of claim 1, wherein a density of a first one of the layers is greater than a density of a second one of the layers that is disposed inwardly of the first one of the layers.

18. The ice skate of claim 17, wherein the density of the second one of the layers is greater than a density of a third one of the layers that is disposed inwardly of the second one of the layers.

19. The ice skate of claim 1, wherein a stiffness of a first one of the layers is greater than a stiffness of a second one of the layers that is disposed inwardly of the first one of the layers.

20. The ice skate of claim 1, wherein a given one of the layers is clear.

21. The ice skate of claim 1, wherein a first one of the layers comprises an opening and a second one of the layers extends into the opening.

22. The ice skate of claim 1, wherein the body of the skate boot comprises a sole portion to face a plantar surface of the user's foot.

23. The ice skate of claim 22, wherein the medial side portion, the lateral side portion, the heel portion, the ankle portion, and the sole portion of the body of the skate boot are molded together and integral with one another.

24. The ice skate of claim 1, wherein the body of the skate boot comprises a toe portion to enclose toes of the user's foot.

25. The ice skate of claim 24, wherein the medial side portion, the lateral side portion, the heel portion, the ankle portion, and the toe portion of the body of the skate boot are molded together and integral with one another.

26. The ice skate of claim 1, wherein the materials are injection molded.

27. The ice skate of claim 26, wherein the materials are injection molded without heating the materials.

28. The ice skate of claim 1, wherein the body of the skate boot comprises a reinforcement disposed between a first one of the layers and a second one of the layers.

29. The ice skate of claim 28, wherein the reinforcement is affixed onto the first one of the layers prior to molding of the second one of the layers.

30. The ice skate of claim 28, wherein the reinforcement comprises a reinforcing sheet.

31. The ice skate of claim 30, wherein the reinforcement comprises a reinforcing fabric.

32. The ice skate of claim 28, wherein the reinforcement comprises a composite material.

33. The ice skate of claim 32, wherein the composite material is a fiber-reinforced polymeric material.

34. The ice skate of claim 28, wherein the reinforcement covers at least a majority of the first one of the layers.

35. The ice skate of claim 28, wherein the reinforcement is a first reinforcement and the body of the skate boot comprises a second reinforcement disposed between the first one of the layers and the second one of the layers and spaced apart from the first reinforcement.

36. The ice skate of claim 28, wherein the reinforcement is a first reinforcement and the body of the skate boot comprises a second reinforcement disposed between the second one of the layers and a third one of the layers.

37. The ice skate of claim 1, wherein the body of the skate boot comprises a decoration disposed between a first one of the layers and a second one of the layers.

38. The ice skate of claim 37, wherein the first one of the layers is clear such that the decoration is visible through the first one of the layers.

39. The ice skate of claim 1, comprising a toe cap, wherein at least part of the toe cap is molded together and integral with the body of the skate boot.

40. The ice skate of claim 1, comprising a tendon guard, wherein at least part of the tendon guard is molded together and integral with the body of the skate boot.

41. The ice skate of claim 1, comprising a tongue, wherein at least part of the tongue is molded together and integral with the body of the skate boot.

42. The ice skate of claim 1, comprising a sheet affixed to the body of the skate boot.

43. The ice skate of claim 42, wherein the sheet is disposed between a first one of the layers and a second one of the layers.

44. The ice skate of claim 43, wherein the sheet extends over at least a majority of the first one of the layers.

45. The ice skate of claim 42, wherein the sheet constitutes at least a majority of the external surface of the skate boot.

46. The ice skate of claim 42, comprising an inner lining, wherein the sheet is disposed between the inner lining and a given one of the layers.

47. The ice skate of claim 1, wherein a given one of the materials comprises a polymeric substance and an expansion agent.

48. The ice skate of claim 47, wherein the expansion agent comprises expandable microspheres.

49. The ice skate of claim 1, comprising: a tendon guard projecting upwardly from the body of the skate boot; and a slash guard comprising a cut-resistant material, extending above the body, and movable relative to the tendon guard.

50. The ice skate of claim 1, wherein the blade holder comprises a plurality of layers which comprise respective ones of the materials that are molded by flowing.

51. The ice skate of claim 1, wherein at least a majority of the blade holder is molded together and integral with the body of the skate boot.

52. An ice skate comprising:
a skate boot defining a cavity to receive a foot of a user, the skate boot comprising a body that comprises a medial side portion to face a medial side of the user's foot, a lateral side portion to face a lateral side of the user's foot, a heel portion to receive a heel of the user's foot, and an ankle portion to receive an ankle of the user;
a blade to engage ice; and
a blade holder between the skate boot and the blade;
wherein: the medial side portion, the lateral side portion, the heel portion, and the ankle portion of the body of the skate boot are molded together and integral with one another; the body of the skate boot comprises a plurality of injection-molded layers comprising a plurality of materials that are different; and at least part of the blade holder is molded together and integral with the body of the skate boot.

53. A skate boot for a skate, the skate comprising a skating device disposed beneath the skate boot to engage a skating surface, the skate boot defining a cavity to receive a foot of a user, the skate boot comprising a body that comprises a medial side portion to face a medial side of the user's foot, a lateral side portion to face a lateral side of the user's foot, a heel portion to receive a heel of the user's foot, and an ankle portion to receive an ankle of the user, wherein: the medial side portion, the lateral side portion, the heel portion, and the ankle portion of the body of the skate boot are molded together and integral with one another; the body of the skate boot comprises a plurality of layers comprising a plurality of materials that are different and molded by flowing; the body of the skate boot comprises a first reinforcement disposed between a first one of the layers and a second one of the layers; and the body of the skate boot comprises a second reinforcement disposed between the first one of the layers and the second one of the layers and spaced apart from the first reinforcement.

54. The skate boot of claim 53, wherein a given one of the materials is a foam.

55. The skate boot of claim 53, wherein each of the materials is a foam.

56. The skate boot of claim 53, wherein a given one of the materials includes a polyurethane.

57. The skate boot of claim 53, wherein a density of a given one of the materials is no more than 40 kg/m$^3$.

58. The skate boot of claim 53, wherein a density of a given one of the materials is no more than 20 kg/m$^3$.

59. The skate boot of claim 53, wherein a first one of the layers is stiffer than a second one of the layers.

60. The skate boot of claim 59, wherein a ratio of a stiffness of the first one of the layers over a stiffness of the second one of the layers is at least 2.

61. The skate boot of claim 53, wherein a modulus of elasticity of a first one of the materials comprised by a first one of the layers is greater than a modulus of elasticity of a second one of the materials comprised by a second one of the layers.

62. The skate boot of claim 61, wherein a ratio of the modulus of elasticity of the first one of the materials comprised by the first one of the layers over the modulus of elasticity of the second one of the materials comprised by the second one of the layers is at least 2.

63. The skate boot of claim 53, wherein a first one of the layers is denser than a second one of the layers.

64. The skate boot of claim 63, wherein a ratio of a density of the first one of the layers over a density of the second one of the layers is at least 2.

65. The skate boot of claim 53, wherein the plurality of layers includes at least three layers.

66. The skate boot of claim 53, wherein the plurality of layers includes at least four layers.

67. The skate boot of claim 53, wherein a density of a first one of the layers is greater than a density of a second one of the layers that is disposed inwardly of the first one of the layers.

68. The skate boot of 67, wherein the density of the second one of the layers is greater than a density of a third one of the layers that is disposed inwardly of the second one of the layers.

69. The skate boot of claim 53, wherein a stiffness of a first one of the layers is greater than a stiffness of a second one of the layers that is disposed inwardly of the first one of the layers.

70. The skate boot of claim 53, wherein a given one of the layers is clear.

71. The skate boot of claim 53, wherein a first one of the layers comprises an opening and a second one of the layers extends into the opening.

72. The skate boot of claim 53, wherein the body of the skate boot comprises a sole portion to face a plantar surface of the user's foot.

73. The skate boot of claim 72, wherein the medial side portion, the lateral side portion, the heel portion, the ankle portion, and the sole portion of the body of the skate boot are molded together and integral with one another.

74. The skate boot of claim 53, wherein the body of the skate boot comprises a toe portion to enclose toes of the user's foot.

75. The skate boot of claim 74, wherein the medial side portion, the lateral side portion, the heel portion, the ankle portion, and the toe portion of the body of the skate boot are molded together and integral with one another.

76. The skate boot of claim 53, wherein the materials are injection molded.

77. The skate boot of claim 76, wherein the materials are injection molded without heating the materials.

78. The skate boot of claim 53, wherein each of the first reinforcement and the second reinforcement is affixed onto the first one of the layers prior to molding of the second one of the layers.

79. The skate boot of claim 53, wherein the first reinforcement comprises a reinforcing sheet.

80. The skate boot of claim 79, wherein the first reinforcement comprises a reinforcing fabric.

81. The skate boot of claim 53, wherein the first reinforcement comprises a composite material.

82. The skate boot of claim 81, wherein the composite material is a fiber-reinforced polymeric material.

83. The skate boot of claim 53, wherein the first reinforcement covers at least a majority of the first one of the layers.

84. The skate boot of claim 53, wherein the body of the skate boot comprises a decoration disposed between a first one of the layers and the second one of the layers.

85. The skate boot of claim 84, wherein the first one of the layers is clear such that the decoration is visible through the first one of the layers.

86. The skate boot of claim 53, comprising a toe cap, wherein at least part of the toe cap is molded together and integral with the body.

87. The skate boot of claim 53, comprising a tendon guard, wherein at least part of the tendon guard is molded together and integral with the body.

88. The skate boot of claim 53, comprising a tongue, wherein at least part of the tongue is molded together and integral with the body.

89. The skate boot of claim 53, wherein a given one of the materials comprises a polymeric substance and an expansion agent.

90. The skate boot of claim 89, wherein the expansion agent comprises expandable microspheres.

91. An ice skate comprising the skate boot of claim 53 and a skating device comprising a blade holder and a blade.

92. The ice skate of claim 91, wherein the blade holder comprises a plurality of layers which comprise respective ones of the materials that are molded by flowing.

93. The ice skate of claim 92, wherein at least a majority of the blade holder is molded together and integral with the body of the skate boot.

94. A skate boot for a skate, the skate comprising a skating device disposed beneath the skate boot to engage a skating surface, the skate boot defining a cavity to receive a foot of a user, the skate boot comprising a body that comprises a medial side portion to face a medial side of the user's foot, a lateral side portion to face a lateral side of the user's foot, a heel portion to receive a heel of the user's foot, and an ankle portion to receive an ankle of the user, wherein: the medial side portion, the lateral side portion, the heel portion, and the ankle portion of the body of the skate boot are molded together and integral with one another; the body of the skate boot comprises a plurality of layers comprising a plurality of materials that are different and molded by flowing; the skate boot comprises a tongue; and at least part of the tongue is molded together and integral with the body of the skate boot.

\* \* \* \* \*